US012750683B2

(12) United States Patent
Bhuyan et al.

(10) Patent No.: US 12,750,683 B2
(45) Date of Patent: Sep. 29, 2026

(54) SYSTEMS, DEVICES, AND METHODS FOR SCHEDULING SPECTRUM FOR SPECTRUM SHARING

(71) Applicants: Battelle Energy Alliance, LLC, Idaho Falls, ID (US); University of Utah Research Foundation, Salt Lake City, UT (US)

(72) Inventors: Arupjyoti Bhuyan, Idaho Falls, ID (US); Mingyue Ji, Sandy, UT (US); Sneha Kasera, Salt Lake City, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 495 days.

(21) Appl. No.: 18/249,345

(22) PCT Filed: Oct. 29, 2021

(86) PCT No.: PCT/US2021/072137
§ 371 (c)(1),
(2) Date: Apr. 17, 2023

(87) PCT Pub. No.: WO2022/094612
PCT Pub. Date: May 5, 2022

(65) Prior Publication Data

US 2023/0403565 A1 Dec. 14, 2023

Related U.S. Application Data

(60) Provisional application No. 63/107,495, filed on Oct. 30, 2020.

(51) Int. Cl.
*H04W 16/14* (2009.01)
*H04B 17/336* (2015.01)

(52) U.S. Cl.
CPC .......... *H04W 16/14* (2013.01); *H04B 17/336* (2015.01)

(58) Field of Classification Search
CPC ............................ H04W 16/14; H04B 17/336
See application file for complete search history.

(56) References Cited

U.S. PATENT DOCUMENTS 8,948,120 B2 2/2015 Prasad et al.
9,755,711 B2 9/2017 Lau et al.
(Continued)

FOREIGN PATENT DOCUMENTS

WO 2017/161148 A1 9/2017

OTHER PUBLICATIONS

International Search Report from International Application No. PCT/US2021/072137, mailed Mar. 3, 2022, 4 pages.
(Continued)

*Primary Examiner* — Zhiren Qin
(74) *Attorney, Agent, or Firm* — TraskBritt

(57) ABSTRACT

Systems, devices, and methods are described for scheduling radio frequency spectrum at a base station for one or more user equipment. A method may include receiving, at a base station of a radio-frequency communication network, a message from a user equipment. The message may include a transmission utilizing unlicensed spectrum or shared spectrum. The method may also include determining, based on the message, a degree of interference. The method may also include determining, based on the degree of interference, whether to service the user equipment using the unlicensed spectrum or shared spectrum. Related systems and devices are also disclosed.

13 Claims, 32 Drawing Sheets

(56) References Cited

U.S. PATENT DOCUMENTS

| | | | | |
|---|---|---|---|---|
| 2008/0194267 | A1* | 8/2008 | Ahn | H04W 16/10 455/450 |
| 2008/0291889 | A1* | 11/2008 | Matsumoto | H04W 74/085 370/348 |
| 2009/0061842 | A1* | 3/2009 | Park | H04W 72/542 455/422.1 |
| 2010/0265842 | A1 | 10/2010 | Khandekar et al. | |
| 2010/0272218 | A1* | 10/2010 | Yeh | H04L 5/0035 375/330 |
| 2011/0216721 | A1* | 9/2011 | Min | H04W 72/542 370/329 |
| 2013/0272315 | A1 | 10/2013 | Yonge, III et al. | |
| 2014/0036818 | A1 | 2/2014 | Koskela et al. | |
| 2015/0078274 | A1* | 3/2015 | Wang | H04W 16/10 370/329 |
| 2015/0358960 | A1* | 12/2015 | Zhang | H04W 52/146 455/450 |
| 2015/0382380 | A1* | 12/2015 | Li | H04W 74/0825 370/329 |
| 2016/0037541 | A1* | 2/2016 | Kim | H04B 7/0626 370/329 |
| 2017/0064719 | A1 | 3/2017 | Amanna et al. | |
| 2018/0077717 | A1 | 3/2018 | Janse Van Rensburg et al. | |
| 2020/0154349 | A1 | 5/2020 | Cao et al. | |
| 2021/0136785 | A1* | 5/2021 | Elsayed | H04W 72/535 |
| 2022/0338245 | A1* | 10/2022 | Sha | H04W 74/002 |

OTHER PUBLICATIONS

International Written Opinion from International Application No. PCT/US2021/072137, mailed Mar. 3, 2022, 5 pages.

Invitation to Pay Additional Fees for International Application No. PCT/US21/72137, mailed Jan. 6, 2022, 2 pages.

Jeong et al., "Energy-Efficient Beam Scheduling for Orthogonal Random Beamforming in Cooperative Networks", 15th International Symposium on Modeling and Optimization in Mobile, Ad Hoc, and Wireless Networks (WiOpt), 2017, 8 pages.

Jiang et al., "A Block Coordinated Update Method for Beam-Based Massive MIMO Downlink Scheduling Based on Statistical CSI", 23rd Asia-Pacific Conference on Communication (APCC), 2017, 6 pages.

Jiang et al., "Joint User Scheduling and Beam Selection Optimization for Beam-Based Massive MIMO Downlinks", IEEE Transactions on Wireless Communications, vol. 17, No. 4, Apr. 2018, 15 pages.

* cited by examiner

1300

(Effect Of $P_q$ When $\beta = 0.1W,\ I_q = 10$)

SYSTEMS, DEVICES, AND METHODS FOR SCHEDULING SPECTRUM FOR SPECTRUM SHARING

CROSS-REFERENCE TO RELATED APPLICATIONS

This application is a national phase entry under 35 U.S.C. § 371 of International Patent Application PCT/US2021/072137, filed Oct. 29, 2021, designating the United States of America and published as International Patent Publication WO 2022/094612 A1 on May 5, 2022, which claims the benefit under Article 8 of the Patent Cooperation Treaty of the filing date of U.S. Provisional Patent Application Ser. No. 63/107,495, filed Oct. 30, 2020, for "Systems, Devices, and Methods for Autonomous Beam Scheduling for Spectrum Sharing."

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

Embodiments of the present disclosure relate generally to spectrum sharing in a radio frequency (RF) communication network.

BACKGROUND

As technology continues to advance, wireless networks are becoming increasingly common in, for example, business environments, public environments, and home environments. Further, due to the abundance of transmitters, RF spectrum sharing may be important to allow for improved spectrum utilization and/or decreased interference.

BRIEF SUMMARY

Various embodiments may include a method including receiving, at a base station of a radio-frequency communication network, a message from a user equipment. The message may be a transmission utilizing unlicensed spectrum. The method may also include determining, based on the message, a degree of interference. The method may also include determining, based on the degree of interference, whether to service the user equipment using the unlicensed spectrum.

Various embodiments may include a method including receiving, at abase station of a radio-frequency communication network, a signal from a user equipment. The method may also include scheduling spectrum for the user equipment based at least in part on: a signal-to-interference-and-noise ratio of the signal, a transmission-power constraint of the base station, and information regarding past usage of the spectrum.

Various embodiments may include a computer-readable medium comprising computer executable instructions that, when executed via a processing unit of a computing system, cause the computing system to perform operations. The operations may include receiving a signal received at a base station of a radio-frequency communication network from a user equipment. The operations may also include scheduling spectrum for the user equipment based at least in part on: a signal-to-interference-and-noise ratio of the signal, a transmission-power constraint of the base station, and information regarding past usage of the spectrum.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIGS. 11A, 111B, and 11C illustrate the effect of BS MSR ($D^{BS}$) on the network utility for each MAC scheme according to one or more embodiments of the present disclosure.

DETAILED DESCRIPTION

Introduction

Figure 1:
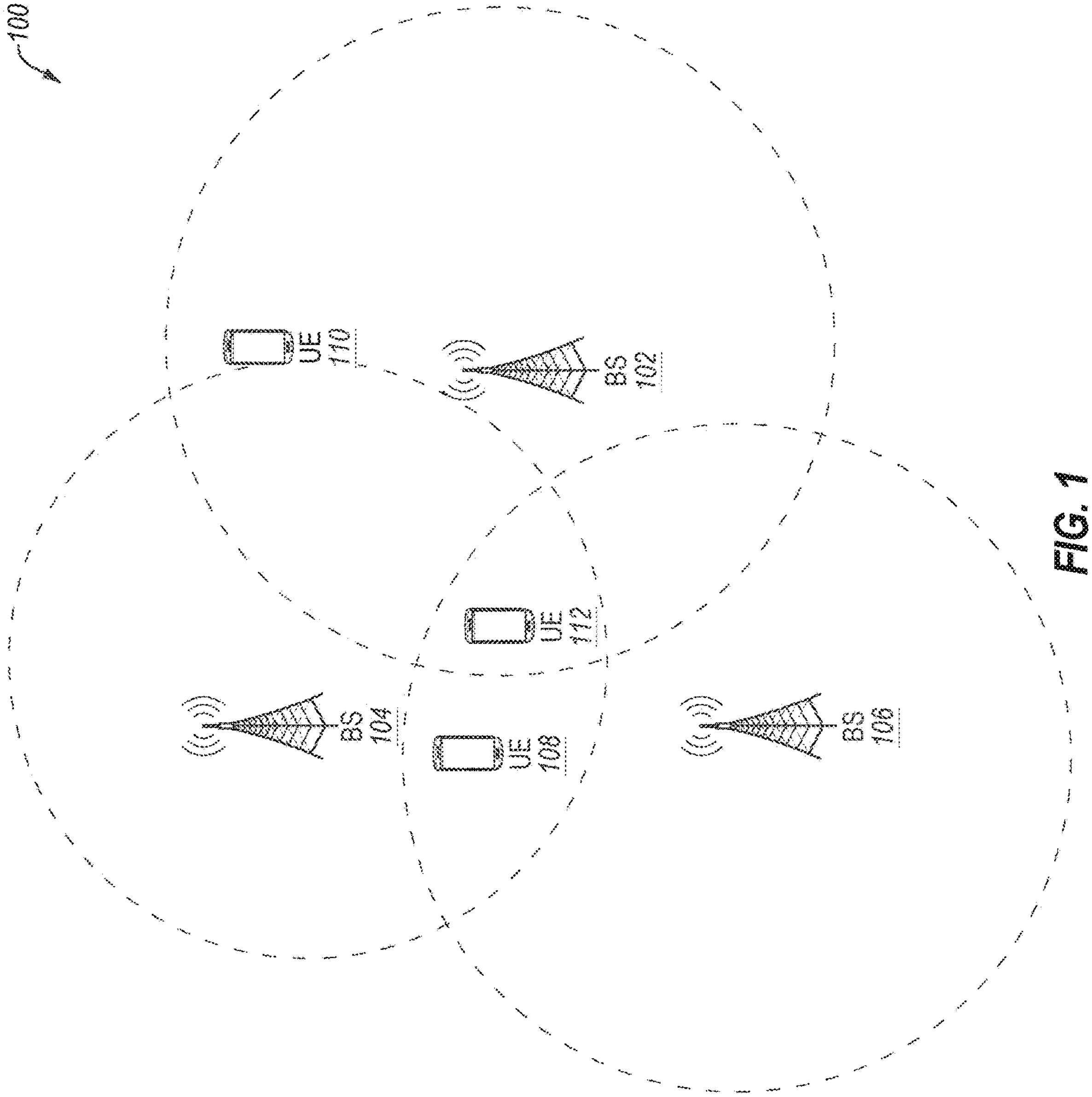
FIG. 1 illustrates an example environment, including base stations and user equipment, in which one or more embodiments of the present disclosure may be configured to operate.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other solutions. Other embodiments may be utilized and changes may be made to the disclosed embodiments without departing from the scope of the disclosure. The following detailed description is not to be taken in a limiting sense, and the scope of the present disclosure is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Example Context

Systems, devices, and methods are described for scheduling radio frequency (RF) spectrum at a base station (BS) for one or more user equipment (UEs). The scheduling may take into consideration other BSs that may be communicating with other UEs. Accordingly, the BS may share spectrum with the other BSs in an efficient manner. For example, the BS may schedule spectrum for UEs with which it is communicating in a manner that may allow for efficient sharing of the spectrum by the other BSs. Further, the spectrum sharing may not utilize coordination among the BS and the other BSs. In some embodiments, sharing may be based at least in part on non-cooperative game theory, e.g., the distributed scheduling problem may be formulated as a non-cooperative game where each BS is a player attempting to optimize its own utility. In other embodiments, sharing may be based on Q-learning e.g., a model-free off-policy learning algorithm for estimating the optimal action-state values for each action-state pair. The sharing may involve sensing interference at one or more UEs. Various embodiments may relate generally to systems and/or methods that may be implemented at one or more BSs to improve spectrum sharing. Further, various embodiments may relate to an algorithm that may be implemented at two or more BSs to allow the two or more BSs to share spectrum without coordination between the two or more BSs. Further, various embodiments may relate to an algorithm that may be implemented at two or more BSs to allow the two or more BSs to share spectrum with less coordination between the two or more BSs than is required by other techniques for spectrum sharing.

As an example, various embodiments may be implemented in a $5^{th}$ generation (5G) wireless network. 5G wireless technologies and protocols may include several advances over other wireless technologies and protocols. Among the advances provided by 5G technologies and protocols are: the use of different frequency bands (e.g., unlicensed frequency bands including, e.g., millimeter wave frequencies), the opportunity for additional (e.g., non-traditional) entities to operate base stations, and beamforming at base stations.

Millimeter wave (mmWave) frequencies generally refer to high frequency signals having wavelengths on the order of millimeters (mm). The mmWave frequency spectrum may include a band above 24 GHz. For example, the mmWave frequency spectrum includes bands between 24 GHz and 100 GHz, 24 GHz and 300 GHz, 30 GHZ and 300 GHz, or any other combination of frequencies including a range above 24 GHz. Notwithstanding the applicability of some embodiments of the present disclosure to mmWave frequencies, embodiments of the present disclosure are not limited to mmWave frequencies. Rather, some embodiments of the present disclosure may be used in any RF frequency range.

Increasing demands for higher data rates and the availability of wide bandwidth at higher frequency spectrums makes mmWave communication attractive for next generation wireless systems. MmWave communication may be used in, for example, multi-Gigabit wireless local area networks (WLANs), wireless displays, cable-free connections, and virtual-reality devices, to name a few. The current 60 GHz WLAN Institute of Electrical and Electronics Engineers (IEEE) standard 802.1 lad and some standards, such as IEEE 802.1 lay and 5G new radio (NR) for cellular networks, use mmWave communication.

With the proliferation of mmWave wireless communication, large amounts of data is, and will continue to be, transmitted wirelessly. In part because of the proliferation of mmWave wireless communication, efficient sharing of spectrum may become increasingly important. For example, a BS may be configured to schedule portions of a spectrum for use by separate UEs with which the BS is communicating. In the present disclosure, the term "spectrum" may refer to a resource for transmitting and receiving wireless data. For example, "spectrum" may refer to a frequency range that may be divided into frequency bands, e.g., using frequency division multiple access (FDMA). As another example, "spectrum" may, additionally or alternatively, refer to a time duration that may be divided into time slots, e.g., using time division multiple access (TDMA). As another example, "spectrum" may, additionally or alternatively, refer to subcarriers that may be assigned to transmitters, e.g., using orthogonal frequency division multiple access (OFDMA). In the present disclosure the term "scheduling" may refer to allocating spectrum to a UE. Scheduling may include notifying the UE of its allocated spectrum.

Additionally, 5G technologies and protocols may lower the barriers-to-entry for operators of BSs, enabling additional (e.g., non-traditional) entities to operate BSs. This may result in more densely-packed BSs in some areas, e.g., cities. Densely-packed BSs may benefit from sharing high frequency spectrum (e.g., mmWave frequencies).

With a potential increase in the number of BSs in a communication environment, it may be advantageous for the multiple BSs to be able to schedule spectrum for UEs with which they are communication while avoiding interference from other BSs communicating with other UEs. Accordingly, it may be advantageous to schedule spectrum between UEs taking into account other BSs and other UEs. Further, it may be advantageous to consider spectrum scheduling that may be occurring at neighboring BSs. Moreover, because multiple different operators may be operating neighboring BSs, systems and/or methods (e.g., algorithms for scheduling spectrum) that minimize or eliminate the need for coordination between the different operators may be desirable.

Additionally, 5G technologies and protocols may include and/or allow for beamforming at BSs. Beamforming at BSs may allow for beam-based spectrum sharing. For example, a BS may schedule the same time slots, frequencies, and/or sub-carriers to a number of UEs that are each on a separate beam. For example, the BS may identify 10-degree-wide beam sectors in azimuth and schedule spectrum on a per-beam basis.

Various Embodiments

Various embodiments of the disclosure are related to scheduling spectrum for UEs at a BS. At least some embodiments may operate on the assumption that neighboring BSs may also schedule the same spectrum with other UEs with which the neighboring BSs are communicating. Further, some embodiments may operate on the assumption that neighboring BSs may also employ the same method to schedule spectrum.

Various embodiments disclosed herein may provide improvements over conventional methods of governing spectrum scheduling at a BS. For example, various embodiments may decrease interference at UEs from neighboring BSs (e.g., by decreasing the chances that neighboring BSs are scheduling the same spectrum to devices that will be subject to interference from each other). Further, various embodiments may provide improvements over a centralized scheduling system, e.g., a Spectrum Access Server (SAS). For example, employing examples of embodiments (e.g., an algorithm) independently at a number of BSs may be an improvement over an SAS managing sharing at the number of BSs at least because the SAS may be a performance bottleneck, a single point of failure, and/or a security risk, whereas various embodiments of the present disclosure may avoid at least some of these drawbacks e.g., by allowing BSs to operate independent of an SAS.

As will be described more fully herein, various embodiments of the present disclosure include devices, systems, methods, approaches, algorithms, and/or examples described herein. The term "approach" may describe aspects of one or more embodiments.

Various embodiments may be developed and/or implemented via employing a Lyapunov Stochastic framework, identifying constraints under which a system is to operate, modeling an RF channel in which the system (e.g., including two or more BSs) is to operate, defining equations or inequalities to be solved, and/or generating solutions.

Some embodiments may use or apply game theory. For example, at least some embodiments may apply non-cooperative game theory schedule spectrum.

Other embodiments may use or apply Q-learning. For example, at least some embodiments may apply Q-learning to schedule spectrum.

Further, some embodiments may include channel sensing. For example, UEs may be instructed to act as sensors in a channel sensing protocol. More specifically, for example, a UE may detect interference at a portion of the spectrum, and report the interference to a BS with which the UE is attempting to communicate. Further, the channel sensing at the UE may be directional. The BS may schedule spectrum according to the noise levels reported by UEs. The spectrum sharing may take beams into account. Further, other BSs may listen to interference reports from UEs with which they are not communicating and schedule or not schedule spectrum accordingly.

Additionally or alternatively, various embodiments of the present disclosure include efficient distributed scheduling algorithms to maximize the network utility. Network utility may be a function of the achieved throughput by the UEs, subject to the average and instantaneous power consumption constraints of the BSs. Embodiments may include a Media Access Control (MAC) and a power allocation/adaptation mechanism utilizing the Lyapunov stochastic optimization framework and non-cooperative games. In particular, the original utility maximization problem was decomposed into two sub-optimization problems for each time frame, which are a convex optimization problem and a non-convex optimization problem, respectively. By formulating the distributed scheduling problem as a non-cooperative game where each BS is a player attempting to optimize its own utility, a distributed solution to the non-convex sub-optimization problem was provided via finding the Nash Equilibrium (NE) of the game whose weights are determined optimally by the Lyapunov optimization framework.

Additionally, in some situations a non-cooperative game based approach may be used to efficiently share spectrum. There are advantages of and/or conditions in which non-cooperative game based approach may be advantageous. For example, embodiments including principles of a non-cooperative game-based approach can converge faster but with a decreased optimal value compared to that achieved by the p-persistent based MAC scheme. Additionally, there are advantages of and/or conditions in which a p-persistent MAC-based scheme may be advantageous. Some embodiments may include observing conditions (e.g., a volume of interference) at a BS and determining whether to employ (at the BS) sharing based on a non-cooperative game-based approach or to employ sharing based on a p-persistent MAC-based scheme. Further, an algorithm that includes aspects of the non-cooperative game-based approach and the p-persistent MAC-based scheme may be used to efficiently share spectrum. Some embodiments may include determining to employ sharing based on the algorithm that includes aspects of the non-cooperative game-based approach and the p-persistent MAC-based scheme.

Additionally or alternatively, an improved carrier-sensing protocol may be employed (e.g., as part of an algorithm) in one or more embodiments. The improved carrier-sensing protocol may be used for distributed, interference management in a millimeter wave cellular network where spectrum and base station sites are shared by multiple operators that do not coordinate among themselves. The carrier-sensing protocol may include causing one or more UEs to measure interference and report the interference to a BS with which the UEs are communicating. Further, the UEs may measure interference directionally and report interference with accompanying directional information. Further, BSs may listen for reports from UEs, even UEs with which they are not communicating. BSs that receive interference reports from UEs with which they are not communicating can make scheduling determinations based on the interference reports. For example, a BS may receive an interference report that may indicate that a UE may be communicating or be initiating communications using a particular portion of the spectrum. The BS may avoid scheduling that spectrum, or may avoid scheduling that spectrum at or near the beam from which the interference report was received.

The improved carrier-sensing protocol may be advantageous in situations in which BSs are collocated. For example, a UE may be able to report interference to a BS that was observed at the UE that originates from the location of the BS, but to which the BS is blind. For example, two or more BSs may be collocated (e.g., sharing a tower). Each of the BSs may generate signals that are interference from the perspective of the others of the BSs. Each of the BSs may be blind to the interference from the others of the BSs. However, a UE may observe the interference and may report the interference to one or more of the BSs.

Additionally or alternatively, various embodiments relate to distributed downlink beam scheduling and power allocation for millimeter-Wave (mmWave) cellular networks where multiple base stations (BSs) belonging to different service operators share the same unlicensed spectrum with no central coordination or cooperation among them. Various embodiments include efficient distributed beam scheduling and power allocation algorithms such that the network-level payoff, defined as the weighted sum of the total throughput and a power penalization term, can be maximized. Various embodiments include a distributed scheduling approach to power allocation and adaptation for efficient interference management over the shared spectrum by modeling each BS as an independent Q-learning agent. As a baseline, the approach is compared to the non-cooperative game-based approach also described herein that addressed, among other things, the same problem. Extensive experiments were conducted under various scenarios to verify the effect of multiple factors on the performance of both approaches. Experiment results show that the approach adapts well to different interference situations by learning from experience and can achieve higher payoff than the game-based approach. The approach can also be integrated into a Lyapunov stochastic optimization framework for the purpose of network utility maximization with optimality guarantee. As a result, the weights in the payoff function can be automatically and optimally determined by the virtual queue values from the sub-problems derived from the Lyapunov optimization framework.

General Examples

Embodiments of the present disclosure are now explained with reference to the accompanying drawings.

FIG. 1 illustrates an example environment 100, including BSs and UEs, in which one or more embodiments of the present disclosure may be configured to operate. In particular, environment 100 includes BS 102, BS 104, BS 106, UE 108, UE 110, and UE 112.

FIG. 1 also illustrates a range of each of the BSs as a dashed-line circle surrounding each of BS 102, BS 104, and BS 106 respectively. As can be seen in FIG. 1, one or more UEs may be within range of two or more BS. For example, UE 108 is in range of BS 104 and BS 106. In such a case, UE 108 may be communicating with (e.g., transmitting signals to and/or receiving signals from) one of the BSs (e.g., BS 104) and not the other (e.g., BS 106). In such a case, transmissions from the other BS (e.g., BS 106) may be interference with regard to the communications between the UE (e.g., UE 108) and the BS (e.g., BS 104). Additionally, transmissions from other UEs (e.g., UE 112) may be interference with regard to the communications between the UE (e.g., UE 108) and the BS (e.g., BS 104). Although not explicitly illustrated in FIG. 1, in some cases, two BSs may be collocated. For example, two BSs may share the same tower. In such cases, one or more UEs may be in range of both BSs as described herein.

According to some embodiments, spectrum sharing between UEs in communication with a BS that takes into account communications between other BSs and other UEs may decrease interference which may improve communications (when considered in aggregate) between the UEs and the BS. As a specific example, BS 104 may schedule spectrum (e.g., a frequency band, time slots, and/or subcarriers) for UE 108 that is different from spectrum that is being used by UE 112. This may be the case even when UE 112 is not in communication with BS 104 (e.g., when UE 112 is in communication with BS 102).

Various embodiments (e.g., an algorithm and/or a BS) described in the present disclosure may be employed at or include one or more of BS 102, BS 104, and BS 106. In some embodiments, a BS may be configured to operate under the assumption that there may be other BSs operating nearby, e.g., such that UEs may receive signals from the BS and the other BSs. In some embodiments, a BS may be configured to operate under the assumption that the other BSs may be scheduling spectrum (e.g., the same spectrum that the BS is scheduling). In some embodiments, a BS may be configured to operate under the assumption that the other BSs may be employing the same or similar scheduling algorithm. In these or other embodiments, a BS may be configured to instruct one or more UEs to measure interference and the BS may be configured to schedule, or not schedule, spectrum for use in communication with one or more UEs with which it is communicating based on the interference measured at the UEs (e.g., without relying on assumptions about other BSs or the operations of other BSs).

In some cases, the aggregate quality of all communications within environment 100 may be increased by one or more of the BSs employing various embodiments of the disclosure (e.g., an algorithm). In other words, one or more of the BSs in an environment employing various embodiments may result in improved communications (when considered in aggregate) than a case in which none of the BSs in the environment employ the embodiments. Further, if all of the BSs in an environment employ the embodiments (e.g., the algorithm), the result may be improved communications compared to a case in which fewer than all of the BSs in an environment employ the embodiments. The improvements to the communications may include decreased interference, and/or decreased chances of interference, increased usage of the spectrum while providing for sharing of the spectrum, power savings, and/or more secure communications (e.g., by not relying on a single point of the communication network).

In some embodiments, a BS may be configured to schedule spectrum with UEs with which it is communicating according to varying degrees of concern for other UEs. For example, in a situation involving a low degree of interference from other BSs, a BS may be configured to schedule spectrum with UEs with which it is communicating with little or no regard for the other BSs e.g., a low degree of concern for other BSs and/or UEs. In another situation involving a high degree of interference (e.g., from other BSs), the BS may be configured to schedule spectrum with UEs with which it is communicating with a high degree of concern for the other BSs and/or UEs. Various embodiments may include determining to what degree of concern for other BSs a BS should operate. Further, some embodiments may include operating according to such a determination. As an example, a BS may be configured to operate according to a p-persistent MAC-based scheme when operating with a low degree of concern for other BSs and the BS may be configured to operate according to a non-cooperative game based approach when operating with a high degree of concern for other BSs.

In some embodiments, a BS may determine whether to service a UE. For example, a BS may receive a message from a UE. The BS may determine a degree of interference (e.g., based on content of the message, based on observed interference at the BS, and/or based on content of other messages from other UEs). The BS may determine whether to service the UE based on the determined interference. For example, the BS may determine to service or not to service the UE. Servicing the UE may include scheduling spectrum for the UE and not servicing the UE may include determining not to schedule spectrum for the UE. Not scheduling spectrum for the UE may improve communications in aggregate of the RF communication network e.g., by allowing the BS to allocate power to other communications and/or by not adding additional communications that would be interference relative to the other UEs and BSs communicating on the RF network. Further, in some embodiments, determining whether to service a UE may include determining an amount of power to allocate for communication with the UE. These or other embodiments may find application in shared or unlicensed spectrum.

In some embodiments, a BS may schedule spectrum for a UE based at least in part on: a signal-to-interference-and-noise ratio (SINR) of a signal received from the UE, a transmission power constraint of the BS, and information regarding past usage of the spectrum. The SINR of the signal may be indicative of interference relative to the signal. The transmission power of the BS may include an instantaneous transmission power constraint and a statistical power constraint (e.g., an average power constraint, a mean power constraint, and/or a total-power-over-time constraint). The past usage may be relative to usage by the user equipment. In some embodiments, the BS may determine to not service the user equipment based on the user equipment having past usage that exceeds a threshold. Additionally or alternatively, the BS may determine to service the user equipment based on the user equipment not having used spectrum in the recent past.

In some embodiments, the BS may be configured to schedule spectrum based at least in part on any of the following, (e.g., one at a time): non-cooperative game theory, Q-learning, a contention-based protocol (e.g., carrier-sense multiple access/collision avoidance (CSMA/CA)), or a p-persistent protocol. Some embodiments may be configured to determine on which protocol to base scheduling at a given time.

In some embodiments, communications between the BSs may not be required. For example, BS 106 may not need to communicate with BS 104 (e.g., regarding spectrum sharing between BS 104 and UE 108) and/or BS 106 may not need to communicate with BS 102 (e.g., regarding spectrums sharing between BS 102 and UE 112). Despite BS 106 not being in communication with BS 102 and/or BS 104, the embodiments may improve aggregate communications within environment 100.

In some embodiments, one or more of the UEs may be configured to sense interference and provide information regarding the interference to a BS. For example, UE 108 may sense interference (e.g., interference caused by communications between UE 112 and BS 102) and transmit information regarding the interference to BS 104 (with which UE 108 is communicating or establishing communications). The information regarding the interference may relate to the spectrum (e.g., which frequency bands and/or time slots have high and/or low degrees of interference).

BSs may be configured to schedule spectrum (e.g., allocate frequency bands and/or time slots to UEs) based on the information received from the UEs. For example, BS 104 may allocate spectrum to UE 108 based, at least in part, on the interference sensed by UE 108. For example, a degree of concern for other BSs may be determined based on a volume of interference detected at a UE. For example, if a UE detects a high degree of interference, a BS with which the UE is communicating may determine that a high degree of concern for other BSs should be implemented and may implement the high degree of concern accordingly. As another example, if the UE detects a low degree of interference, the BS with which it is communicating may determine that a low degree of concern is appropriate and may implement the low degree of concern accordingly.

Additionally, BSs may be configured to schedule spectrum based on beams. For example, if UE 108 provided information indicating a high degree of interference at a particular frequency band, BS 104 may not allocate that frequency band to UEs that are near (e.g., in beam space) to UE 108. However, BS 104 may allocate that frequency band to UEs that are not near (e.g., in beam space) to UE 108. As an example, if UE 112 is communicating with BS 102, and UE 112 indicates a high degree of interference at a particular frequency band to BS 102 (e.g., as a result of communications between UE 108 and BS 104), BS 102 may allocate that frequency band to UE 110 and not to UE 112.

Additionally, BSs may be configured to schedule spectrum based on interference reports or other communications from UEs with which they are communicating. For example, a BS may measure a volume of interference by measuring signals from all UEs with which it is communicating and may schedule spectrum for UEs based on the volume of interference (e.g., the BS may determine a degree of concern for the other BSs based on the volume of interference).

Figure 2:
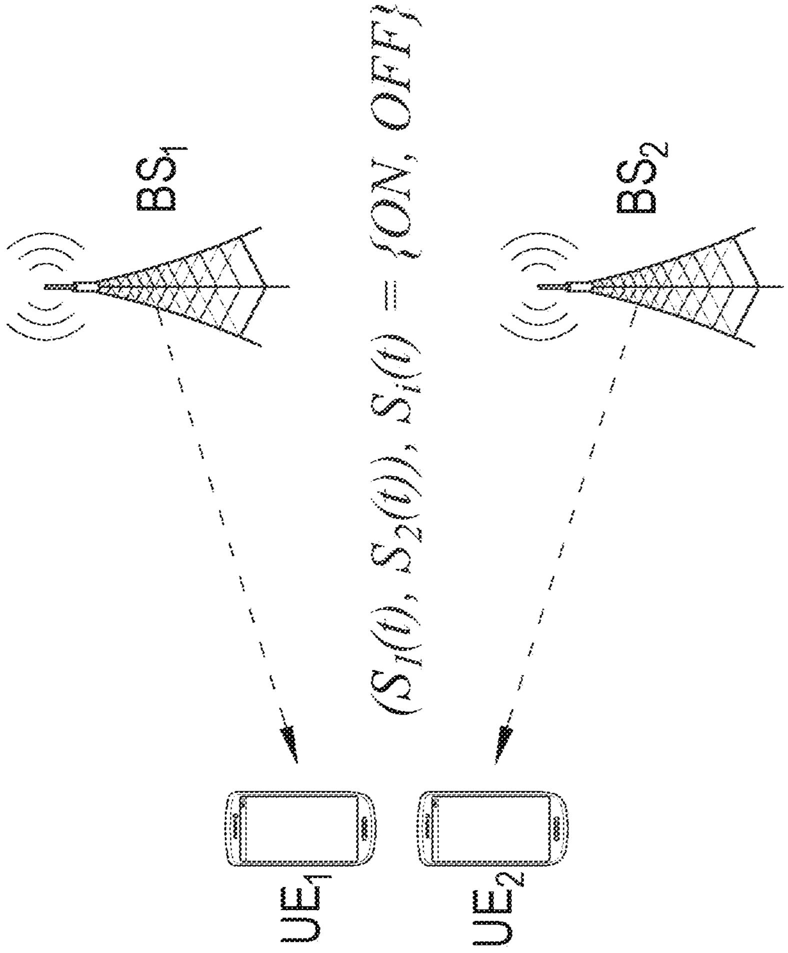
FIG. 2 illustrates an example model for Lyapunov Stochastic optimization according to one or more embodiments of the present disclosure.

FIG. 2 illustrates an example model for Lyapunov Stochastic optimization according to one or more embodiments. For 5G NR with mmWave, a UE and a BS may perform a beam selection process. Once an active RF connection is made (e.g., radio resource control (RRC) connected state), between the UE and the BS, various parameters may be configured to identify regimes when beams for shared spectrum may be scheduled based on detecting presence of beams from other BSs. Various embodiments of the present disclosure may be based, at least in part, on UE beam tracking of the shared spectrum, and may include scheduling beams from the BSs to UEs.

Consider, for example, a downlink channel with two BSs (e.g., BS1 and BS2) and two UEs (e.g., UE1 and UE2). The channel condition can be modeled at the medium access control (MAC) layer as a specific "ON-OFF" channel, where the channel states are measured by a channel state vector (S1(t),S2(t)). In particular, S1(t)="OFF" means that channel from BS1 to UE1 is unavailable, and S1(t)="ON" means that channel from BS1 to UE1 is available (if the other channel state is "OFF"). Note that based on a signal-to-interference-plus noise ratio (SINR) distribution using stochastic geometry, a threshold for SINR can be set to indicate whether the channel is "ON" or "OFF." In addition, when (S1(t),S2(t)) =(ON,ON), the two beams are overlapped. If the channel can be determined to be in this state (i.e., with two beams overlapped) with UE measurements, it may be possible to let each BS use a distributed MAC layer scheduling scheme applying Lyapunov Stochastic optimization framework to transform (S1(t),S2(t))=(ON,ON) to (S1(t),S2(t))=(ON, OFF) or (S1(t),S2(t))=(OFF,ON). This system is equivalent to a "two-queue two-server" system in which various embodiments of the present disclosure may be able to improve system-wide communications.

To further illustrate, an example with the goal of average power minimization follows. Assume channel condition vectors with M base stations (S1(t) . . . (t)) are ergodic, and assume the instantaneous rate of user l to be rl(t,pl) bits/time slot, where pl is the power consumption of user l. Moreover, let (t) be the action space consisting of the actions (t) of user l given the channel state (S1(t) . . . SM(t)). In particular, (t) is the decision to transmit power of base station l. For the purpose of illustration, the stochastic optimization problem may be formulated to minimize the sum of the average power consumption subject to average throughput constraints as follows:

$$\text{minimize } \overline{y}0 = \frac{1}{M}\sum_{l=1}^{M}\overline{p}_l; \tag{1}$$

$$\text{subject to: } r_l \geq r_l,\ l = 1 \ldots M; \text{ and} \tag{2}$$

$$\{\alpha_1(t) \ldots \alpha_M(t)\} \in \mathcal{A}_S(t)\}; \tag{3}$$

wherein the average data rate is:

$$r_l = \lim_{t\to\infty}\frac{1}{r}\Sigma_{\tau=1}^{t}\mathbb{E}[r_l(t)]; \tag{4}$$

and the average power consumption is:

$$p_l = \lim_{t\to\infty}\frac{1}{t}\Sigma_{\tau=1}^{t}\mathbb{E}[p_l(t)]; \tag{5}$$

which is minimized in equation (1).

The average per user throughput constraints in equation (2) can be predefined, and according to equation (3), actions (t) of user l may be taken from the action space (t). To solve this problem, the Lyapunov Stochastic optimization framework may be adopted. A virtual queue may be defined as:

$$Z_l(t+1) = \max(Z_l(t) + r_l - r_l(t), 0). \tag{6}$$

The Lyapunov function may be defined as:

$$L(t) = \frac{1}{M}\Sigma_{l=1}^{M} Z_l(t). \tag{7}$$

The Lyapunov drift may be defined as:

$$\Delta(t) = L(t+1) - L(t); \tag{8}$$

and the following result can be shown:

$$\mathbb{E}[\Delta(t) \mid Z(t)] + V\mathbb{E}\left[\sum_{l=1}^{M} p_l(t)|Z(t)\right] \leq B + V\mathbb{E}\left[\sum_{l=1}^{M} p_l(t)|Z(t)\right] + \sum_{l=1}^{M} Z_l(t)\mathbb{E}[r_l - r_l(t)|Z(t)]; \tag{9}$$

wherein B is a constant and V is a control parameter that will be discussed below.

It can be shown that minimizing the upper bound (right hand side) in equation (9) is sufficient to find an improved (e.g., the optimal) scheduling policy. Hence, the following optimization problem at each time slot may be solved as:

$$\text{minimize } V\sum_{l=1}^{M} p_l(t) + \sum_{l=1}^{M} Z_l(t)(r_l - r_l(t)); \tag{10}$$

$$\text{subject to: } \{\alpha_1(t) \ldots (t)\} \in \mathcal{AS}. \tag{11}$$

It can be seen that the optimization problem of equations (1) and (10) may result in a distributed algorithm and/or distributed system, where user l may find a policy αl(t) to minimize $Vp_l(t)+Z_l(t)(r_l-r_l(t))$ and then update the virtual queue using equation (6).

Figure 3:
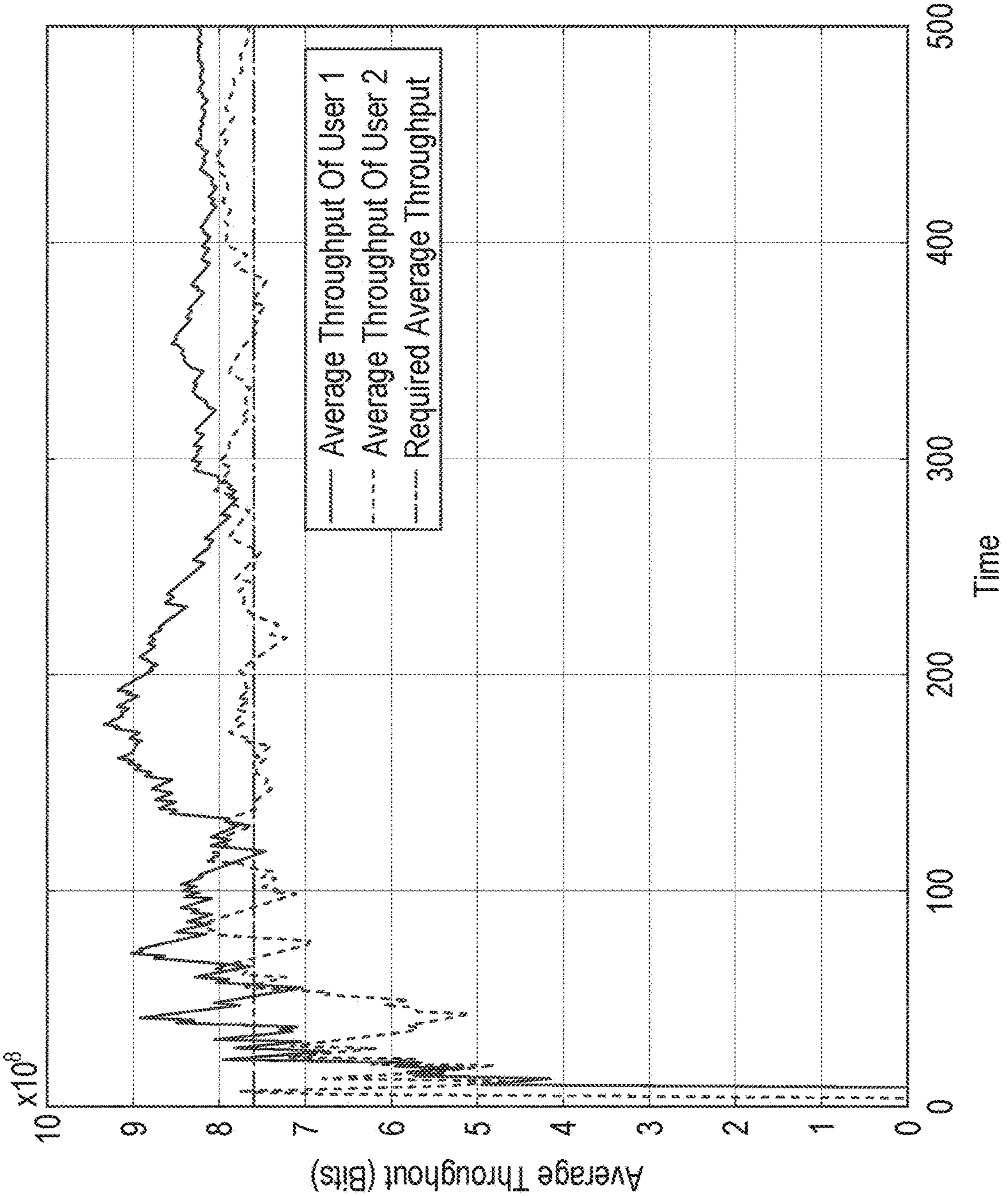
FIG. 3 illustrates simulated performance according to one or more embodiments of the present disclosure.
Figure 4:
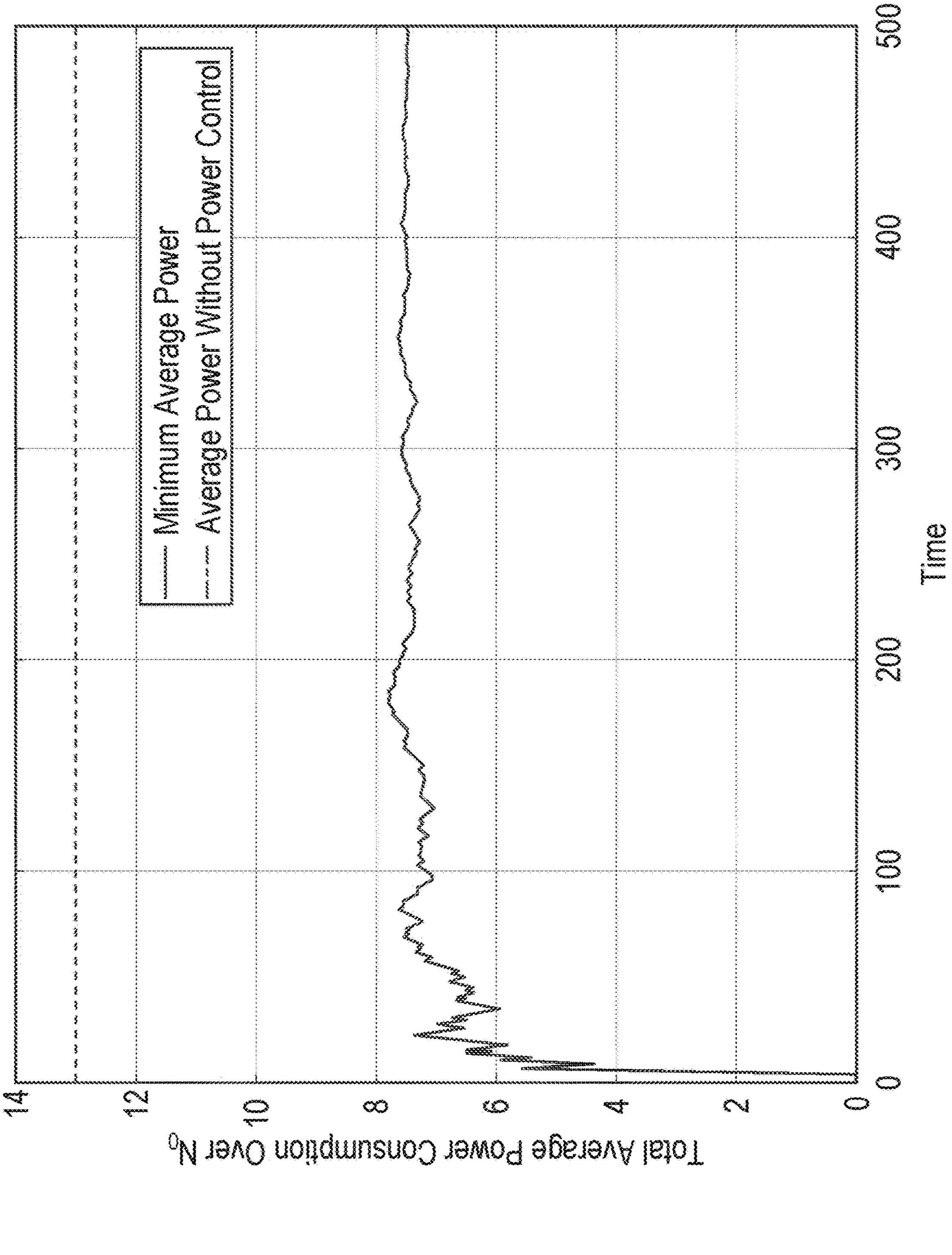
FIG. 4 illustrates simulated performance according to one or more embodiments of the present disclosure.

FIGS. 3 and 4 illustrate simulated performance of a system including two users according to one or more embodiments of the present disclosure. As shown in FIG. 3, the average throughput of both users converges to the rate above the constraint (760 Mbits/second) in equation (4). Moreover, FIG. 4 shows the achieved average power of a system employing various embodiments of the disclosure (solid curve in FIG. 4), which is much less than the average power of a conventional system (dashed curve in FIG. 4).

Beyond this simplified example, in practice, under the Lyapunov optimization framework, it is possible to consider more complex, realistic and accurate channel model and network topologies. First, more realistic and accurate channel state information (e.g., RTT (Round Trip Time) and RSSI (Received Signal Strength Indicator)) may be incorporated into the problem formulation, where the Lyapunov optimization framework can effectively transform the original problem to a set of optimization problems (e.g., convex or combinatorial). In this case, a challenge is to efficiently solve the transformed optimization problems. Second, networking impact such as queueing effect, congestion controls, fairness consideration, user-base station association and handoffs (e.g., communication and/or service) may be considered. Third, if some statistics of the system are available, the statistics may be incorporated into the mathematical tools from Markov Decision Processes (MDP) or reinforcement learning into the Lyapunov Stochastic optimization framework to design different network control policies operating in different time scales (user association policy and user admission policy). Further, tradeoffs between the optimality and the convergence speed may be evaluated. If the Lyapunov optimization framework is applied directly, it can be proved mathematically that a (O(V), O(1/V)) tradeoff can be guaranteed, which means that if a slackness of O(1/V) is allowed, the convergence speed is O(V). This tradeoff may be improved by applying the momentum approach used for gradient descent or other methods to effectively change the updating rate based on the current and the past observations.

Figure 5:
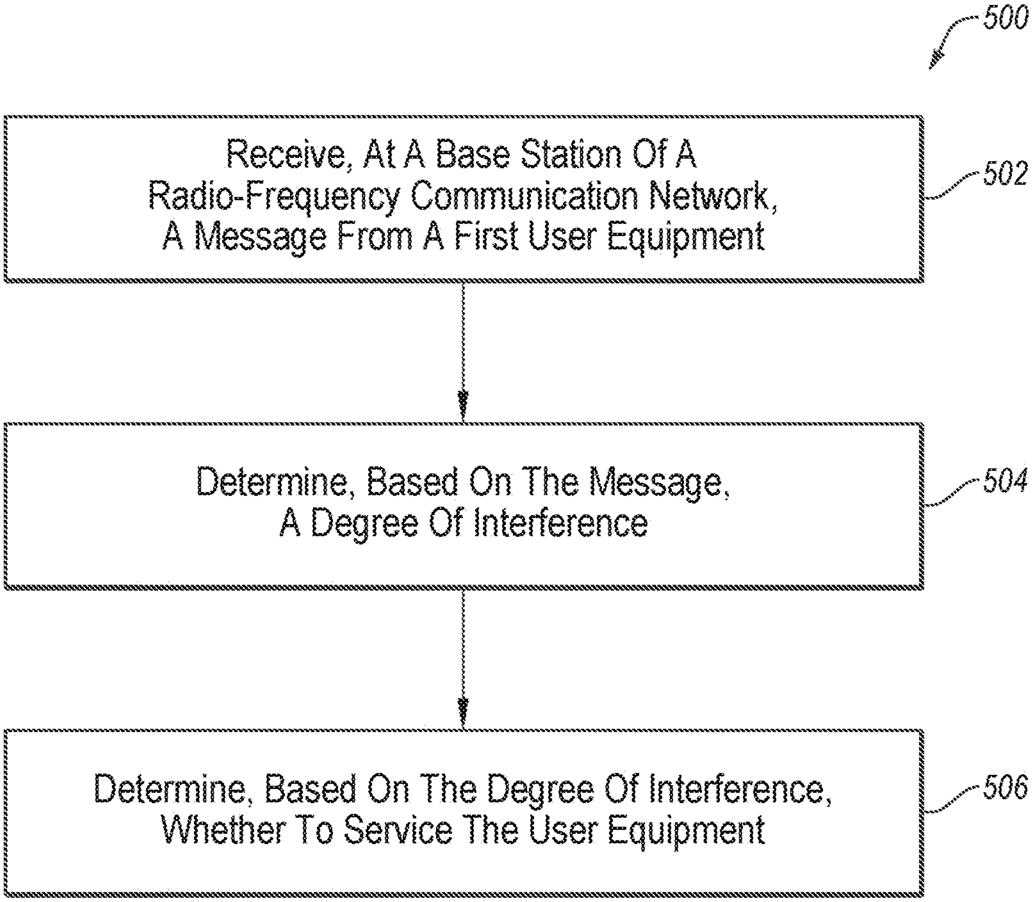
FIG. 5 is a flowchart of an example method, in accordance with various embodiments of the present disclosure.

FIG. 5 is a flowchart of an example method, in accordance with various examples of the disclosure. At least a portion of method 500 may be performed, in some examples, by or at a device or system, such as BS 102, BS 104, and/or BS 106 of system of 100 of FIG. 1, or another device or system. Although illustrated as discrete blocks, various blocks may be divided into additional blocks, combined into fewer blocks, or eliminated, depending on the desired implementation.

At block 502, a message from a first user equipment may be received at a base station of a radio-frequency communication network. As an example, a message from UE 112 of FIG. 1 may be received at BS 104 of FIG. 1.

In some cases, the message may be a transmission utilizing unlicensed spectrum. In some embodiments, the message may include an indication of interference observed by the user equipment.

At block 504, a degree of interference may be determined based on the message. For example, in some embodiments, the message may indicate interference observed by the user equipment. In some embodiments, at the base station, a total degree of interference may be determined based at least in part on the message. Additionally or alternatively, at the base station a degree of interference relative to the beam from which the message was received may be determined. Additionally or alternatively, a degree of interference relative to spectrum utilized by the message may be determined.

At block 506, a determination may be made relative to whether to service the user equipment. The determination may be based on the determined degree of interference. As an example, BS 104 may determine whether to service UE 112.

Servicing the user equipment may include scheduling spectrum for communication with the base station. Further, determining to service the user equipment may include determining an amount of power to allocate for communication with the user equipment. In cases in which the message of block 502 utilizes unlicensed spectrum, determining to service the user equipment may include determining to communicate with the user equipment using the unlicensed spectrum. Determining to service the user equipment may include determining to service the user equipment at a beam from which the message was received. For example, BS 102 may receive a message from UE 112 from a first angular direction. BS 102 may schedule spectrum at a beam for UE 112 based at least in part on the message and the angular direction from which the message was received.

In some embodiments, determining to service the user equipment may be based at least in part on any of the following, (e.g., one at a time): non-cooperative game theory, Q-learning, a contention-based protocol, or a p-persistent protocol. Some embodiments may include determining on which protocol to base scheduling at a given time.

Determining not to schedule the spectrum may include determining not to communicate with the user equipment or not to communicate with the user equipment using spectrum of the message. Based on a determination to not service the user equipment, the base station may have appropriate power available to allocate to communication with other user equipment. In the present disclosure, the term "appropriate power" may refer to power allocated to a user equipment according an application of method 500. For example, in response to a determination not to service a particular UE, e.g., UE 112, BS 102 may have additional power that may be allocated, according to method 500 to communication with other UEs. In other words, in response to determining not to service UE 112, BS 102 may perform one or more portions of method 500 relative to one or more other UEs. As part of performing one or more portions of method 500, appropriate power (which may include power that may have otherwise been allocated to communicate with UE 112) may be allocated to the one or more other UEs.

Figure 6:
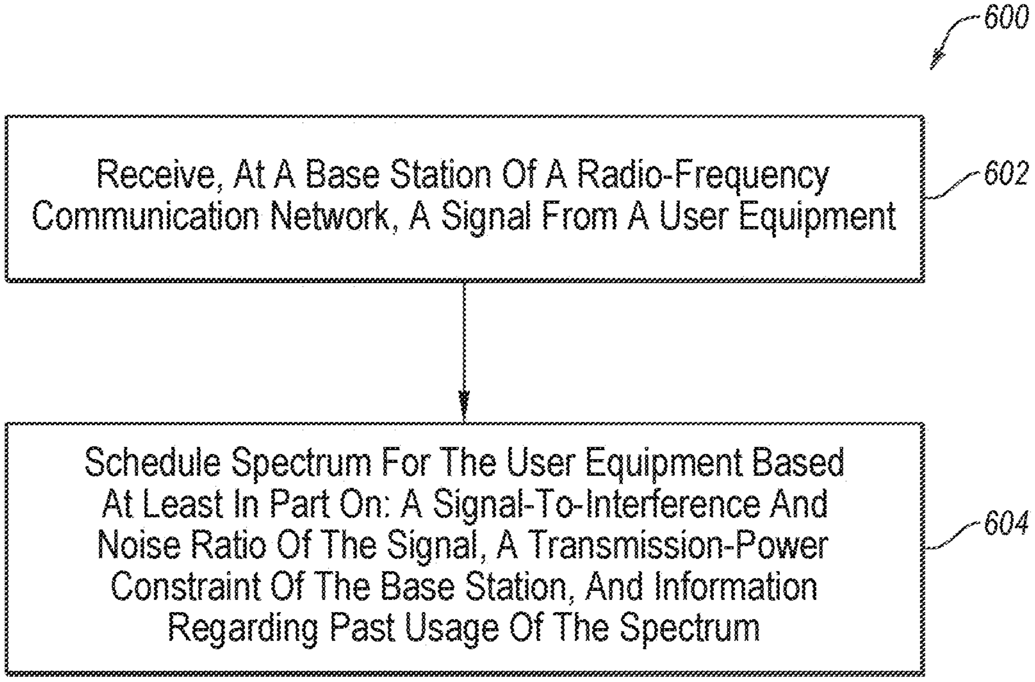
FIG. 6 is a flowchart of another example method, in accordance with various embodiments of the present disclosure.

FIG. 6 is a flowchart of another example method, in accordance with various examples of the disclosure. At least a portion of method 600 may be performed, in some examples, by a device or system such as BS 102, BS 104, and/or BS 106 of system of 100 of FIG. 1, or another device or system. Although illustrated as discrete blocks, various blocks may be divided into additional blocks, combined into fewer blocks, or eliminated, depending on the desired implementation.

At block 602, a signal from a user equipment may be received at a base station of a radio-frequency communication network. As an example, a message from UE 112 of FIG. 1 may be received at BS 104 of FIG. 1.

At block 604, spectrum may be scheduled for the user equipment based at least in part on: a signal-to-interference and noise ratio (SINR) of the signal, a transmission-power constraint of the base station, and information regarding past usage of the spectrum. Continuing the example, BS 104 may schedule spectrum for UE 112 of FIG. 1 based on the message received from UE 112.

The SINR of the signal may be indicative of interference relative to the signal. The transmission power of the BS may include an instantaneous transmission power constraint and a statistical power constraint (e.g., an average power constraint, a mean power constraint, and/or a total-power-over-time constraint). The past usage may be relative to usage by the user equipment. In some embodiments, the base station may determine to not service the user equipment based on the user equipment having past usage that exceeds a threshold. Additionally or alternatively, the base station may determine to service the user equipment based on the user equipment not having used spectrum in the recent past.

In these or other embodiments, the scheduling of the spectrum at block 604 may be based at least in part on any of the following, (e.g., one at a time): non-cooperative game theory, Q-learning, a contention-based protocol, or a p-persistent protocol. Some embodiments may include determining on which protocol to base scheduling at a given time. In these or other embodiments, the scheduling of the spectrum at block 604 may be performed based at least in part on an application of a Lyapunov framework.

In some embodiments, the spectrum utilized by the message may be unlicensed. In these embodiments, the spectrum scheduled for the user equipment may be the unlicensed spectrum.

In some embodiments, method 600 may include determining that an other base station of the radio-frequency communication network is scheduling the spectrum for communication with an other user equipment. Determining that other base station is scheduling the spectrum may include determining a volume of interference of the spectrum. In some embodiments, method 600 may include scheduling the spectrum for the user equipment based on determining the scheduling of the spectrum by the other base stations to improve aggregate spectrum utilization between the base station and the user equipment and between the other base station and the other user equipment. For example, the base station may schedule the spectrum according to a degree of concern for other communications ongoing in the radio-frequency communication network.

In some embodiments, the scheduling of the spectrum at block 604 may be performed without coordinating with a spectrum-coordination system (e.g., a Spectrum Access Server) or the other base station.

In some embodiments, scheduling spectrum for the user equipment may include scheduling a beam from which the message was received for the user equipment. For example, BS 102 may receive a message from UE 112 from a first angular direction. BS 102 may schedule spectrum at a beam for UE 112 based at least in part on the message and the angular direction from which the message was received.

Modifications, additions, or omissions may be made to any of method 500 of FIG. 5 and/or method 600 of FIG. 6 without departing from the scope of the present disclosure. For example, the operations of method 500 and/or method 600 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 7:
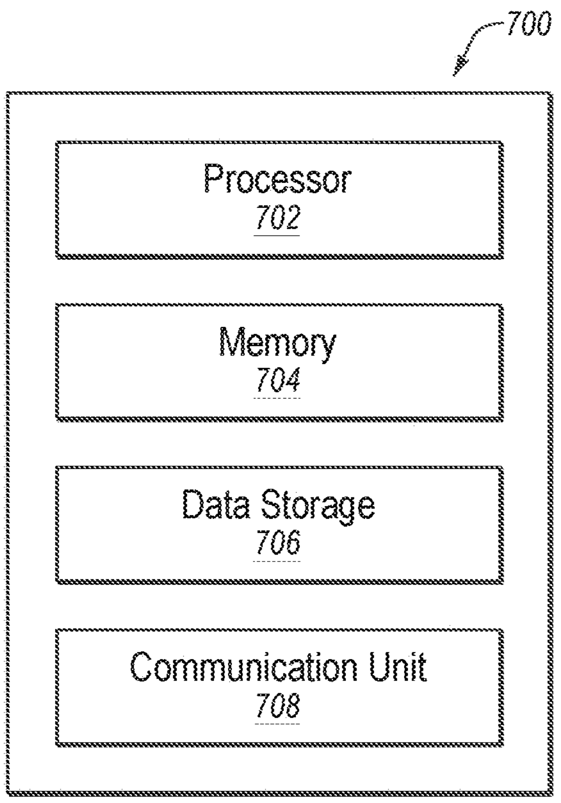
FIG. 7 illustrates an example system which may be configured to operate according to one or more embodiments of the present disclosure.

FIG. 7 is a block diagram of an example system 700 which may be configured according to at least one embodiment described in the present disclosure. As illustrated in FIG. 7, system 700 may include a processor 702, a memory 704, a data storage 706, and a communication unit 708. One or more of BS 102, BS 104, and BS 106 of FIG. 1 and BS1 and BS2 of FIG. 2 may be or include an instance of system 700. System 700 may be configured to implement one or more of method 500 of FIG. 5, method 600 of FIG. 6, and/or system 700 of FIG. 7.

Generally, processor 702 may include any suitable special-purpose or general-purpose computer, computing entity, or processing device including various computer hardware or software modules and may be configured to execute instructions stored on any applicable computer-readable storage media. For example, processor 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, it is understood that processor 702 may include any number of processors. In some embodiments, processor 702 may interpret and/or execute program instructions and/or process data stored in memory 704, data storage 706, or memory 704 and data storage 706. In some embodiments, processor 702 may fetch program instructions from data storage 706 and load the program instructions in memory 704. After the program instructions are loaded into memory 704, processor 702 may execute the program instructions, such as instructions to perform one or more operations described in the present disclosure.

Memory 704 and data storage 706 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 702. By way of example, and not limitation, such computer-readable storage media may include non-transitory computer-readable storage media including Random Access Memory (RAM), Read-Only Memory (ROM), Electrically Erasable Programmable Read-Only Memory (EEPROM), magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Computer-executable instructions may include, for example, instructions and data configured to cause processor 702 to perform a certain operation or group of operations, e.g., related to embodiments disclosed herein.

Communication unit 708 may be configured to provide for communications with other devices, e.g., through RF transmissions. For example, communication unit 708 may be configured to transmit to and receive signals from user equipment (e.g., using mmWave frequencies). Communication unit 708 may include suitable components for RF communications including, as non-limiting examples, a radio, one or more antennas, one or more encoders and decoders, and/or a power supply. Additionally, communication unit 708 may provide for backhaul communications, e.g., communications with a larger communication network. Communication unit 708 may additionally include suitable components for such communications including, as non-limiting examples, a modem, and/or a router.

Non-Cooperative Sharing

Introduction

Various embodiments may address downlink beam scheduling for mm-Wave cellular networks in a scenario in which the BSs may belong to different operators, both private and commercial, and these operators share spectrum but do not cooperate with each other. In this case, distributed beam scheduling may be performed for the downlink data transmission from the BSs of different operators to the UEs. One advantage of the considered non-cooperative network setting lies in its security and robustness aspects because a central controller is usually vulnerable to malicious attacks. Various embodiments include efficient distributed MAC strategies together with adaptive power control to handle inter-cell interference due to spectrum sharing and to maximize the network utility as a function of the time averaged throughput of the UEs.

Various embodiments include adaptive distributed beam scheduling algorithms for non-cooperative operators in mm-Wave networks. Additionally or alternatively, various embodiments include a concrete approach to solve the distributed beam scheduling problem with theoretical optimality guarantee compared to heuristic solutions in the literature.

Various embodiments may involve a problem formulation based on the Lyapunov stochastic optimization framework given the underlying MAC protocols (e.g., p-persistent, CSMA/CA) but with optimizable parameters (e.g., BS transmit powers). Given the average and peak power constraints of the BSs, the network utility optimization problem can be decomposed into two sub-optimization problems. Solving the two sub-problems in each time frame will yield a network utility within an additive gap to that obtained by solving the original optimization problem. The first sub-problem is convex and involves a set of auxiliary variables which can be solved distributedly. The second sub-problem involves the power allocation for the UEs associated with each BS, and is stochastic and non-convex.

In order to solve the second sub-problem in a distributed manner, the scheduling problem is formulated as a non-cooperative game in which the BSs are the players which do not cooperate with each other. Each BS has its own payoff function which is defined as a weighted sum of the total throughout achieved by the UEs associated with that BS, plus a power consumption penalization term. The weights in the payoff function are optimally determined by the decomposition of the Lyapunov optimization, i.e., the parameters in the two sub-problems. Under this game theoretic formulation, the above sub-problems can be (approximately) solved in a distributed manner by solving the Nash Equilibrium (NE) of the corresponding non-cooperative game.

Several key properties of the formulated game are identified and an iterative update algorithm to compute the equilibrium is provided. The power allocation game may admit at least one pure-strategy equilibrium and provides sufficient conditions for the uniqueness of the equilibrium. To solve the NE, a parallel updating algorithm is used which globally converges. This parallel updating algorithm is performed periodically to provide approximate solutions to the sub-problems at each epoch. Numerical evaluation may also conducted to verify the effectiveness of the game-based scheduling compared to other MAC protocols with optimized transmit powers.

Notation Convention

Let $\mathbb{Z}^+$ denote the set of positive integers. Let $[n] \triangleq \{1, 2, \ldots, n-1, n\}$ for some positive integer n. For a set of real numbers $a_i$, $i \in [n]$, let $$(a_i)_{i=1}^n \triangleq [a_1, a_2, \cdots, a_n]^T.$$

$0^n \triangleq [0, 0, \ldots, 0]$ denotes the all-zero row vector with length n. Calligraphic letters $\mathcal{A}, \mathcal{B}, \ldots$ represent sets, bold capital letters A, B, . . . represent matrices. For a matrix $A \triangleq [a_{i,j}] \in \mathbb{R}^{m \times n}$, the Frobenius norm is defined as $$\|A\|_2 \triangleq \sqrt{\sum_{i=1}^m \sum_{j=1}^n |a_{i,j}|^2}.$$

For two sets $\mathcal{A}$ and $\mathcal{B}$, the difference set is defined as $\mathcal{A} \backslash \mathcal{B} \triangleq \{x \in \mathcal{A} : x \notin \mathcal{B}\}$. Denote the Euclidean projection of $x \in \mathbb{R}$ onto the interval [a, b] as $$[x]_a^b, \text{ i.e., } [x]_a^b = x \text{ if } a \le x \le b, [x]_a^b = a \text{ if } x < a \text{ and } [x]_a^b = b \text{ if } x > b.$$

All logarithms used in this paper are natural logarithms.

Problem Formulation

Network Model

As an example, a network may include M BSs and K UEs. Each BS $i \in [M]$ belonging to an operator is responsible for serving a set of $K_i$ UEs denoted by $\mathcal{K}_i \subseteq [K]$, via the wireless mm-Wave channel. The total number of UEs is equal to $$K=\sum_{i=1}^{M} K_i.$$

BSs from multiple operators are allowed to be co-located at the same sites. The system operates on a shared frequency band with bandwidth W Hz and a center frequency at $W_c$ Hz. The downlink data transmission and scheduling for this network may be of interest. Due to the proximity of locations, UEs may suffer from the interference caused by neighboring BSs of different operators. The received Signal-to-Interference-plus-Noise Ratio (SINR) at UE $j\in[K]$ is given by $$SINR_{j,i(j)}=\frac{p_{j,i(j)}G^{UE}_{j,i(j)}G^{BS}_{j,i(j)}|h_{j,i(j)}|^2 d_{j,i(j)}^{-\eta}}{\sum_{\ell\in\mathcal{B}(j)\setminus\{i(j)\}}p_{j(\ell),\ell}G^{UE}_{j,\ell}G^{BS}_{j,\ell}|h_{j,\ell}|^2 d_{j,\ell}^{-\eta}+\sigma^2}, \tag{1}$$

where $i(j)\in[M]$ denotes the BS index which is transmitting to UE j (For any UE j, let i(j) denote the BS that this UE is associated with, i.e., j∈K_(i(j)). Similarly, let j(i)∈K_i to denote the UE that is selected by BS i to transmit to.); $p_{j,i(j)}$, $h_{j,i(j)}$ and $d_{j,i(j)}$ denote the transmit power, channel gain and distance from BS i(j) to UE j, respectively. $\mathcal{B}(j)$ denotes the set of BSs which interfere with UE j (note that $i(j)\in\mathcal{B}(j)$). It is assumed that the channel gain $h_{j,i(j)}$ follows a Nakagami-m distribution with PDF $$f_H(h;\mu,\Omega)=\frac{2\mu^\mu}{\Gamma(\mu)\Omega^\mu}h^{2\mu-1}\exp\left(-\frac{\mu}{\Omega}h^2\right),\ h\ge 0, \tag{2}$$

where the parameters are $$\mu=\frac{\mathbb{E}[h^2]^2}{\mathrm{Var}(h^2)},\ \Omega=\mathbb{E}[h^2]$$

and Γ(•) is the Gamma function. Moreover, $\eta\geq 2$ is the path-loss factor. Let $N_0$ denote the random noise power spectrum density, then $\sigma^2=N_0W$ is the total noise power.

$$G^{UE}_{j,i(j)}$$

and $$G^{BS}_{j,i(j)}$$

denote the UE and BS antenna gain between UE j and BS i(j) respectively. It is assumed that both the BSs and UEs are equipped with directional antennas. The antenna gain is modeled by a 'keyhole' sectorized antenna model with constant main-lobe gain $G^{max}$ and side-lobe gain $G^{min}$, i.e., $$G(\theta)=\begin{cases}G^{max}, & |\theta|\le\Delta\theta/2,\\ G^{min}, & |\theta|>\Delta\theta/2\end{cases}, \tag{3}$$

where Δθ is the beam width (in radian). Moreover, each BS/UE antenna has a constant total power radiation gain of E, i.e., $\Delta\theta G^{max}+(2\pi-\Delta\theta)G^{min}=E$. WLOG, set E=1. The main to side-lobe ratio (MSR) of the antenna, denoted by D, is defined as $$D\triangleq\frac{G^{max}}{G^{min}}. \tag{4}$$

Given D and Δθ, the maximum and minimum antenna gain can be calculated as $G^{min}=((D-1)\Delta\theta+2\pi)^{-1}$ and $G^{max}=DG^{min}$. Usually, the MSR is measured in dB, which is D(dB)=10 lg D. It is assumed that all the BSs have identical antenna gain parameters and all the UEs also have identical antenna gain parameters. Therefore, use $G^{BS,max}$, $G^{BS,min}$ and $\Delta\theta^{BS}$ to represent the BS antenna parameters and $G^{UE,max}$, $G^{UE,min}$ and $\Delta\theta^{UE}$ to represent the UE antenna parameters respectively. For ease of presentation, the equivalent channel gain between UE j and the serving BS i(j) is defined as $$g_{j,i(j)}\triangleq\frac{G^{UE}_{j,i(j)}G^{BS}_{j,i(j)}|h_{j,i(j)}|^2 d_{j,i(j)}^{-\eta}}{\sum_{\ell\in\mathcal{B}(j)\setminus\{i(j)\}}p_{j(\ell),\ell}G^{UE}_{j,\ell}G^{BS}_{j,\ell}|h_{j,\ell}|^2 d_{j,\ell}^{-\eta}+\sigma^2} \tag{5}$$

and then the SINR at UE j can be conveniently written as $SINR_{j,i(j)}=g_{j,i(j)}p_{j,i(j)}$.

Distributed beam scheduling schemes with power allocations/adaptation may be important, which means that each BS will optimize its own transmit power without the knowledge of the transmit powers of other BSs, i.e., there may be no information exchange among different BSs. It is assumed that each BS and UE can only have one beam scheduled at any time so in each time slot, each BS can only transmit to at most one UE and each UE can only receive (desired) data from the associated BS. Moreover, interference will be treated as additive noise at the target UEs.

Distributed Beam Scheduling & Network Utility Maximization

As an example, a slotted system may operate synchronously. It is assumed that each time frame (or epoch) consists of N blocks and each block has T b time slots. Therefore, each epoch has $T=NT^b$ time slots. It is assumed that a block fading channel where the channel gains stay unchanged during each epoch and are independently and identically distributed (i.i.d.) over different epochs. Scheduling happens at the beginning of each block in an epoch. The time-averaged expected throughput of UE j from the corresponding serving BS i(j) is given by $$\bar{X}_{j,i(j)}=\lim_{t\to\infty}\frac{1}{t}\sum_{k=1}^{t}\mathbb{E}[X_{j,i(j)}(k)], \tag{6}$$

where the expectation is taken over the system randomness (e.g., fading channel, scheduling); $X_{j,i(j)}(k)$ is the number of bits (throughput) transmitted to UE j from its associated BS i(j) during block n of epoch k and is defined as $$X_{j,i(j)}(k)=\sum_{n=1}^{N}T^d_{j,i(j)}(k,n)W\log(1+SINR_{j,i(j)}(k,n)), \tag{7}$$

where $$T^{d}_{j,i(j)}(k,n)$$

denotes the data transmission time for UE j during block n∈[N] of epoch k. For example, if BS i(j) transmits to UE j during all the slots in block n, then $$T^{d}_{j,i(j)}(k,n)=T^{b}$$

slots. In addition, $SINR_{j,i(j)}(k, n)$ represents the SINR at UE j during block n of epoch k.

For the network utility, the a-fairness utility function is adopted, the function given by $$U_\alpha(x)\triangleq\begin{cases}\frac{x^{1-\alpha}}{1-\alpha}, & \text{if } \alpha\ge 0, \alpha\ne 1,\\ \log(x), & \text{if } \alpha=1\end{cases}, \tag{8}$$

where α is a free parameter. U(x)=log(x) is used as the utility function. U(x) is a continuous, concave and strictly increasing function. The utility of each UE j, denoted by $$u_j^{UE},$$

is defined as the logarithm of the time averaged expected throughout (See equation (6)) of this UE, i.e., $$u_j^{UE}=U(\overline{X}_{j,i(j)}),\ \forall j\in[K].$$

The utility of each BS i, denoted by $$u_i^{BS},$$

is defined as the sum utility of the UEs associated with this BS, i.e., $$u_i^{BS}=\sum_{j\in\mathcal{K}_i}u_j^{UE},\ \forall i\in[M].$$

$\mathcal{K}_i$ represents the set of UEs associated with BS i. The network utility is then defined as the sum utility of all the BSs in the network, i.e., $$\text{Network utility}\triangleq\sum_{i\in[M]}\sum_{j\in\mathcal{K}_i}U(\overline{X}_{j,i}). \tag{9}$$

Various embodiments may include efficient distributed access strategies that may improve the network utility subject to peak and average power constraints of each BS. In particular, various embodiments may solve the following stochastic optimization problem:

$$\max\ \sum_{i\in[M]}\sum_{j\in\mathcal{K}_i}U(\overline{X}_{j,i}) \tag{10a}$$

$$\text{s.t.}\ \sum_{j\in\mathcal{K}_i}\overline{p}_{j,i}\le Tp_i^{avg},\ \forall i\in[M] \tag{10b}$$

$$0\le\sum_{j\in\mathcal{K}_i}p_{j,i}(k,n)\le p_i^{max},\ \forall i\in[M],\ k\ge 1,\ n\in[N] \tag{10c}$$

$$a(k,n)\in\mathcal{A}(k,n),\ \forall k\ge 1,\ \forall n\in[N] \tag{10d}$$

where $$\overline{p}_{j,i}=\lim_{t\to\infty}\frac{1}{t}\sum_{k=1}^{t}\sum_{n=1}^{N}\mathbb{E}\left[T^{d}_{j,i}(k,n)p_{j,i}(k,n)\right]$$

represents the time averaged total power consumption of BS i to UE j at epoch k; $p_{j,i}(k, n)$ represents the transmit power from BS i to UE j at block n of epoch k;

$$p_i^{avg}$$

and $$p_i^{max}$$

represent the average and peak power constraints for BS i, respectively; a(k,n) represents the instantaneous control action of the access strategy at block n of epoch k and $\mathcal{A}$(k,n) is the action space which depends on the specific distributed access strategy. Moreover, let $U^{opt}$ denote the optimal value of the above optimization problem. Since various embodiments include efficient scheduling algorithms, it may be assumed that the UE association has already been done. Since it is assumed that each UE can connect to at most one BS at a time and each BS can transmit to at most one UE at a time, this excludes the use of Successive Interference Cancellation (SIC) techniques which may not be a common practice in real-world cellular systems.

TABLE I

Summary of notations

| Notation | Description |
|---|---|
| M; K | total number of BSs; total number of UEs |
| $\mathcal{K}_i$ ; $K_i$ | set of UEs associated with BS i, $\mathcal{K}_i \subseteq [K]$, $\lvert\mathcal{K}_i\rvert = K_i$ |
| W; $W_c$ | total bandwidth; center frequency |
| j(i) | UE j(i) selected/served by BS i, j(i) ∈ $\mathcal{K}_i$ |
| i(j) | BS i(j) serving UE j, j ∈ $\mathcal{K}_i$ |
| $P_{j(i),i}$, $P_{j,i(j)}$ | transmit power of BS i (or i(j)) to its selected UE j(i) (or j) |
| $\overline{p}_{j,i}$ | average power consumption of UE j (associated with BS i) |
| $p_i^{max}$; $p_i^{avg}$ | maximum/average power constraint of BS i |
| $d_{j,i}$; $h_{j,i}$ | distance/small-scale fading between BS i and UE j |
| $g_{j,i}$ | equivalent channel gain between BS i and UE j |
| $g_{j,i}^{max}(k)$ | maximum equivalent channel gain between BS i and UE j at epoch k |

TABLE I-continued

| Summary of notations | |
|---|---|
| Notation | Description |
| $g_{j,i}^{max}$ | maximum channel gain overall blocks and epochs |
| $G_{j,i}^{BS}$; $G_{j,i}^{UE}$ | BS/UE antenna gain between BS i and UE j |
| $G^{BS,max}$, $G^{BS,min}$ | maximum (main-lobe)/minimum (side-lobe) BS antenna gain |
| $G^{UE,max}$, $G^{UE,min}$ | maximum/minimum UE antenna gain |
| $\Delta\theta^{BS}$; $\Delta\theta^{UE}$ | main-lobe width of BS/UE antenna |
| $\gamma_{j,i}(k)$; $\bar{\gamma}_{j,i}$ | auxiliary variables at epoch k; time averaged value of auxiliary variables |
| $Z_i(k)$; $H_{j,i}(k)$ | Virtual queue values at epoch k |
| $X_{j,i}(k, n)$; $X_{j,i}(k)$ | Throughput of UE j at block n of epoch k; throughput at epoch k |
| $X_{j,i}$ | Time averaged throughput |
| $T_{j,i}^{d}(k, n)$ | Data transmission time of UE j from BS i at block n of epoch k |

Approach

According to the Lyapunov optimization theory, the network utility maximization problem (10), which aims to optimize a sum of logarithm function of the time averaged expected throughput of the UEs, is transformed into a new optimization problem (11) which aims to optimize the time averaged expected logarithm function of the UE throughput. The purpose of doing this transformation is to apply the well-established Lyapunov draft-plus-penalty framework. Further, the transformed optimization problem can be solved via solving two sub-problems at each epoch together with the updating of the virtual queues to enforce BS power constraints.

The distributed beam scheduling problem is formulated as a non-cooperative game and the two sub-problems from the Lyapunov framework are solved via solving for the Nash Equilibrium (NE). The payoff functions of the players (i.e., BSs) are determined by the objective functions of the two sub-problems and have a nice mathematical structure which guarantees the existence and uniqueness (under certain conditions) of the NE.

The General Lyapunov Optimization Framework

By introducing a set of K auxiliary variables $\{\gamma_{j,i}(k): i \in [M], j \in \mathcal{K}_i\}$ at each epoch k, the original optimization problem (10) can be transformed into the following equivalent optimization problem with time averaged objective functions:

$$\max \lim_{t\to\infty} \frac{1}{t} \sum_{k\in[t]} \sum_{i\in[M]} \sum_{j\in\mathcal{K}_i} E[U(\gamma_{j,i}(k))] \tag{11a}$$

$$\text{s.t. } \sum_{j\in\mathcal{K}_i} \bar{p}_{j,i} \le T p_i^{avg}, \forall\, i \in [M] \tag{11b}$$

$$\bar{\gamma}_{j,i} \le \bar{X}_{j,i}, \forall\, i \in [M], \forall\, j \in \mathcal{K}_i \tag{11c}$$

$$0 \le \sum_{j\in\mathcal{K}_i} p_{j,i}(k, n) \le p_i^{max}, \forall\, i \in [M], \forall\, k \ge 1, n \in [N] \tag{11d}$$

$$0 \le \gamma_{j,i}(k) \le TW\log\left(1 + g_{j,i}^{max} p_i^{max}\right), \forall\, i \in [M], \forall\, j \in \mathcal{K}_i, k \ge 1 \tag{11e}$$

where $$g_{j,i}^{max}$$

denotes the maximum equivalent channel gain from BS i to UE j over all blocks and epochs, i.e., $$g_{j,i}^{max} \triangleq \max_{k,n} g_{j,i}(k, n) \cdot \bar{\gamma}_{j,i} \triangleq \lim_{t\to\infty} \frac{1}{0} \sum_{k=1}^{t} \gamma_{j,i}(k)$$

denotes the time averaged value of the auxiliary variable $\gamma_{j,j}(k)$.

The above transformed optimization problem can be solved by solving two sub-problems at each epoch together with the updating of two virtual queues to enforce the average and peak power constraints of the BSs. In particular, define two virtual queues $$\{Z_i(k)\}_{k=1}^{\infty}, \forall\, i \in [M]$$

and $$\{H_{j,i}(k)\}_{k=1}^{\infty},$$

$\forall i \in [M]$, $\forall j \in \mathcal{K}_i$ which are updated at each epoch. The first queue $$\{Z_i(k)\}_{k=1}^{\infty}$$

corresponds to the power allocation variables $p_{j,i}(k, n)$ and is updated according to $$Z_i(k+1) = \max\left\{Z_i(k) + \sum_{j\in\mathcal{K}_i} \sum_{n\in[N]} T_{j,i}^{d}(k, n) p_{j,i}(k, n) - T p_i^{avg}, 0\right\}, \quad \forall\, i \in [M]. \tag{12}$$

The purpose of this virtual queue is to enforce the satisfaction of the average BS power consumption constraint (11b). The second virtual queue $$\{H_{j,i}(k)\}_{k=1}^{\infty}$$

corresponds to the auxiliary variables $\gamma_{j,i}(k)$ and is updated according to $$\forall\, i \in [M], \forall\, j \in \mathcal{K}_i: H_{j,i}(k+1) = \max\{H_{j,k}(k) + \gamma_{j,i}(k) - X_{j,i}(k), 0\},, \tag{13}$$

which is used to enforce the average constraint (11c) on the auxiliary variables. With the definition of these two virtual queues, the two sub-problems are presented.

The first sub-problem solves the auxiliary variables $\gamma_{j,i}(k)$ at each epoch k:

$$\max\sum_{i\in[M]}\sum_{j\in\mathcal{K}_i}(VU(\gamma_{j,i}(k))-H_{j,i}(k)\gamma_{j,i}(k)) \tag{14a}$$

$$\text{s.t. } 0\le\gamma_{j,i}(k)\le TW\log\left(1+g_{j,i}^{max}(k)p_i^{max}\right),\ \forall\, i\in[M],\ \forall\, j\in\mathcal{K}_i,\ \forall\, k\ge 1 \tag{14b}$$

where $$g_{j,i}^{max}(k)$$

denotes the maximum value of $g_{j,i}$(k, n) at epoch k, i.e., $$g_{j,i}^{max}(k)\triangleq\max_n g_{j,i}(k,n)^2.$$

(From the boundedness constraint (11e), ideally, upper bound is $\gamma_{j,i}$(k) by $$\gamma_{j,i}(k)\le TW\log\left(1+g_{j,i}^{max}p_i^{max}\right)$$

instead of using $$g_{j,i}^{max}(k).$$

However, for implementation, the sub-problem may be solved at each epoch, so it may be impossible to get knowledge of the equivalent gains in the future epochs. Therefore, $$g_{j,i}^{max}(k)$$

is used as a substitute of $$g_{j,i}^{max}.$$

Furthermore, $$g_{j,i}^{max}(k)$$

also needs to be estimated at the beginning of the epoch k. Any large enough number can be adopted as an upper bound on $$g_{j,i}^{max}(k).$$

The effect of this estimation is minor.)

The parameter V is a constant that can be tuned to find a desirable trade-off between optimality gap (to the original problem (10)) and convergence speed. It can be seen that for fixed virtual queue status at epoch k, the sub-problem (14) is a convex optimization problem. Moreover, the first sub-problem interacts with the virtual queue $$\{H_{j,i}(k)\}_{k=1}^{\infty}$$

as follows. From objective function (14a), it can be seen that if the queue status $H_{j,i}$(k) is large at the current epoch k, which implies that the average value (up to the current epoch) of the auxiliary variable $\gamma_{j,i}$ is large, then maximizing the objective function (20) will yield a small $\gamma_{j,i}$(k) which reduces the average value of the auxiliary variable and enforces the satisfaction of the time averaged constraint $\overline{\gamma}_{j,i}\le\overline{X}_{j,i}$ of average constraint (11c).

The second sub-problem solves the transmit powers pj,i (k,n) at each block of epoch k:

$$\min\sum_{i\in[M]}\sum_{j\in\mathcal{K}_i}\left(\sum_{n\in[N]}\mathbb{E}\left[T_{j,i}^d(k,n)p_{j,i}(k,n)\right]-Tp_i^{avg}\right)\times Z_i(k)-H_{j,i}(k)\hat{X}_{j,i}(k) \tag{15a}$$

$$\text{s.t. } 0\le\sum_{j\in\mathcal{K}_i}p_{j,i}(k,n)\le p_i^{max},\ \forall\, i\in[M],\ \forall\, k\ge 1,\ \forall\, n\in[N] \tag{15b}$$

where $$\hat{X}_{j,i}(k)\triangleq\sum_{n=1}^{N}\mathbb{E}\left[T_{j,i}^d(k,n)W\log(1+SINR_{j,i}(k,n))\right] \tag{15c}$$

denotes the expected throughput achieved by UE j (served by BS i) at epoch k and $SINR_{j,i}$(k, n)=$g_{j,i}$(k, n)$p_{j,i}$(k, n). This sub-problem interacts with the virtual queue $$\{Z_i(k)\}_{k=1}^{\infty}$$

as follows. From sub-problem (15a), it can be seen that when the queue status $Z_i$(k) is large at the current epoch k, implying the time averaged power consumption (up to the current epoch) of BS i is high, then minimizing the objective function (15a) will yield some small values of power allocation to the UEs of BS i which reduces the average power consumption of BS i and therefore enforces the satisfaction of the average power constraint (11b).

By solving the two sub-problems (14) and (15) at each epoch and updating the virtual queues using equation (12) and equation (13), the following proposition for the performance guarantee of this approach can be obtained straightforwardly:

Proposition 1 Let $$\overline{X}_{j,i}^{sub-opt}(\forall\, i\in[M],\ \forall\, j\in\mathcal{K}_i)$$

be the optimal average throughput achieved by solving the two sub-problems (14), (15) at each epoch. Given that the utility function U(x)=log x and the system state is i.i.d. over every epoch, then all the constraints in the transformed problem (11) can be satisfied and $$\sum_{i\in[M]}\sum_{j\in\mathcal{K}_i}U(\overline{X}_{j,i}^{sub-opt})\ge U^{opt}-\frac{B}{V}, \tag{16}$$

where $U^{opt}$ is the maximum utility of the original optimization problem (10) and B is some constant not depending on the system parameters.

It can be seen from Proposition 1 that if V is large, then the approach can achieve almost the same optimal network utility as the original problem. It can be seen that the first sub-problem (14) is a convex optimization problem which can be easily solved distributedly. However, the second sub-problem (15) is a stochastic non-convex optimization problem in general and it is required to solve this sub-problem distributedly among the BSs. Hence, finding the optimal solution for sub-problem (15) is challenging. A non-cooperative game based approach is provided to solve the distributed scheduling problem. An intuition on how the second sub-problem (15) is connected to non-cooperative games is also provided. When the virtual queue status $Z_i(k)$, $H_{j,i}(k)$, $\forall i \in [M]$, $\forall j \in \mathcal{K}_i$ are given (this is because the status of the two virtual queues are determined by the data transmission of the previous epoch and is independent of the BS transmit powers at the current epoch), the objective function (15a) becomes minimizing the difference between the total power consumption and the average throughput weighted by the virtual queue status across all BSs. This is equivalent to maximizing the sum of a sub-problem (18)-like payoff function for all BSs with pre-determined and optimal "weights." This problem may be solved in a distributed manner, i.e., BSs do not coordinate in determining their transmit powers. Instead, each BS myopically maximizes its own payoff by choosing its transmit powers based on the measured interference from other BSs. This non-cooperative game theory provides a straightforward approach to such a distributed optimization problem.

Non-Cooperative Game-Based Formulation

The distributed nature of the beaming scheduling task falls into the scope of the non-cooperative games in which a set of players tries to maximize their individual payoff based on the decisions of other players. A distributed beam scheduling algorithm is described by formulating the scheduling problem as a non-cooperative game in which the BSs are the players each having a payoff function which is the aggregate throughput achieved by the UEs associated with it (plus a power consumption penalty term). Each player then tries to maximize its own payoff based on the power allocation decisions and the (channel-state information) CSI. This game happens in each scheduling unit, i.e., a block. By finding the Nash Equilibrium (NE) of the non-cooperative power allocation game, the scheduling algorithm provides a good (distributed) approximation to the sub-problem (15). In other words, the sub-problem (15) fits naturally into the scope of non-cooperative games in game theory, where instead of pre-defining the weights as in most of the work in literature, the weights in this problem are determined by the status of the virtual queues. Before proceeding to the scheduling algorithm, the non-cooperative game is described in a more general sense, providing several key properties of the game (i.e., properties on the existence and uniqueness of the NE) and then adapt the game theory framework to a specific scheduling problem at each epoch.

As an example, a power allocation game $\mathcal{G}=\langle [M], \{\mathcal{P}_i\}_{i\in[M]}, \{\phi_i\}_{i\in[M]} \rangle$ in a network model described above, including the set of M BSs that are the players. For simplicity, each BS is associated with the same number of UEs, i.e., $K_i=K/M$, $\forall i \in [M]$. The action space for BS $i \in [M]$, denoted by $\mathcal{P}_i$, is defined as $$\mathcal{P}_i \triangleq \left\{ p_i : 0 \le \sum_{j\in\mathcal{K}_i} p_{j,i} \le p_i^{max},\ p_{j,i} \ge 0,\ \forall\, j \in \mathcal{K}_i \right\} \tag{17}$$

where $$p_i \triangleq (p_{j,i})_{j\in\mathcal{K}_i} \in \mathbb{R}_+^{K/M}$$

denotes the power allocation profile for BS i, i.e., the power allocation to each UE associated with BS i. Let $p_{-i} \triangleq \{p_{i'}: i' \in [M]\backslash\{i\}\}$ denote the power profile for all BSs expect BS i. The payoff function $\phi_i$ of BS i is defined as $$\phi_i(p_i, p_{-i}) = \alpha_i\left(\sum_{j\in\mathcal{K}_i} W\log(1+SINR_{j,i})\right) - \lambda_i\left(\sum_{j\in\mathcal{K}_i} p_{j,i}\right), \tag{18}$$

in which $SINR_{j,i}=g_{j,i}p_{j,i}$ is the received SINR at UE j of BS i and $\alpha_i \ge 0$, $\lambda_i \ge 0$ are some non-negative weights. This payoff function has an intuitive interpretation that it aims to maximize the throughput of BS i while penalizing the over consumption of powers which is consistent with the average power constraints. In general, the parameters $\alpha_i$ and $\lambda_i$ can be tuned to find a desirable trade-off between throughput and power consumption. The goal is to minimize the power consumption of the radar system while maintaining a tolerable target detection SINR threshold and not causing too much interference to the communication system. A similar payoff function was used in the game theoretic allocation approach in which the pricing factor is adjusted heuristically and dynamically according to the achieved SINR at the current iteration. In an example distributed scheduling approach, however, the parameters $\alpha_i$, $\lambda_i$ are updated according to the status of the virtual queues determined by equations (12) and (13) and the first sub-optimization problem (14). The definition of the Nash Equilibrium (NE) for the game $\mathcal{G}$ through the Best Response functions is described below.

Definition 1 (Best Response, BR) The Best Response for each BS i, denoted by $$p_i^{BR},$$

given the power profiles $p_{-i}$ of all other BSs, is defined as a power profile of BS i such that its payoff is maximized, i.e., $$\phi_i(p_i^{BR}, p_{-i}) \ge \phi_i(p_i, p_{-i}),\ \forall\ p_i \in \mathcal{P}_i.$$

Moreover, the Best Response function for BS i, as a function of the power profiles $p_{-i}$, is defined as $$p_i^{BR}(p_{-i}) = \text{argmax}_{p_i\in\mathcal{P}_i}\phi_i(p_i, p_{-i}).$$

With the definition of BR, the Nash Equilibrium of this game is then defined as follows.

Definition 2 (Nash Equilibrium, NE) The Nash Equilibrium of the distributed scheduling game $\mathcal{G}$ is defined as a power allocation profile $$\{p_i^*\}_{i\in[M]}$$

such that each BS's power allocation profile is the Best Response to the power allocations of all other BSs, i.e., $\forall i\in[M]$:

$$\phi_i(p_i^*, p_{-i}^*) \geq \phi_i(p_i, p_{-i}^*), \forall\, p_i \in \mathcal{P}_i \quad (19)$$

From the above definition, it can be seen that NE is a power allocation for which no BS has the incentive to unilaterally deviate from the NE to obtain better individual payoff. Solving the NE for the non-cooperative game $\mathcal{G}$ is essentially solving a set of M coupled optimization problems where the objective function for each of these optimization problem is the payoff for the corresponding BS which depends also on the power allocations of other BSs.

Existence and Uniqueness of Nash Equilibrium

The properties of the NE of the power allocation game $\mathcal{G}$ defined above are described. More specifically, given the structure of the game, it is shown that $\mathcal{G}$ always admits at least one NE for arbitrary channel realizations. Further sufficient conditions guaranteeing the uniqueness of the NE by establishing an equivalence between the non-cooperative game and a corresponding Variational Inequality (VI) problem are provided. Borrowing existing results on the uniqueness of solutions of the VI problem, the uniqueness of NE is proved.

Since it is assumed no use of SIC techniques, each BS can only transmit to at most one UE during a block in the distributed scheduling algorithm. To choose which UE to serve, multiple approaches such as random selection and Round Robin can be used. However, multiple BSs can transmit to their designated UEs simultaneously. In this case, the multiuser interference (MUI) from other transmitting BSs will be simply treated as Gaussian noise. Under this scheduling model, the BR function for each BS is given in the following lemma. Note that for any BS i, let j(i) denote the UE which is served by this BS; For any UE j, use i(j) to denote the BS which is responsible to serve this UE.

Lemma 1 Suppose that at most one UE can be served by each BS at any time, given the payoff function defined in equation (18), the Best Response of BS i, $$p_i^{BR} \triangleq \left(p_{j,i}^{BR}\right)_{j\in\mathcal{K}_i},$$

is given by $$p_{j(i),i}^{BR} = \left[\frac{\alpha_i W}{\lambda_i} - \frac{1}{g_{j(i),i}}\right]_0^{p_i^{max}}, \forall\, i \in [M] \quad (20)$$

where UE j(i) is the only UE served by BS i. There is $$p_{j',i}^{BR} = 0, \forall\, j' \in \mathcal{K}_i \backslash \{j(i)\},$$

$$\text{and } g_{j(i),j} = \frac{G_{j(i),i}^{UE} G_{j(i),i}^{BS} |h_{j(i),i}|^2 d_{j(i),i}^{-\eta}}{\Sigma_{\ell\in[M]\backslash\{i\}} G_{j(i),\ell}^{UE} G_{j(i),\ell}^{BS} |h_{j(i),\ell}|^2 d_{j(i),\ell}^{-\eta} p_{j(\ell),\ell} + \sigma^2}$$

is the equivalent channel gain from BS i to UE j(i).

Based on the Best Response function derived in the above lemma, solving the NE can be formulated as solving a fixed point equation. In particular, if the NE of $\mathcal{G}$ exists, then it must satisfy a set of non-linear equations specified by equation (20). It can be seen that the NE $\{p^*\}_{i\in[M]}$ is a fixed point of the Euclidean projection mapping defined by equation (20). Therefore, the NE can be found effectively using the so-called fixed point iteration algorithm. In example scheduling algorithm designs, BR based iteration method can be used to find the NE based on the interaction (via interference) among different BSs. The existence and uniqueness of the NE for considered game is shown.

Lemma 2 (Existence of NE) Based on the considered scheduling model, the game $\mathcal{G}=\langle[M], \{\mathcal{P}_i\}_{i\in[M]}, \{(\phi_i\}_{i\in[M]}\rangle$ always admits at least one pure strategy NE for any parameters $\alpha_i$, $\lambda_i \geq 0$, $\forall i\in[M]$ and any set of wireless channel realizations. (A pure strategy NE is a NE in which each BS chooses a certain power allocation profile with probability one.)

Since the NE of $\mathcal{G}$ always exists, finding a set of sufficient conditions guaranteeing the uniqueness of the NE may be important. The uniqueness of NE is established via the connection to the Variational Inequality (VI) theory. Before the uniqueness of the NE is shown, a brief description of the VI problem is given. Given a closed and convex set $\mathcal{M} \subseteq \mathbb{R}^n$ and a mapping F: $\mathcal{M} \mapsto \mathbb{R}^n$, the VI problem, denoted by VI($\mathcal{M}$, F), aims to find a vector $x^*\in\mathcal{M}$ such that $(y-x^*)^T F(x^*) \geq 0$, $\forall y\in\mathcal{M}$, in which $x^*$ is called the solution of VI($\mathcal{M}$, F). For the considered non-cooperative game $\mathcal{G}$, the corresponding VI problem can found as follows. Let $$\mathcal{P} \triangleq \prod_{i=1}^{M} \mathcal{P}_i$$

denote the product space. Let j(i) be the UE index selected by BS i to transmit to. Let $v(i)\triangleq\text{mod}(j(i), K/M)$ be the index of UE j(i) among the UEs associated with BS i. A vector function is defined $F: \mathcal{P} \mapsto \mathbb{R}^{1\times M}$ as $F(p)\triangleq[F_1(p), F_2(p), \ldots, F_M(p)]\in\mathbb{R}^{K/M\times M}$ in which $F_i(p)$, $\forall i\in[M]$ is defined as $$F_i(p) \triangleq -\nabla_{p_i}\phi_i(p_i, p_{-i}) \quad (21a)$$

$$= \left[0^{v(i)-1}, \frac{\partial\phi_i(p_i, p_{-i})}{\partial p_{j(i),i}}, 0^{K/M-v(i)}\right]^T \quad (21b)$$

$$= \left[0^{v(i)-1}, \lambda_i - \frac{\alpha_i g_{j(i),i} W}{1 + g_{j(i),i} p_{j(i),i}}, 0^{K/M-v(i)}\right]^T, \quad (21c)$$

i.e., the only non-zero entry in the $v(i)^{th}$ position of $F_i(p)$ represents the first-order derivative of the payoff function $\phi_i$ w.r.t. the transmit power of BS i to the selected UE j(i). Note that the selection of which UE to serve by each BS is determined by some exogenous mechanisms and here it is assumed that the UE selection is fixed, i.e., each BS i selects UE j(i). The game $\mathcal{G}$ is equivalent to the VI problem VI($\mathcal{P}$, F). A direct consequence of this equivalence is that if the mapping F is a uniformly P-function, then VI($\mathcal{P}$, F) has a unique solution, which implies that the game $\mathcal{G}$ admits a unique NE. This result is formally described in Proposition 2. In the following, two definitions which are useful in proving the uniqueness of NE are provided.

Definition 3 (Uniformly P-function) The mapping F is said to be a uniformly P-function on $\mathcal{P}$ if there exists a positive constant $C^{up}>0$ such that for any two power allocation profiles $$p=(p_i)_{i=1}^M \in \mathbb{R}_+^{K/M\times M} \text{ and } p'=(p_i')_{i=1}^M \in \mathbb{R}_+^{K/M\times M}, \tag{22}$$

$$\max_{1\le i\le M}(p_i-p_i')^T(F_i(p)-F_i(p'))\ge C^{up}\|p-p'\|_2^2.$$

in which $\|p-p'\|_2$ represents the Frobenius norm of the matrix p−p'.

Definition 4 (P-matrix) A matrix $A\in\mathbb{R}^{n\times n}$ is called a P-matrix if every principal minor of A is positive.

Proposition 2 (Uniqueness of Solution to VI($\mathcal{P}$, F)) If each $\mathcal{P}_i$, ∀i∈[M] is a closed convex set and F is a continuous uniformly P-function on $\mathcal{P}$, then VI($\mathcal{P}$, F) has a unique solution. Equivalently, the game $\mathcal{G}$ admits a unique NE.

Next the matrix $Q\triangleq[Q_{p,q}]\in\mathbb{R}^{M\times M}$ which is useful in studying the sufficient conditions guaranteeing the uniqueness of NE is provided. Q is defined as follows:

$$Q_{p,q}=\begin{cases}\alpha_p W, & \text{if } p=q\\ -\alpha_p W\left|\frac{\hbar_{j(p),q}}{\hbar_{j(q),q}}\right|^2\left(1+\frac{\sum_{i\in[M]}|\hbar_{j(q),i}|^2 p_i^{max}}{\sigma^2}\right), & \text{if } p\ne q\end{cases} \tag{23}$$

where $\hbar_{j,i}\triangleq\sqrt{G_{j,i}^{UE}G_{j,i}^{BS}|h_{j,i}|^2 d_{j,i}^{-\eta}}$.

For a unified notation, further denote $$\hat{\hbar}_{j(p),q}\triangleq\frac{\hbar_{j(p),q}}{\hbar_{j(p),p}}.$$

Note that $\hat{\hbar}_{j(p),p}=1$, ∀p∈[M]. With such a specification of Q, the uniqueness results are presented in the following Theorem.

Theorem 1 (Sufficient Conditions on the Uniqueness of NE) If the matrix Q defined by equation (33) is a P-matrix, then the mapping F is a uniformly P-function. Consequently, the game $\mathcal{G}$ admits a unique NE.

Remark 1 Theorem 1 gives a sufficient condition which guarantees the existence and uniqueness of NE for the game $\mathcal{G}$. The matrix Q only depends on the parameters $\alpha_1$, i∈[M] and channel realizations. However, it does not depend on the power allocations of the BSs and UEs. Hence Theorem 1 gives a sufficient condition which guarantees the existence and uniqueness of NE for the game $\mathcal{G}$. For example, due to structure of Q where all diagonal elements are equal to the constant $\alpha_p W$ while all off-diagonal elements are negative numbers depending on the channel gains, notice that if all the channel gains are small enough, every principal minor of Q will be positive, making Q a P-matrix.

Non-Cooperative Game Based Beam Scheduling

Following the general non-cooperative game-based formulation described above, the distributed beam scheduling algorithm is presented. Recall that beam scheduling happens at each block of a epoch. To maximize the network utility, an aim is to solve the two sub-problems (14) and (15) in a distributed manner at the beginning of each epoch. Recall that the first sub-problem is convex and can be solved by letting each BS perform an independent optimization of its own utility. The distributed scheduling algorithm for solving sub-problem (15) is as follows. At the beginning of each epoch, each BS i∈[M] uniformly select one UE j(i)∈$\mathcal{K}_i$ at random to transmit until the end of the current epoch. All BSs will transmit to its selected UE at the same time and using the same spectrum. Therefore, BSs may interfere with each other. It is assumed that all BSs are synchronized (note that this is a MAC layer synchronization.) which can be achieved by aligning timing with GPS. Since BSs are transmitting to their individually selected UEs throughout the entire epoch, for BS i, the data transmission time $$T_{j(i),i}^d(k,n)=T^b \text{ and } T_{j',i}^d(k,n)=0,\ \forall j'\in\mathcal{K}_i\backslash\{j(i)\},\ \forall n\in[N].$$

As a result, the objective function of the second sub-problem (15) becomes $$\max\sum_{i\in[M]}\sum_{n\in[N]}H_{j(i),i}(k)T^bW\log(1+SINR_{j,i}(k,n))-Z_i(k)T^b p_{j,i}(k,n) \tag{24a}$$

$$\text{s.t. } 0\le\sum_{j\in\mathcal{K}_i}p_{j,i}(k,n)\le p_i^{max},\ \forall i\in[M],\ \forall k\ge1,\ \forall n\in[N]. \tag{24b}$$

(Here the term −

$$\sum_{j\in\mathcal{K}_i}Z_i(k)Tp_i^{avg}=-KTZ_i(k)p_i^{avg}/M$$

which is a constant has been omitted. Therefore, removing this term from the objective function does not affect the solutions of the optimization problem.)

The optimization problem (24) is solved at each block and in a distributed manner using the game based approach discussed above. In particular, at each block n of epoch k, each BS i∈[M] aims to maximize the following payoff function:

$$\phi_i(p_i(k,n),p_{-i}(k,n))=\alpha_i W\log(1+SINR_{j(i),i}(k,n))-\lambda_i p_{j(i),i}(k,n) \tag{25}$$

with $$\alpha_i\triangleq H_{j(i),i}(k)T^b,\ \lambda_i\triangleq Z_i(k)T^b \tag{26}$$

where $p_i(k, n)$ is the power allocation profile for BS i. It can be seen that this payoff function fits exactly in the non-cooperative game based formulation (18) with parameters $\alpha_1=H_{j(i),i}(k)T^b$ and $\lambda_i=Z_i(k)T^b$. Let $\mathcal{G}(k, n)$ denote the power allocation game whose payoff function is defined by equation (25) and the action space for each BS i is defined as $$\mathcal{P}_i\triangleq\left\{p_i(k,n)\triangleq(p_{j,i}(k,n))_{j\in\mathcal{K}_i}:0\le p_{j,i}(k,n)\le p_i^{max},\ \forall i\in[M],\ \forall j\in\mathcal{K}_i\right\}. \tag{27}$$

Each BS i∈[M] also maintains the virtual queues $$\{Z_i(k)\}_{k=0}^{\infty} \text{ and } \{H_{j,i}\}_{k=0}^{\infty}, \forall j \in \mathcal{K}_i$$

in order to perform the distributed scheduling.

The Nash Equilibrium of the game $\mathcal{G}$(k, n) can be found by performing the standard parallel updating algorithm (See Algorithm 1) based on the interactions via interference among different BSs. (Other than the parallel updating algorithm, sequential updating in which the BSs update their transmit powers one after another in a sequential way can also be used to find the NE.) In particular, at each block n, each BS i updates its transmit power based on the interference (plus noise) measured at the corresponding UE. The parallel updating algorithm is formally described in Algorithm 1. The stop criterion of the updating algorithm is that if either two consecutive power profiles are very close to each other, i.e., a difference of $\sqrt{\epsilon}$ for some pre-defined threshold $\epsilon>0$ in Frobenius norm, or the number of iterations reaches the maximum, i.e., the number of time slots per block. If the algorithm stopped before the iteration index s reaches its maximum value $T^b$, the transmit powers of the BSs will be equal to the output of the algorithm for the remaining time slots. Note that the parallel updating algorithm is performed at each block, therefore the output of the algorithm at the current block will serve as the initial input to the algorithm at the next block. To perform the distributed scheduling algorithm, each BS i needs to know the virtual queue status $Z_i(k)$, $H_{j(i),i}(k)$, $\forall j\in \mathcal{K}_i$, the measured interference plus noise $$I_{j(i)}^{(s)}$$

at UE j(i) and the channel gain $h_{j(i),i}$. The channel gain $h_{j(i),i}$ can be estimated by sending some pilots to the UE j(i) and then fed back to BS i. (The system overhead due to the feedback of the channel gain and measured interference (plus noise) from the UEs is negligible since is does not scale with the downlink data transmission.) Similarly, the measured interference $$I_{j(i)}^{(s)}$$

at UE j(i) can be fed back to BS i. In addition, because the virtual queues are maintained separately by each BS, all the above information is available to BS i. For ease of notation, ignore the epoch and block indices (k, n) on the power allocation profiles and denote $$\hbar_{j,i} \triangleq \sqrt{G_{j,i}^{UE} G_{j,i}^{BS} |h_{j,i}|^2 d_{j,i}^{-\eta}}, \forall i \in [M], \forall j \in [K]$$

in the algorithm description.

---

Algorithm 1: Parallel Updating Algorithm

---

Input: Randomly pick a feasible point $p^{(0)} \triangleq \{p_i^{(0)}\}_{i\in[M]} \in \mathcal{P}$.

Set time slot index s = 0.

-continued

---

Algorithm 1: Parallel Updating Algorithm

---

Step 1: If $\|p^{(s+1)} - p^{(s)}\|_2^2 \le \epsilon$ or $s \ge T^b$, then Stop.

Step 2: Each BS i ∈ [M] compute (simultaneously):

$$p_{j(i),i}^{(s+1)} = \left[\frac{H_{j(i),i}(k)W}{Z_i(k)} - \frac{1}{g_{j(i),i}^{(s)}}\right]_0^{p_i^{max}}, \tag{28}$$

where $g_{j(i),i}^{(s)} = \frac{|\hbar_{j(i),i}|^2}{I_{j(i)}^{(s)}}$ is the equivalent channel between BS i and UE $j(i)$ at time slot s and $I_{j(i)}^{(s)} \triangleq \Sigma_{i'\neq i}|\hbar_{j(i),i'}|^2 p_{j(i'),i'}^{(s)} + \sigma^2$ denotes the interference plus noise measured at UE j(i) at slot s.

Step 3: Set s ← s + 1. Go back to Step 1.

Output: Output $p^{(s)}$. The parallel updating algorithm is proved to converge under the same condition that guarantees the uniqueness of NE of $\mathcal{G}$(k, n) (See Proposition 3). In fact, simulation results showed that the parallel updating algorithm converges very fast in general (in dozens of slots).

---

Proposition 3 (Proof of Convergence) The sequence $$\{p^{(s)}\}_{s=0}^{\infty}$$

generated by Algorithm 1 always converges. Furthermore, if the matrix Q defined in equation (23) is a P-matrix, then the sequence $$\{p^{(s)}\}_{s=0}^{\infty}$$

converges to the unique NE of the game $\mathcal{G}(k, n)$.

Optimality Gap Analysis

One important property of the game based scheduling algorithm is identified and its optimality gap to the optimal value of the original network utility maximization problem is analyzed.

Let $U^{game}(k)$ and $U_{ideal}(k)$ denote the network utility achieved by the game based scheduling algorithm and the ideal case respectively, at epoch k≥1. The following lemma states the optimality gap of the scheduling algorithm to the original utility maximization problem.

Lemma 3 (Optimality Gap) Suppose that there is an additive gap C≥0 in utility between the game based approach and the ideal case at each epoch, i.e., $U^{game}(k) \ge U^{ideal}(k) - C$, ∀k≥1. Then $$\sum_{i\in[M]}\sum_{j\in\mathcal{K}_i} U(\overline{X}_{j,i}^{game}) \ge U^{opt} - \frac{B+C}{V}, \tag{29}$$

where $$\overline{X}_{j,i}^{game}$$

denotes the average throughput achieved by UE j (of BS i) in the scheduling algorithm, $U^{opt}$ is the optimal value of the original problem (10) and B is some constant.

When multiple NE exist, since it is unknown which one of the parallel update algorithm will converge to, so C is chosen to be the upper bound on the optimality gap for all possible NE power allocations.

Numerical Evaluation

Description of the Baseline Schemes

One of the highlights of the Lyapunov optimization framework is that it can admit a number of underlying MAC layer protocols including p-persistent protocol and the 802.11 CSMA/CA protocol. In the following, the algorithms designed based on these two underlying MAC protocols as the baseline schemes is considered in order to show the performance gain of the game based algorithm. An 'ideal case' where it is assumed there is no interference among BSs is also considered. This ideal case provides a natural upper bound on the performance of the and baseline schemes.

p-Persistent Access Strategy

In this case, the network utility maximization problem (10) is solved under the p-persistent access strategy. In particular, the two sub-problems (14) and (15) are solved together with the updating of the two virtual queues at the beginning of each epoch. The first sub-problem (14) is a convex optimization problem and can be efficiently. The second sub-problem involves the random data transmission time $$\mathbb{E}[T^d_{j,i}(k,n)],$$

which has to be determined by some underlying access strategies and has to be estimated at the beginning of each epoch. Based on an estimate of $$\mathbb{E}[T^d_{j,i}(k,n)],$$

which is denoted by $$\hat{T}^d_{j,i}(k,n),\ \forall\, j\in\mathcal{K}_i,\ \forall\, n\in[N],$$

each BS i needs to independently minimize $$Z_i(k)\Big(\sum\nolimits_{n\in[N]}\hat{T}^d_{j,i}(k,n)p_{j,i}(k,n)-Tp_i^{avg}\Big)-H_{j,i}(k)\hat{X}_{j,i}(k), \tag{30}$$

subject to the BS peak transmit power constraints $$p_{j,i}(k,n)\le p_i^{max},\ \forall\, j\in\mathcal{K}_i,\ \forall\, n\in[N].$$

(Note that once the estimated data transmission time $$\mathbb{E}[T^d_{j,i}(k,n)]$$

are given, the joint optimization problem of (15) is equivalent to the independent optimization of (30) performed by each BS. This is because in the p-persistent protocol, only one BS is allowed to transmit at any given time and the power constraints are independent for each BS. A similar situation holds when solving the auxiliary variables $\gamma_{j,i}(k)$ from the first sub-problem (14).)

Then $$\hat{X}_{j,i}(k)=\sum\nolimits_{n\in[N]}\hat{T}^d_{j,i}(k,n)W\log(1+SNR_{j,i}(k,n))$$

and $SNR_{j,i}=g_{j,i}p_{j,i}(k,n)$ is the SNR at UE j (since at most one BS transmits at any time slot, SINR is replaced by SNR). Clearly, the optimization problem of (30) is convex and can be solved easily. Note that in this optimization the one-time transmit power is solved for all UEs. The same UE might be selected by the corresponding BS in multiple blocks, but the transmit power for that UE stays unchanged. In this regard, the block index of the transmit powers is ignored in function (30) and simply write $p_{j,i}(k, n)$ as $p_{j,i}(k)$. Then the objective function (30) becomes $$Z_i(k)\Big(p_{j,i}(k)\sum\nolimits_{n\in[N]}\hat{T}^d_{j,i}(k,n)-Tp_i^{avg}\Big)-H_{j,i}(k)\hat{X}_{j,i}(k), \tag{31}$$

from which the transmit power $p_{j,i}(k)$ for each UE can be solved at the beginning of the epoch k. Similarly, to solve auxiliary variables, each BS needs to independently maximize $VU(\gamma_{j,i}(k))-H_{j,i}(k)\gamma_{j,i}(k)$ subject to $$0\le\gamma_{j,i}(k)\le TW\log\big(1+g_{j,i}^{max}p_i^{max}\big),$$

which is also a convex optimization problem.

In the p-persistent protocol, the BSs competes for the wireless channel at each block within each epoch. (The reason that the channel contention happen at each block instead of each epoch is for the consideration of data transmission delay of the UEs. If one BS wins the channel contention and occupies it for the entire epoch, then all other BSs have to wait until the next epoch begins to contend again. This will result in a significant delay for other UEs since the length of an epoch could be much longer than a block.) To avoid interference, there can be at most one pair of active link (i.e., a BS transmitting to a corresponding UE) at any time. More specifically, at the beginning of each block (consisting of $T^b$ time slots), each BS attempts to transmit with probability $P_c$. If more than one BS decide to transmit at the same time, i.e., collisions are detected, then all BSs will not transmit. The BSs then contend the channel again in the following time slot until one BS wins the channel, i.e., there is only one BS decides to transmit and all other BSs stay silent. The BS which wins the contention then randomly chooses one UE from the set of UEs associated with it to transmit to it until the end of the current block. All BSs will contend for the channel again at the beginning of the next block. At any time slot, successful transmission happens with probability $MP_c(1-P_c)^{M-1}$ which is maximized when $P_c=1/M$. Note that the above channel contention process can also be used as a simulated process which produces an estimation for the data transmission times for the UEs during the current epochs.

CSMA/CA Strategy

A CSMA/CA MAC protocol with exponential backoff time (IEEE 802.11) is considered. Different from the p-persistent case, the CSMA/CA scheduling happens at each epoch instead of at each block. More specifically, each BS listens to the shared spectrum before transmitting. If the channel is sensed to be busy, the BS will wait. If the channel is idle, the BS starts to transmit to its selected UE with certain probability. If a collision occurs, each BS then chooses a random backoff time of 1 or 2 slots (assuming a contention window size of two) and attempts to transmit again after the chosen backoff time. If no collision occurs, the BS wining the channel in the last slot will randomly choose a backoff time of 1 or 2. If collision happens again, each BS randomly chooses a backoff time between 1, 2, 3 and 4. After C collisions, each BS will choose a backoff time randomly distributed from 1 to $2^C$ and attempts to transmit again after the chosen backoff time. The maximum backoff time can not exceed the epoch length T. To improve the data transmission efficiency, a BS wining the channel contention may continue its data transmission for multiple consecutive slots instead of only one. Similar to the case of the p-persistent MAC, at the beginning of each epoch, based on an estimation of the data transmission time for each UE, each BS independently solves the sub-problem (30). Because in the CSMA/CA scheduling, there is only one pair of active link at any time in the network, independent optimizations performed by the individual BSs is similar to the joint optimization of the sub-problems (14) and (15) as in the case of p-persistent MAC. Note that the transmit power for each UE is determined by solving the second sub-problem at the beginning of each epoch and will stay unchanged during the whole epoch. Further it is assume that the UE selection of the BSs is fixed during each epoch but can change among different epochs. Particularly, at the beginning of each epoch, let each BS randomly select one of its associated UEs to serve throughout the whole epoch, i.e., at any slots in which the BS wins the channel contention.

The Ideal Case

To give a straightforward intuition on the optimality of the scheduling algorithm, a scenario in which there is no interference among the BSs is given as an example. In particular, at the beginning of each epoch, each BS $i \in [M]$ randomly selects a UE $j(i) \in \mathcal{K}_i$ to serve throughout the whole epoch. The M BSs then transmit to its selected UEs simultaneously and there is no interference among them. Note that this 'ideal case' is just a way to produce an upper bound on the performance and is not an achievable scheme in general. Since in this case the data transmission time for each UE can be easily determined at the beginning of each epoch, the transmit powers (and the auxiliary variables) of the BSs can be determined by solving the sub-problems (14) and (15) in a similar fashion to that of both p-persistent and CSMA/CA protocols.

A Numerical Example

Example numerical results on the performance of the game based distributed scheduling are presented. The performance of various techniques to baseline schemes is compared, i.e., the p-persistent and CSMA/CA MAC protocols described above. The simulation setup is describe as follows.

Figure 8:
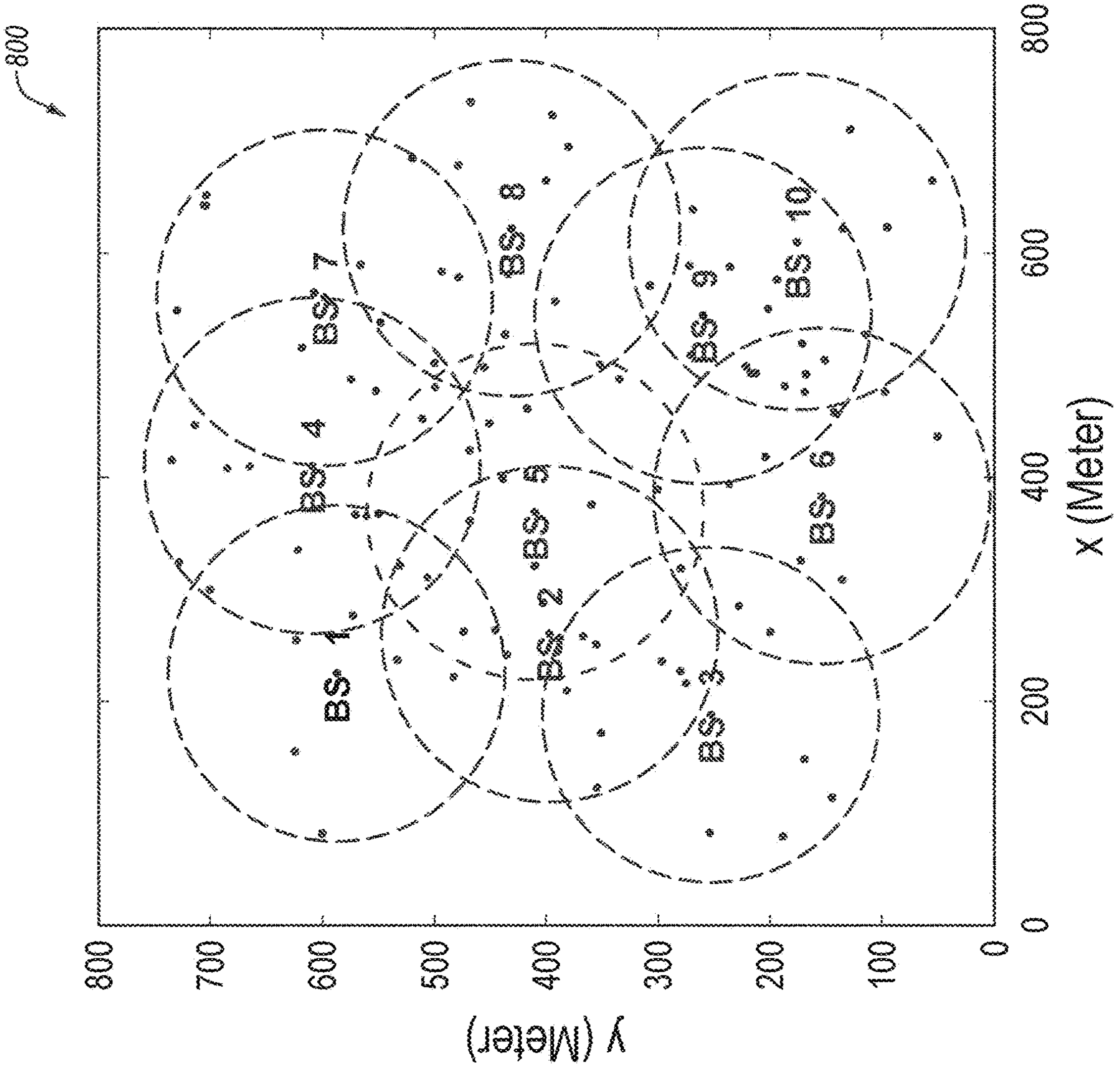
FIG. 8 illustrates an example wireless network in which one or more embodiments of the present disclosure may be implemented.

FIG. 8 illustrates an example wireless network 800 in which one or more embodiments of the present disclosure may be implemented. Wireless network 800 includes M=10 BSs, each from a different operator, and a total of K=100 UEs uniformly located on a planar grid with dimension 800×800 meters. Each BS $i \in [10]$ is responsible for serving a set of K/M=10 UEs within its Voronoi region. (Since the focus of the example is not on the BS-UE association problem, a simple association scheme for which the UEs are associated with the nearest BS is appropriate.) The system operates on a total bandwidth of W=400 MHz with a center frequency of $W_c$=37 GHz. Each BS i has an average power constraint of $$p_i^{avg} = 38.13 \text{ dBm } (6.5 \text{ Watt})$$

and a peak power of $$p_i^{max} = 40 \text{ dBm } (6.5 \text{ Watt}).$$

For the wireless propagation channels, the path loss factor is set to be η=4. The parameters of the Nakagami-m distribution are μ=1, Ω=0.001. Each time slot represents 1 millisecond. Each block contains $T^b$=50 slots and each epoch contains N=8 blocks thus having $T=NT^b$=400 slots. Throughout the simulation, the UE antenna beam width is fixed to be $\Delta\theta^{UE}=\pi/18$ (in radian) and the MSR to be $D^{UE}$=10 dB. Moreover, for the p-persistent baseline scheme, the optimal contention probability is set to be $P_c$=0.1. For the CSMA/CA scheme, the minimum contention window is set to be $CW_{min}$=20 slots. For practical reasons, a maximum contention window constraint of $CW_{max}$=200 slots is imposed. Each data transmission duration contains two time slots. The random noise power at the UEs is calculated according to $$\sigma^2(\text{dBm}) = 10\lg(k_B T_0 \times 10^3) + NR(\text{dB}) + 10\lg W, \tag{32}$$

where $k_B=1.38\times10^{-23}$ Joules/Kelvin is the Boltzmann's constant, NR is the UE noise figure and $T_0$ is the temperature of UE receive antenna system. Taking the typical values of NR=1.5 dB and $T_0$=290 Kelvin, the total noise power over the W=400 MHz bandwidth is equal to $\sigma^2$=−86.46 dBm. In the simulation, it is also assumed that the BSs and UEs are perfectly aligned, i.e., if a UE is served by a BS, then the UE will lie in the center of the BS antenna main-lobe and the BS will lie in the center of the UE antenna main-lobe. With the above system parameters, the performance of the non-cooperative game based scheduling algorithm is evaluated and the effect of BS/UE beam width and MSR on the network utility is verified. In all simulations, V=1000.

Effect of BS/UE Beam Width

The BS main to side-lobe ratio (MSR) and the Lyapunov constant are fixed as $D^{BS}$=20 dB. Then the beam width takes values $\Delta\theta^{BS}=\pi/9$, π/36 and π/72, respectively, in order to verify the effect of the beam width. (Since changing the UE antenna beam width and MSR has a similar effect as varying that of the BSs, simply fix the UE antenna beam width and the MSR as $\Delta\theta^{UE}=\pi/18$, $D^{UE}$=10 dB.)

Figure 9A:
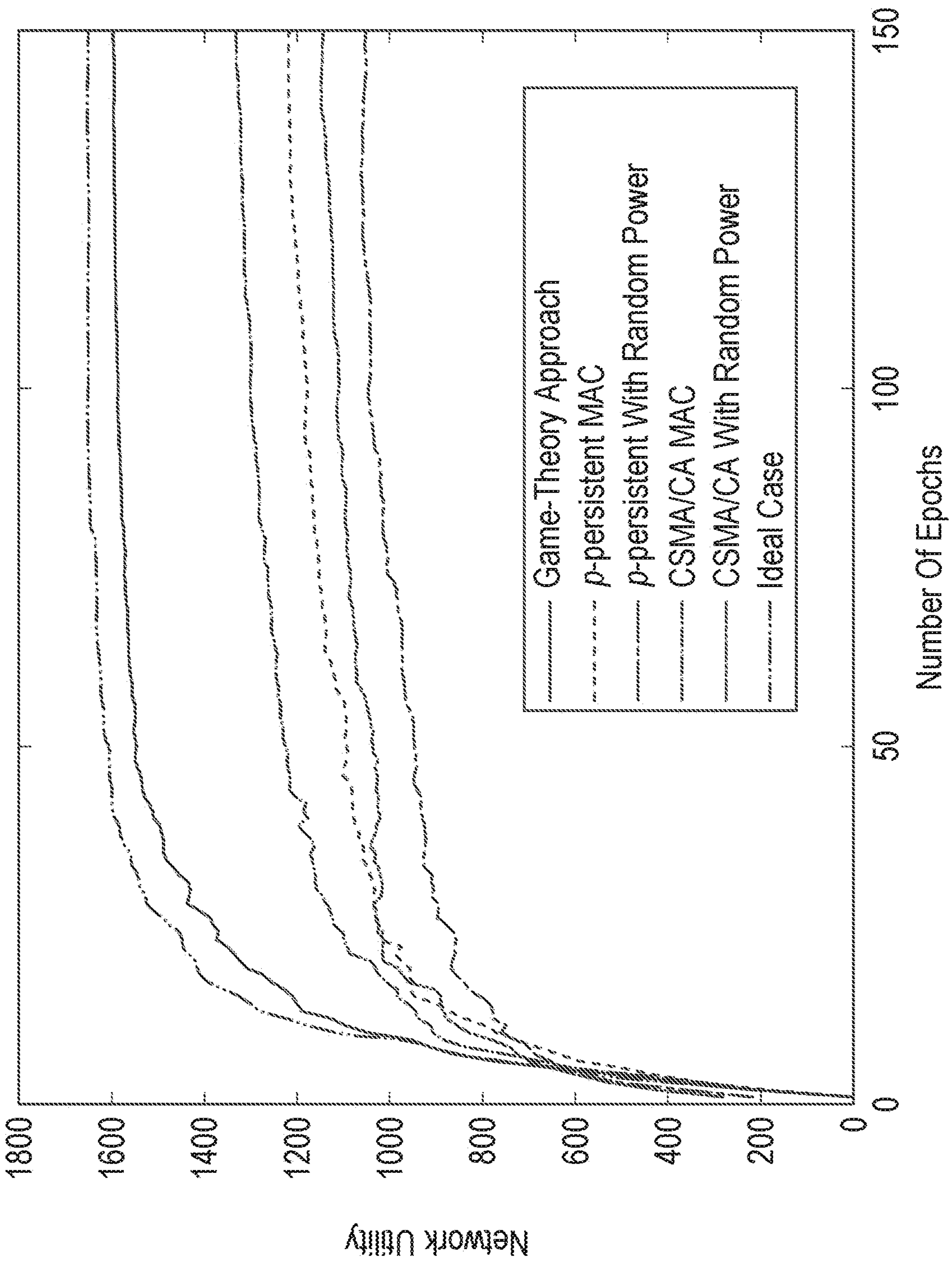
FIGS. 9A, 9B, and 9C illustrates the effect of BS beam width ($\Delta\theta^{BS}$) on the network utility for each access scheme according to one or more embodiments of the present disclosure.
Figure 9B:
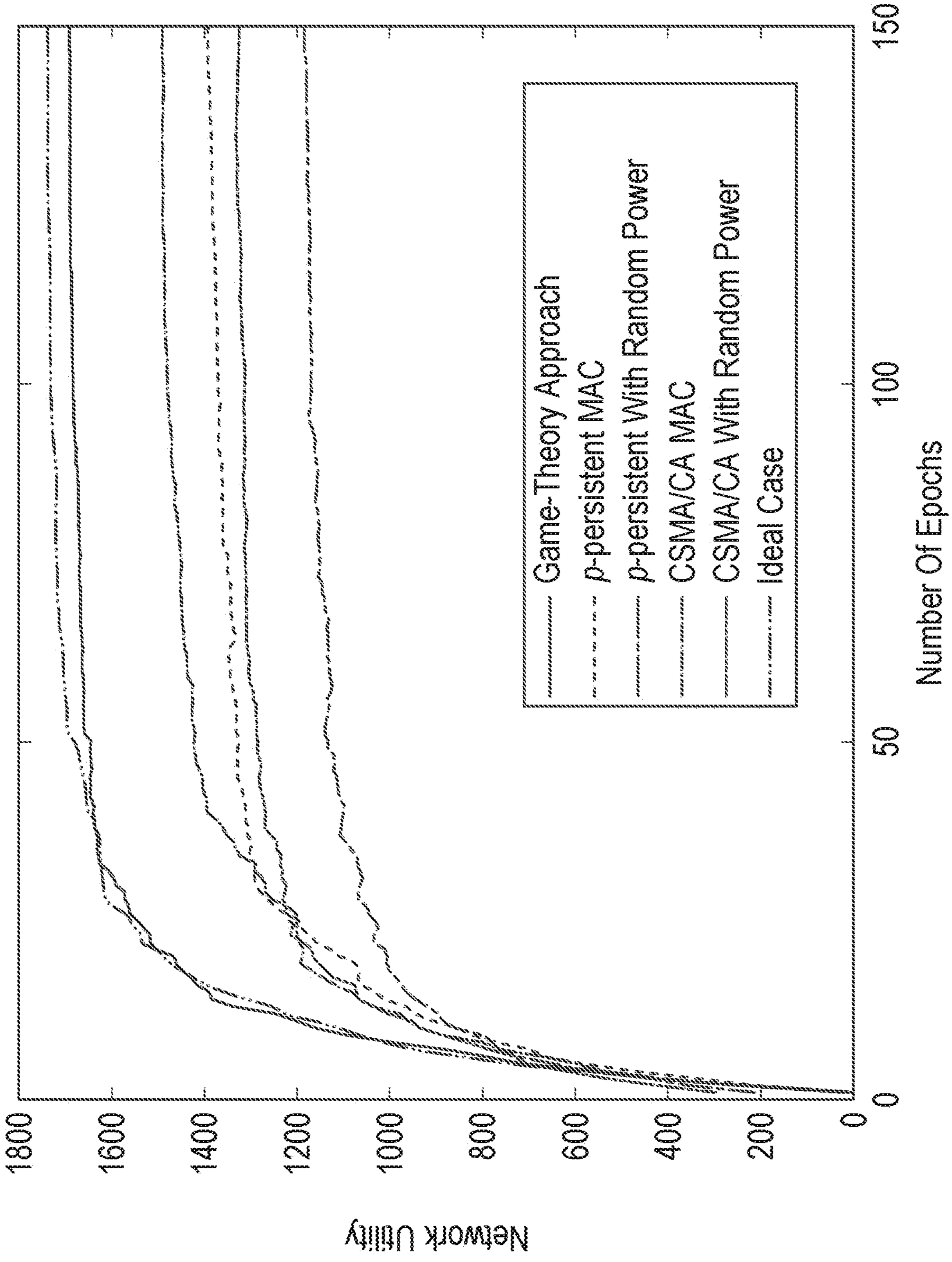
Figure 9C:
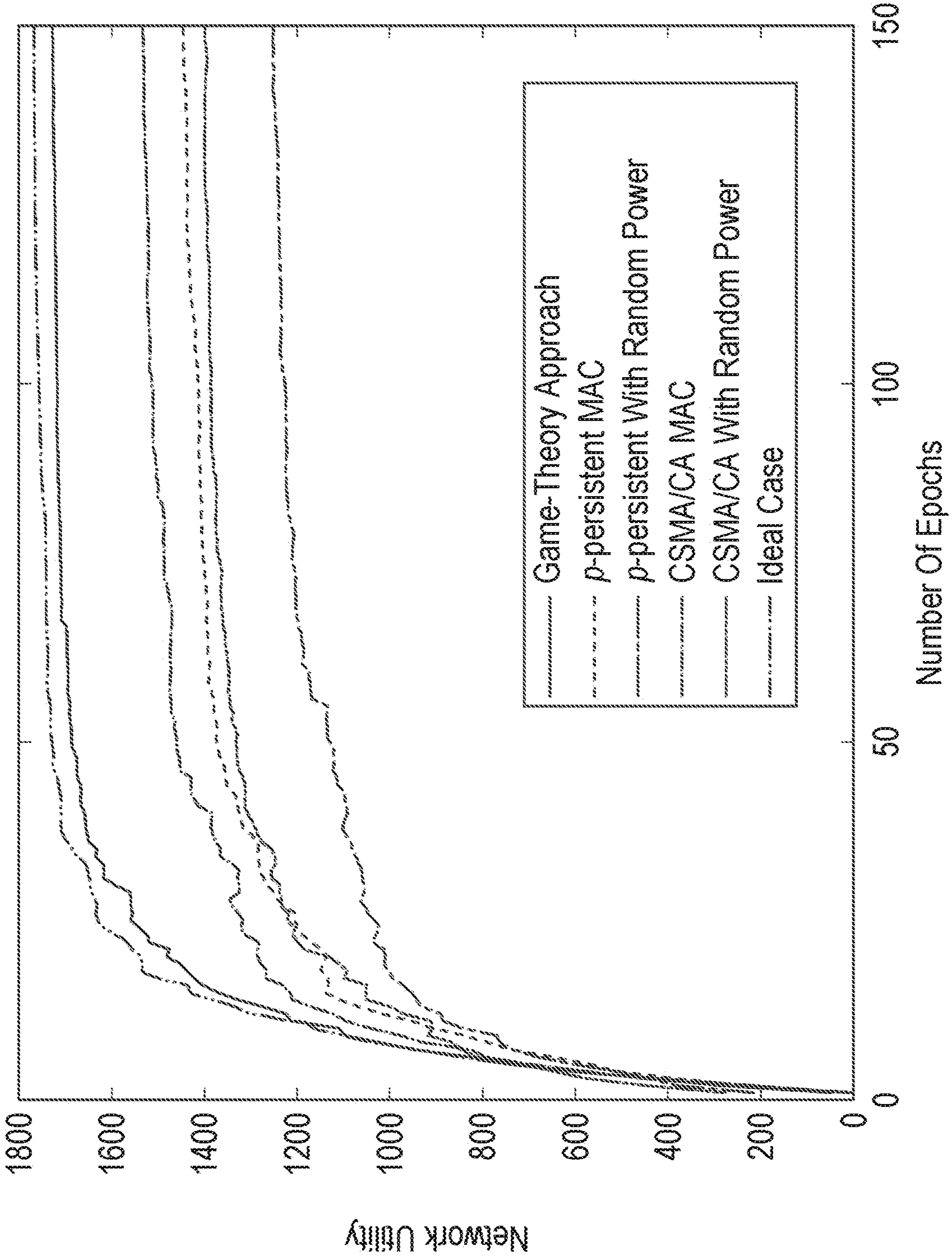

FIGS. 9A, 9B, and 9C illustrate the effect of BS beam width ($\Delta\theta^{BS}$) on the network utility for each access scheme according to one or more embodiments of the present disclosure. The BS antenna MSR is fixed to be $D^{BS}$=20 dB. For example, FIG. 9A illustrates utility versus the number of epochs for $\Delta\theta^{BS}=\pi/9$, $D^{BS}$=20 dB. For example, FIG. 9B illustrates utility versus the number of epochs for $\Delta\theta^{BS}=\pi/36$, $D^{BS}$=20 dB. For example, FIG. 9C illustrates utility versus the number of epochs for $\Delta\theta^{BS}=\pi/72$, $D^{BS}$=20 dB.

Figure 10A:
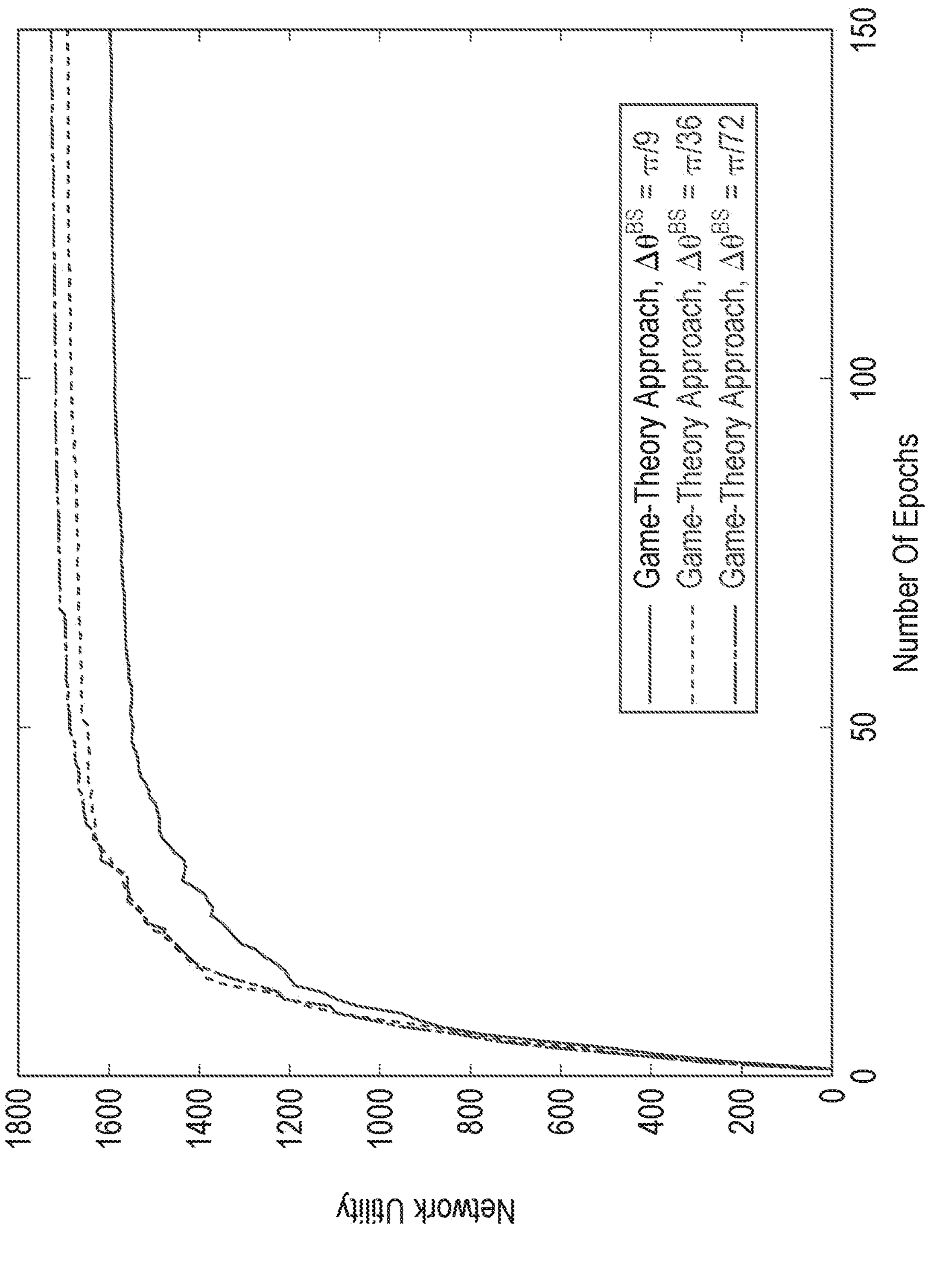
FIGS. 10A, 10B, and 10C illustrate the effect of BS beam width ($\Delta\theta^{BS}$) on the network utility for each access scheme according to one or more embodiments of the present disclosure.
Figure 10B:
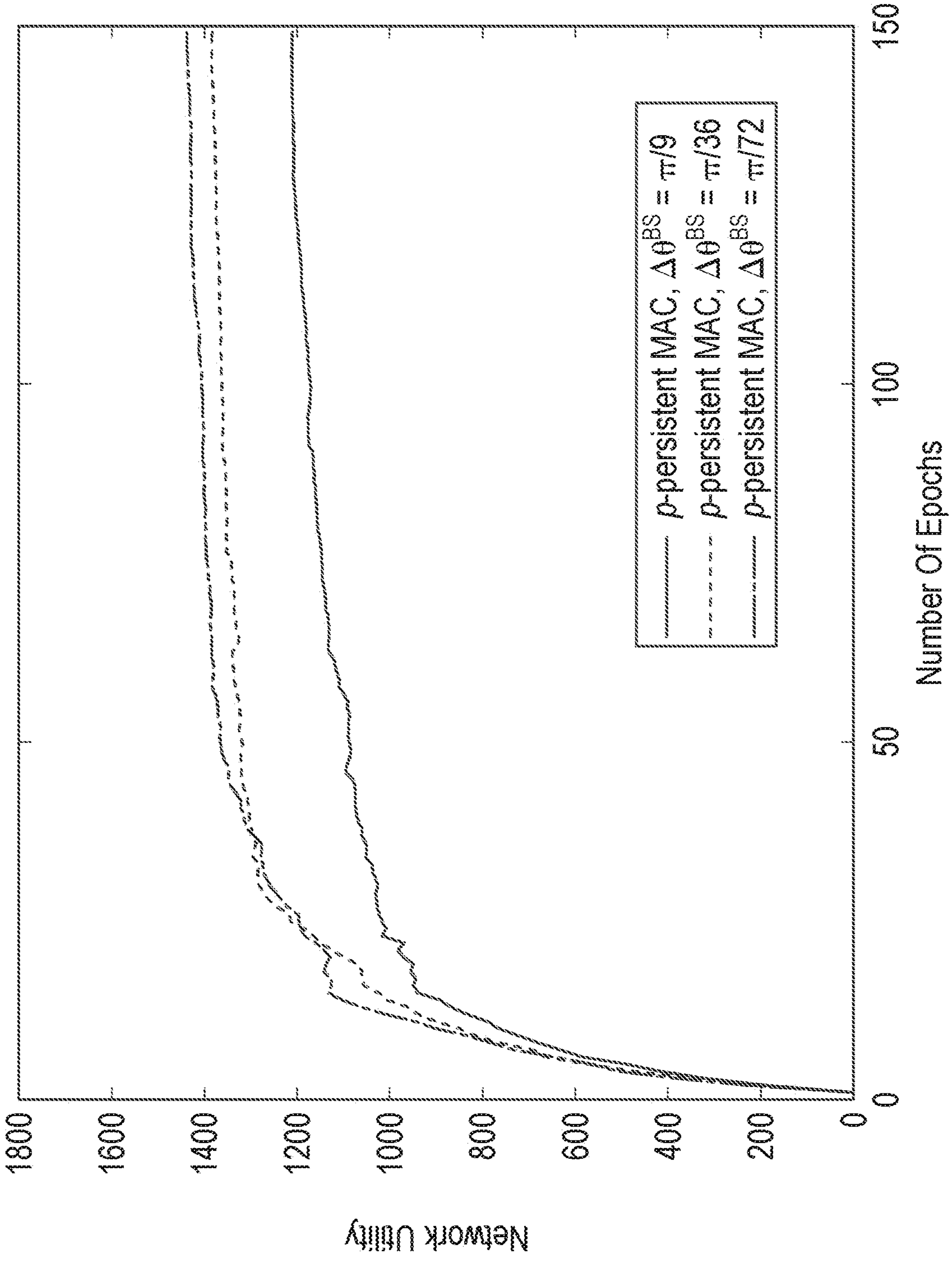
Figure 10C:
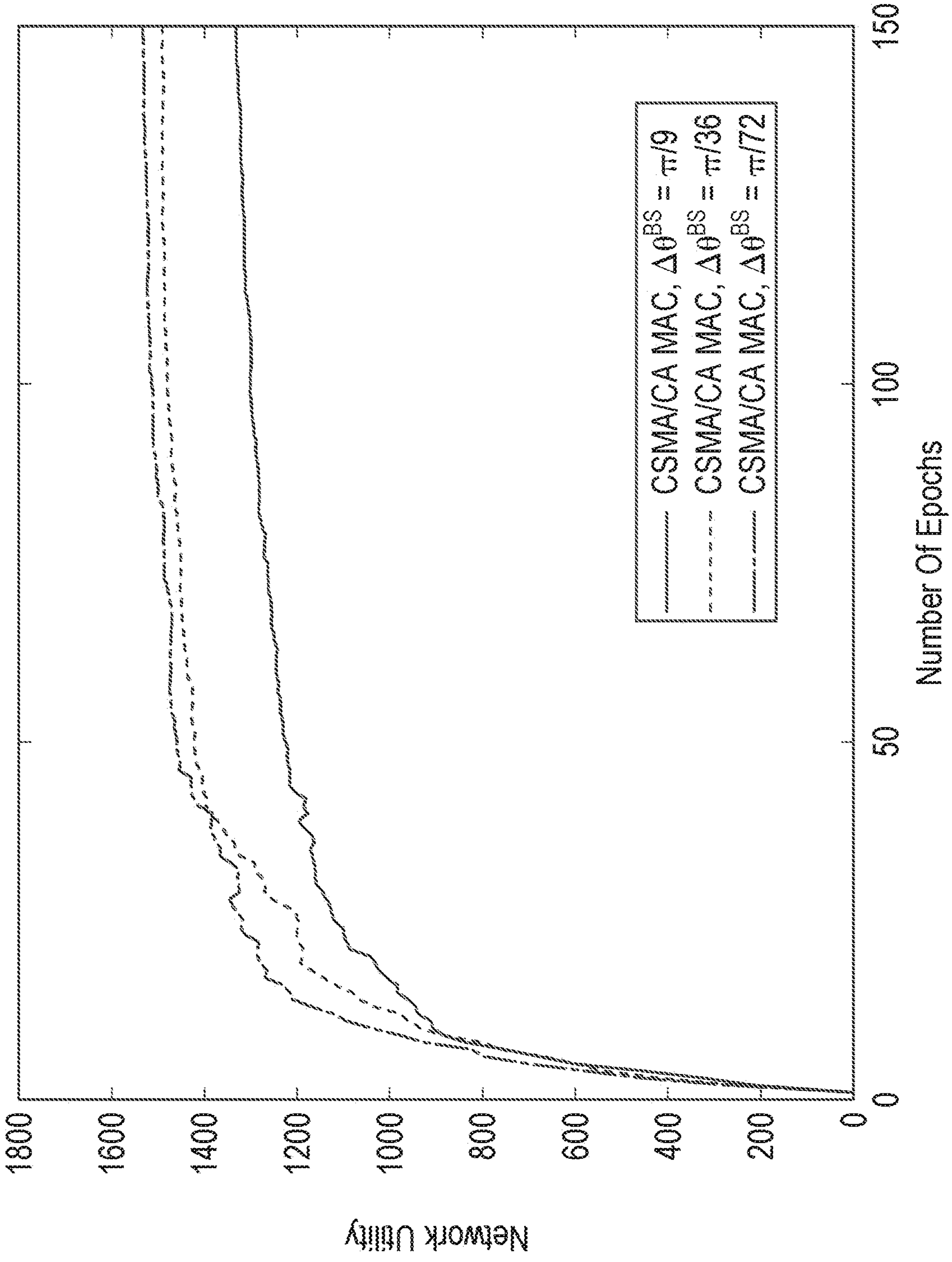

FIGS. 10A, 10B, and 10C illustrate the effect of BS beam width ($\Delta\theta^{BS}$) on the network utility for each access scheme according to one or more embodiments of the present disclosure. The BS antenna MSR is fixed to be $D^{BS}$=20 dB. For example, FIG. 10A illustrates utility versus the number of epochs of the approach for different values of beam width. $D^{BS}$=20 dB. For example, FIG. 10B illustrates utility versus the number of epochs of the p-persistent MAC for different values of beam width. $D^{BS}$=20 dB. For example, FIG. 10C illustrates utility versus the number of epochs of the CSMA/CA MAC for different values of beam width. $D^{BS}$=20 dB.

The network utility (i.e., the logarithm of the time averaged throughput) versus the number of time epochs curve is shown in FIGS. 9A, 9B, and 9C. First, for all the three cases, the algorithm performs strictly better than the baseline schemes. More specifically, the approach converges faster than both baselines and achieves higher asymptotic utility. Second, it can be seen that when the beam becomes narrower, the achieved network utilities of all three schemes increase. This is because narrower beams increase the antenna gain towards the target UE and reduces the chance of covering other interfering BSs in the UE beams, which in turn reduces the interference from other BSs. Note that when the BS antenna beam width is very small and the MSR $D^{BS}$ is very large, the approach will have a similar performance as the ideal case since very sharp beams will eliminate the interference from undesired BSs for the UEs and mimic the performance of the ideal case in which it is assumed that BSs do not interfere with each other.

Effect of BS/UE MSR

The UE antenna beam width and main to side-lobe ratio (MSR) are fixed as $\Delta\theta^{UE}=\pi/18$, $D^{UE}$=10 dB. The BS antenna beam width is fixed to be $\Delta\theta^{BS}=\pi/18$. Then let the BS MSR take values $D^{BS}$=10, 20 and 30 dB respectively in order to see its effect on the scheduling algorithm performance.

Figure 11A:
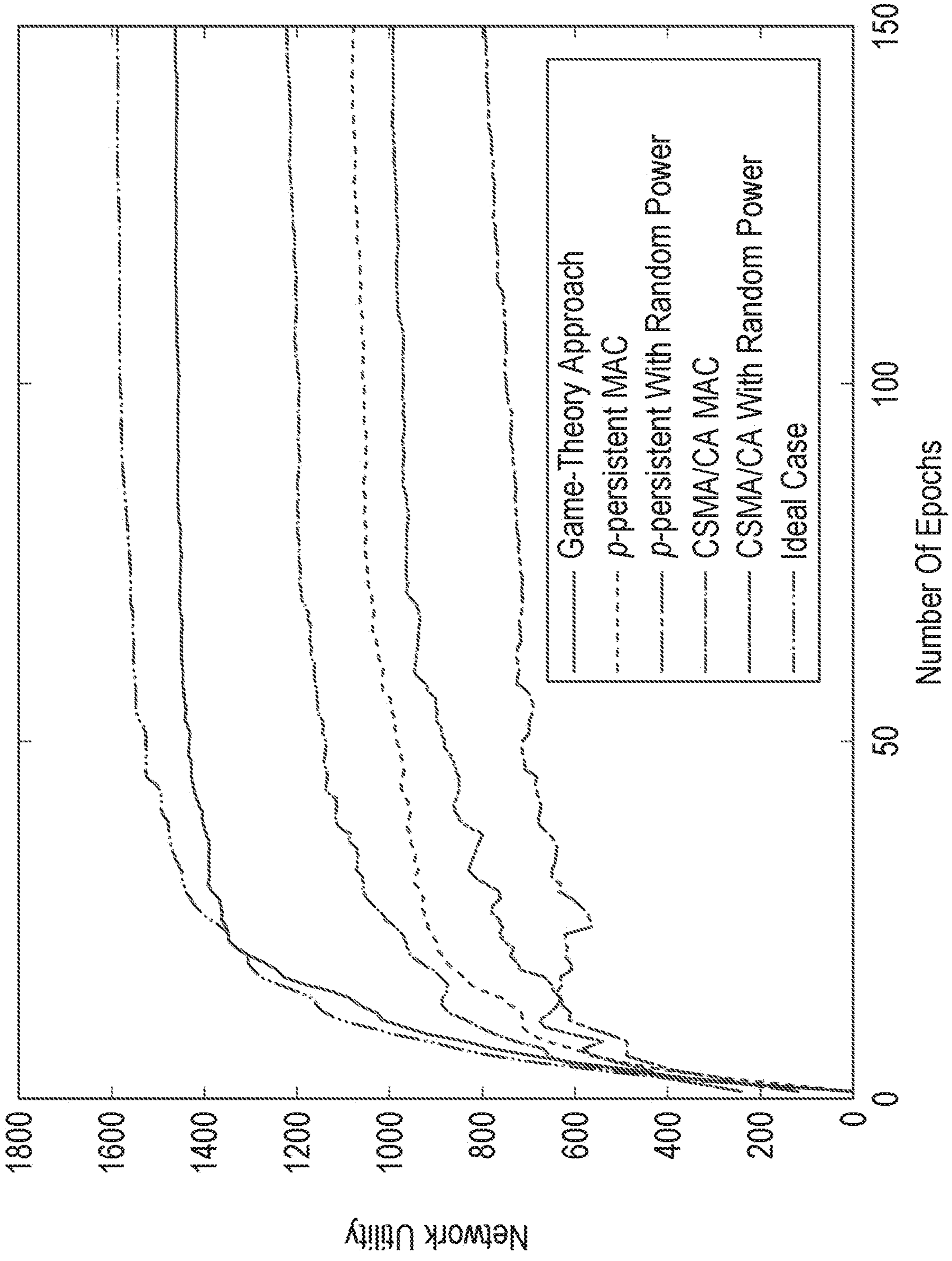
Figure 11B:
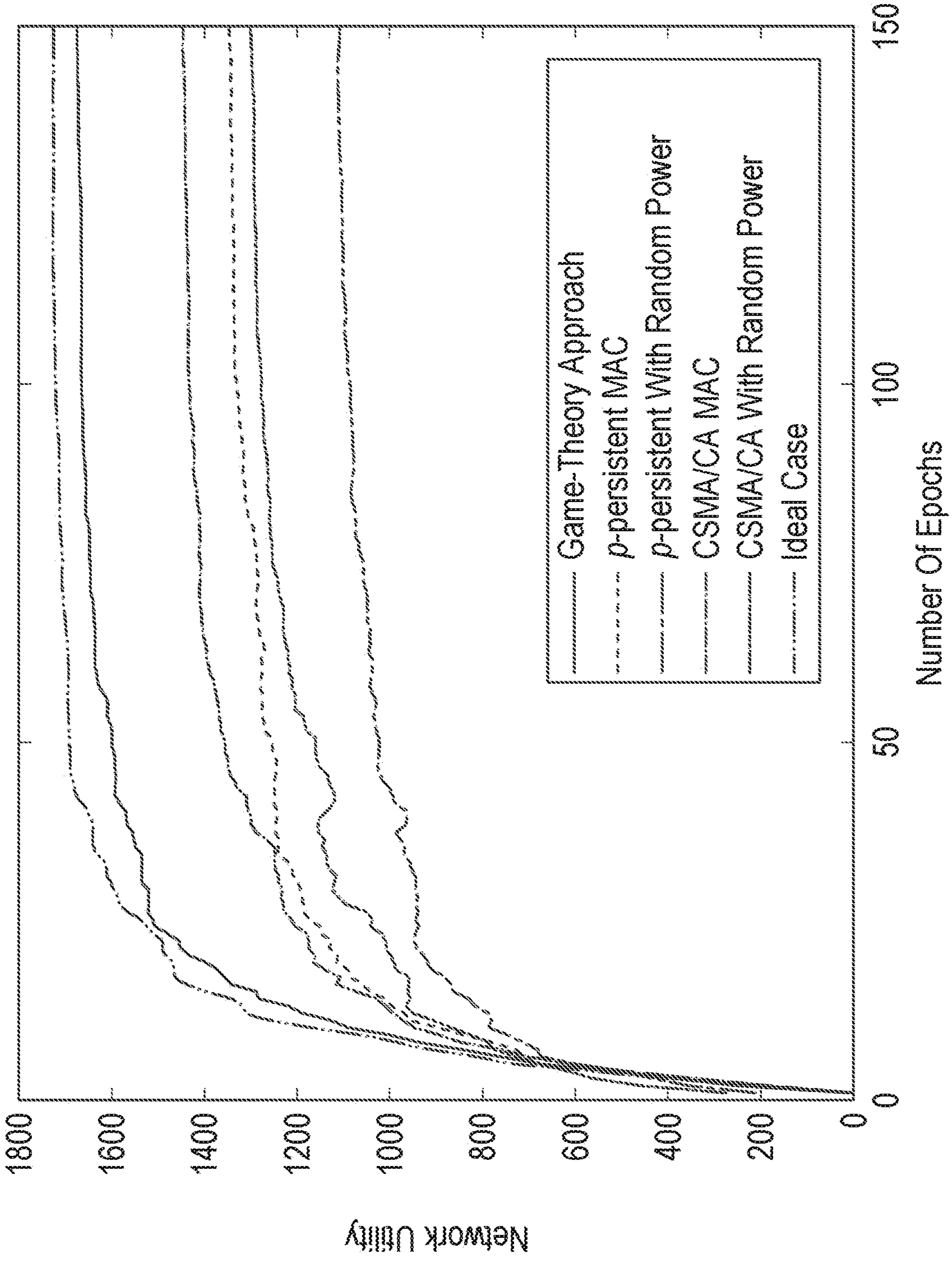
Figure 11C:
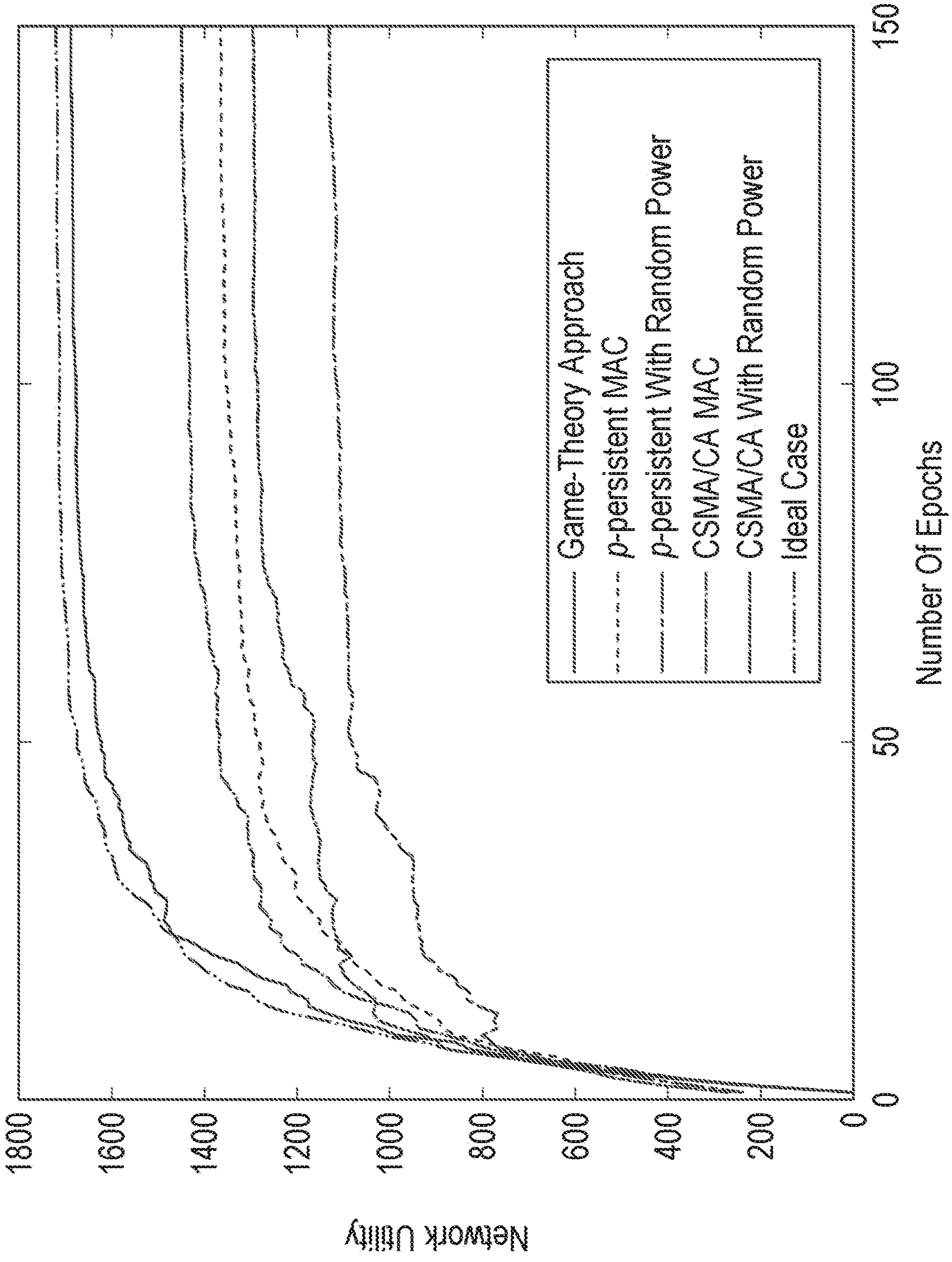

FIGS. 11A, 11B, and 11C illustrate the effect of BS MSR ($D^{BS}$) on the network utility for each MAC scheme according to one or more embodiments of the present disclosure. The beam width and Lyapunov constant are fixed to be $\Delta\theta^{BS}=\pi/18$, V=1000. For example, FIG. 11A illustrates utility versus the number of epochs for $D^{BS}$=10 dB, $\Delta\theta^{BS}=\pi/18$. For example, FIG. 11B illustrates utility versus the number of epochs for $D^{BS}$=20 dB, $\Delta\theta^{BS}=\pi/18$. For example, FIG. 11*c* illustrates utility versus the number of epochs for $D^{BS}$=30 dB, $\Delta\theta^{BS}=\pi/18$.

Figure 12A:
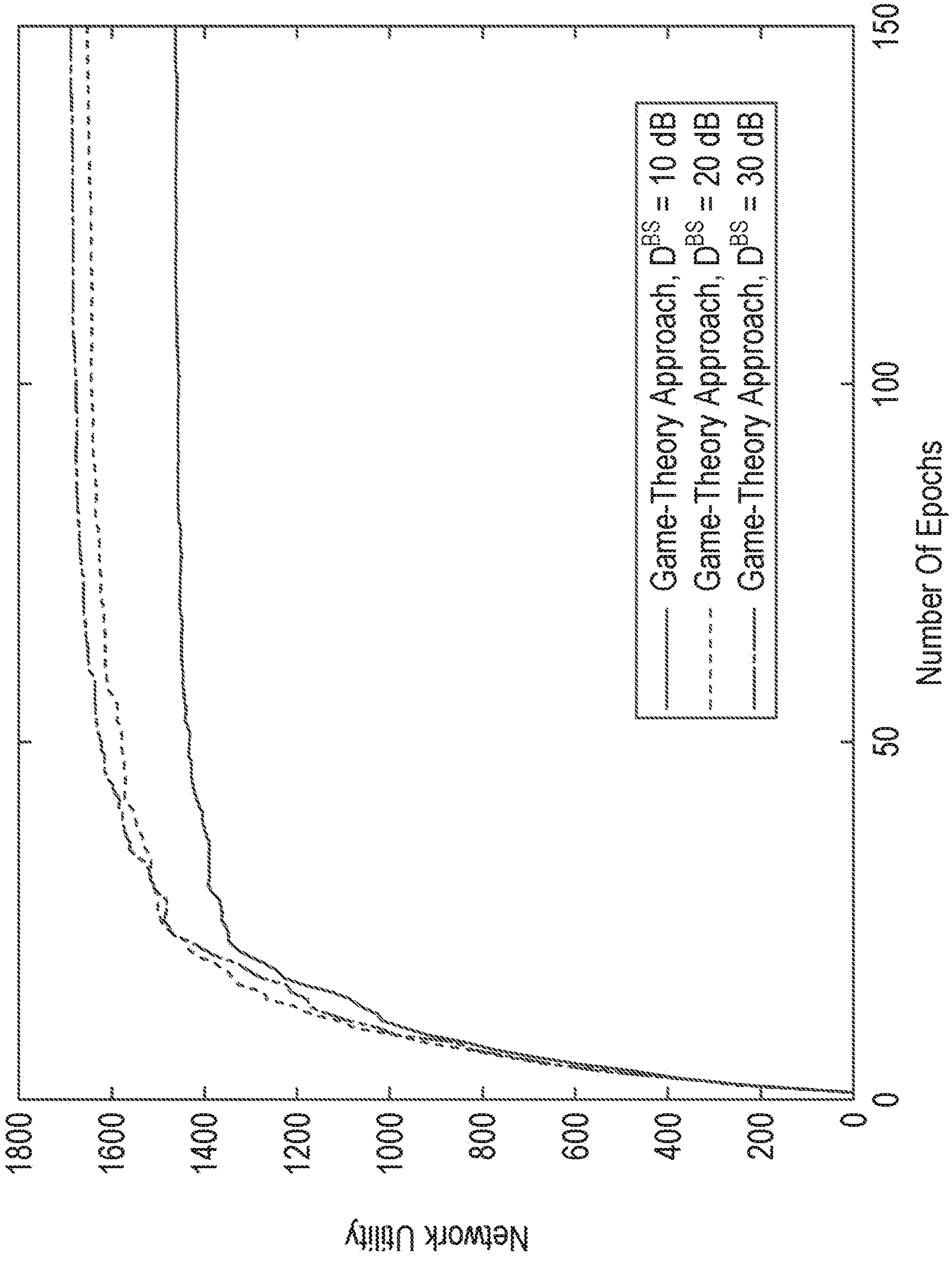
FIGS. 12A, 12B, and 12C illustrate the effect of the BS MSR ($D^{BS}$) on the network utility for each MAC scheme according to one or more embodiments of the present disclosure.
Figure 12B:
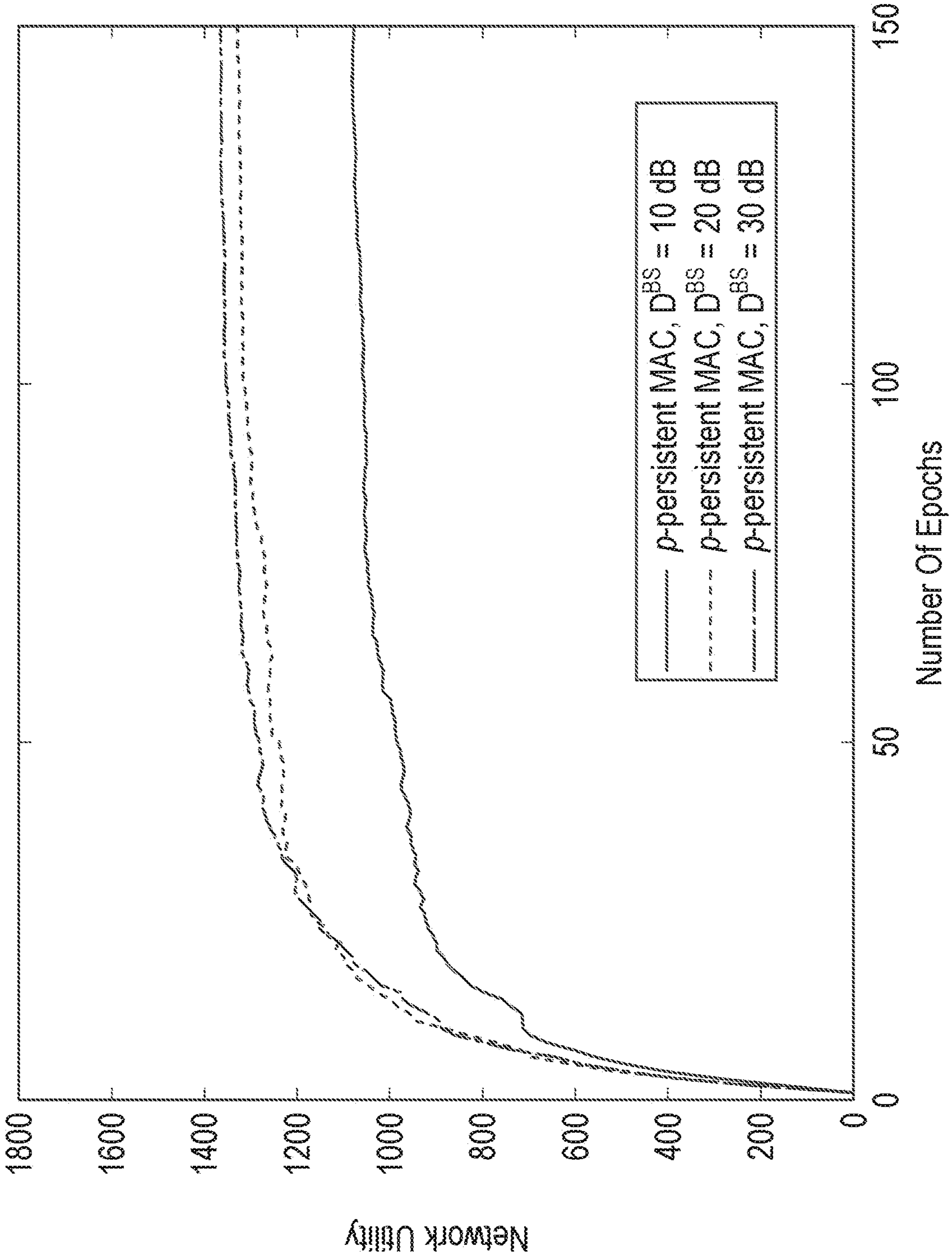
Figure 12C:
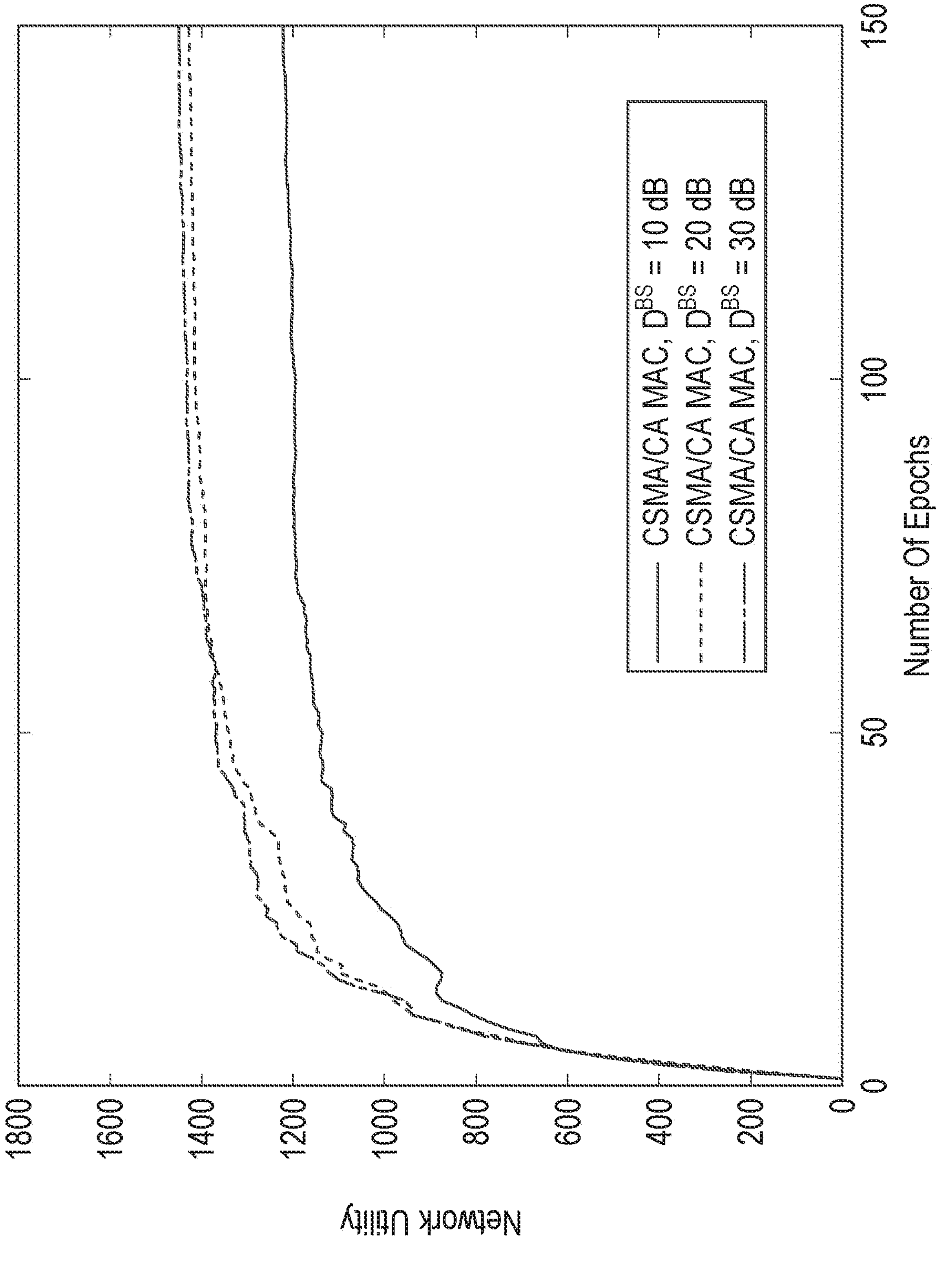

FIGS. 12A, 12B, and 12C illustrate the effect of the BS MSR ($D^{BS}$) on the network utility for each MAC scheme according to one or more embodiments of the present disclosure. The antenna beam width and the Lyapunov constant are fixed to be $\Delta\theta^{BS}=\pi/18$, V=1000. For example, FIG. 12A illustrates utility versus the number of epochs of the approach for different BS MSRs. $\Delta\theta^{BS}=\pi/18$. For example, FIG. 12B illustrates utility versus the number of epochs of the p-persistent MAC for different BS MSRs. $\Delta\theta^{BS}=\pi/18$. For example, FIG. 12C illustrates utility versus the number of epochs of the CSMA/CA MAC for different BS MSRs. $\Delta\theta^{BS}=\pi/18$.

The simulated curves are shown in FIGS. 11A, 11B, and 11C. First, for all three cases, the scheme performs strictly better than the p-persistent protocol (in both convergence speed and asymptotic utility). Second, it can be seen that when the MSR increases, the achieved network utilities of all three schemes increase (see FIG. 5). This is because a higher $D^{BS}$ increases the antenna gain towards the target UE and reduces the side-lobe gain.

Optimality Gap of the Scheduling Algorithm

As can be seen in the simulation results, when the BS antenna beam becomes sharper, i.e., a narrower beam width and a larger MSR, the scheduling algorithm gets closer to the ideal case in terms of the achieved network utility. The reason is that, in the algorithm, BSs update their transmit powers based on the measured interference (plus noise) from all other BSs. When the BS antenna beam width $\Delta\theta^{BS}$ is large, or the BS MSR $D^{BS}$ is small, each UE is more likely to be covered by the main-lobe of many other interfering BSs, which will impose a strong interference to the UE and lead to performance degradation in throughput and therefore in network utility. FIG. 6 shows the utility gap between the approach and the ideal case for various BS antenna beam width and MSRs.

FIGS. 12A, 12B, and 12C illustrate optimality gap between the scheduling algorithm and the ideal case for BS antenna parameters ($\Delta\theta^{BS}$, $D^{BS}$)=(π/6, 10 dB), (π/180, 30 dB) and (π/360, 50 dB), respectively.

It can be seen that when the BS beam becomes sharper, the gap of the achieved network utility between the algorithm and the ideal case shrinks. As an extreme case when $\Delta\theta^{BS}=\pi/360$, $D^{BS}$=50 dB, the algorithm achieves almost the same performance as the ideal case.

CONCLUSION

Some embodiments relate to the distributed beam scheduling problem for 5G mm-Wave cellular networks where there is no cooperation or centralized coordination among base stations belonging to different operators that share the same spectrum. Some embodiments include a new design framework based on the Lyapunov stochastic optimization techniques to maximize the network utility as a function of the time averaged throughput subject to the average and peak power constraints of the base stations. The original network utility optimization problem was then transformed into two sub-optimization problems which solve the auxiliary variables (convex) and the power allocation at each epoch (non-convex). With theoretical performance guarantees, a distributed beam scheduling algorithm to mainly cope with the non-convexity of the second sub-optimization problem by formulating the scheduling problem as a non-cooperative game with optimal weights determined by the virtual queues and the first sub-optimization problem was provided. An iterative interference-measuring based updating algorithm was provided to solve the Nash Equilibrium and was shown to have fast converge speed. The effectiveness of the scheduling algorithm was numerically evaluated and compared to several baseline MAC scheduling algorithms including p-persistent and CSMA/CA protocols. The optimization framework can accommodate a large range of other MAC protocols for network utility maximization.

O-Learning Based Approach

Introduction

Additionally or alternatively, various embodiments relate to distributed downlink beam scheduling and power allocation for millimeter-Wave (mmWave) cellular networks where multiple base stations (BSs) belonging to different service operators share the same unlicensed spectrum with no central coordination or cooperation among them. Various embodiments include efficient distributed beam scheduling and power allocation algorithms such that the network-level payoff, defined as the weighted sum of the total throughput and a power penalization term, can be maximized. Various embodiments include a distributed scheduling approach to power allocation and adaptation for efficient interference management over the shared spectrum by modeling each BS as an independent Q-learning agent. Extensive experiments were conducted under various scenarios to verify the effect of multiple factors on the performance of both approaches. Experiment results show that the approach adapts well to different interference situations by learning from experience. The approach can also be integrated into a Lyapunov stochastic optimization framework for the purpose of network utility maximization with optimality guarantee. As a result, the weights in the payoff function can be automatically and optimally determined by the virtual queue values from the sub-problems derived from the Lyapunov optimization framework.

Various embodiments include an approach that uses Q-learning for distributed beam scheduling as well as for power allocation for mmWave networks with non-cooperative operators. First, a general framework for dynamic spectrum sharing for the purpose of optimizing a network-level payoff function, which is defined as the sum throughput penalized by power consumption is presented. The weights in the payoff function can be tuned to find a desirable trade-off between throughput maximization and power consumption. This formulation can work for various different beam scheduling methods and therefore, provides a unified framework for performance evaluation and comparison of these methods. Second, under the payoff optimization framework, Q-learning is applied due to its simplicity and performance. A learning-based power allocation algorithm is presented by modeling each base station (BS) as an independent Q-learning agent that interacts with the radio environment determined by the joint actions of all BSs and channel uncertainty. It is demonstrated that the learning approach adapts well to different interference situations. The approach can be integrated seamlessly into a general network utility maximization framework by using the Lyapunov stochastic optimization herein. In this case, the weights in the payoff function can be automatically and optimally determined by the virtual queues derived from the Lyapunov optimization.

In general, reinforcement learning-based methods have the advantage of being adaptive to different interference conditions by learning from experience, i.e., past interaction with the environment, the quality of each decision made indicated by the corresponding reward. In addition, by actively exploring non-greedy actions, there is a higher chance of finding the optimal actions in the long run. In contrast, the other methods are greedy by nature—regardless of the interference, each BS will always choose an action that maximizes its payoff in the current step. This greedy nature prevents the BSs from exploring non-greedy actions or adapting their decisions to different interference conditions. This motivates the use of Q-learning for adaptive interference management in mmWave networks.

Various embodiments include a general framework for distributed payoff optimization in non-cooperative mmWave networks and a Q-learning-based beam scheduling and power allocation approach using an independent modeling for each agent (i.e., BS) with a simple tabular representation of action-state values. The approach has lower complexity and better scalability than most deep RL-based approaches and is robust to network configuration change.

Problem Formulation

System Description

Figure 13:
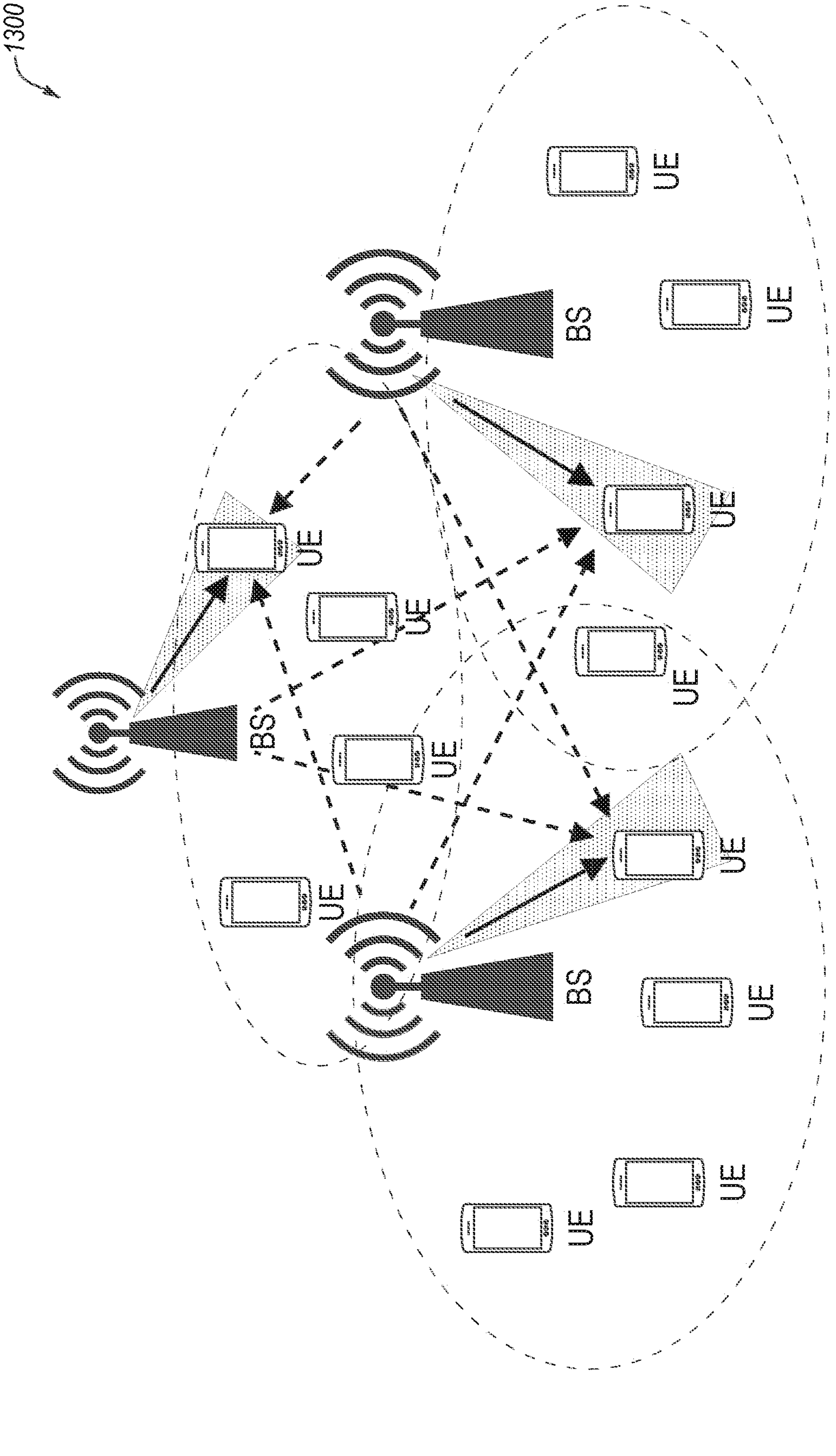
FIG. 13 illustrates an example cellular network in which one or more embodiments of the present disclosure may be implemented.

FIG. 13 illustrates an example cellular network 1300 in which one or more embodiments of the present disclosure may be implemented. Cellular network 1300 consists of M BSs and K UEs where each BS is associated with four UEs. The solid lines represent the data links and the dashed lines represent the interfering links.

Each BS belongs to a different service operator and is responsible for serving a set of $|K_i|=K_i$ UEs within its coverage area. It is assumed that each UE is served by exactly one BS and each BS can serve at most one UE at any given time. This means that $K_i\neq\emptyset$, $\forall i\in M$, $K_i\cap K_j=\emptyset$, $\forall i\neq j$, and $\cup_{i\in_i}=\cdot\cup_{i\in M} K_i=K$. The BS-UE association is assumed to be determined by some exogenous mechanism and is fixed during the considered scheduling process. The system operates synchronously over a shared unlicensed spectrum of bandwidth W Hz with a center frequency at $W_c$ Hz. A frame structure as shown in FIG. 14.

Figure 14:
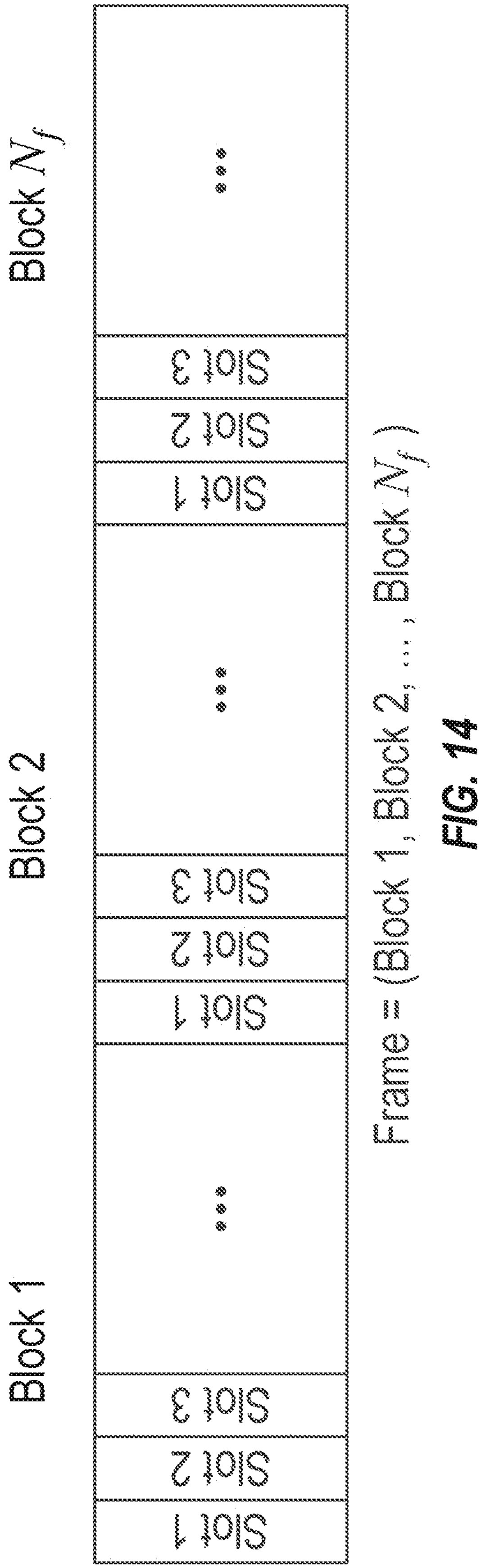
FIG. 14 illustrates an example frame structure according to one or more embodiments of the present disclosure.

FIG. 14 illustrates an example frame structure according to one or more embodiments of the present disclosure. Each timeframe contains $N_f$ blocks and each block contains $N_b$ time slots where each slot has a duration of $T_s$ seconds. Therefore, each frame has a duration $T_f=N_fN_bT_s$ seconds and each block has duration $T_b=N_bT_s$ seconds.

Beam and UE scheduling happens in each block of the frame which means that the beam and UE selection will stay unchanged during each block but will possibly change over different blocks. The BSs and UEs are equipped with directional antennas which are characterized by a keyhole antenna model. The keyhole model has a constant main-lobe radiation gain $G^{max}$ and a constant side-lobe gain $G^{min}$. In particular, the antenna gain $G(\theta)$ in the direction $\theta$ is $$G(\theta)=\begin{cases}G^{max}, & |\theta|\leq\Theta/2\\ G^{min}, & |\theta|>\Theta/2\end{cases} \tag{33}$$

where $\Theta$ is the beamwidth. The antenna also has a total radiation gain of E, i.e., $\Theta G^{max}+(360°-\Theta)G^{min}=E$. Further $$G^{BS}_{j,i}$$

and $$G^{UE}_{j,i}$$

respectively represent the antenna gain of $BS_i$ and $UE_j$ along the direction connecting $BS_i$ and $UE_j$. The main to side-lobe gain ratio (MSR) is defined as $MSR \triangleq 10\lg(G^{max}/G^{min})$. A large MSR means that the antenna has strong radiation in the main-lobe while a small MSR implies energy leakage in the side-lobe. Due to the proximity of locations, the BSs may interfere with the UEs associated with other BSs. For $_i$, let $_{j_i}(j_i\in_i)$ be the UE selected by $_i$ to transmit to. Also, for any $_j$, let be the BS that $_j$ is associated with ($j\in i_j$). The Signal-to-Interference-Noise-Ratio (SINR) at $_j$ can be written as $$SINR_{j,i_j}=\frac{p_{j,i_j}G^{UE}_{j,i_j}G^{BS}_{j,i_j}|h_{j,i_j}|^2d^{-n}_{j,i_j}}{\sum_{\ell\in M\setminus\{i\}}p_{j_l,\ell}G^{UE}_{j,\ell}G^{BS}_{j,\ell}|h_{j,\ell}|^2d^{-n}_{j,\ell}+\sigma^2}, \tag{34}$$

where $p_{j,i}$ denotes the transmit power of $BS_i$ to $UE_j$ if $UE_j$ is served by $BS_i$; $\eta$ is the path-loss factor; $\sigma^2=N_0W$ is the power of the random Gaussian noise ($N_0$ is the noise power spectrum density); $h_{j,i}$ is the small-scale fading between $UE_j$ and $BS_i$, which is assumed to follow the Nakagami-m distribution with probability density $$f(h;\mu,\Omega)=\frac{2\mu^{\mu}}{\Gamma(\mu)\Omega^{\mu}}h^{2\mu-1}\exp\left(-\frac{\mu}{\Omega}h^{2}\right),\ h\geq 0,\text{ where} \tag{35}$$

$$\mu\triangleq\frac{\mathbb{E}[h^2]^2}{\mathrm{Var}(h^2)},\ \Omega\triangleq\mathbb{E}[h^2]$$

and $\Gamma(\bullet)$ is the Gamma function. Assume a block fading channel where the fading coefficients stay unchanged during each frame and are i.i.d. over different frames. (UE mobility is not considered. However, the approach applies to the case when UEs may move slowly such that the channel gains do not change violently over different frames.) Further define the equivalent channel gain $g_{j,i_j}$ between $UE_j$ and $BS_i$ as $g_{j,i_j} \triangleq SINR_{j,i}/p_{j,i_j}$ if $UE_j$ is scheduled and $p_{j,i_j}>0$.

Payoff Maximization

Each BS is subject to an instantaneous peak transmit (TX) power constraint in each slot, i.e., $$\sum\nolimits_{j\in k_i} p_{j,i}\leq p_i^{max}.$$

Since it is assumed that at most one UE can be scheduled at a time, $$p_{j_i,i}\leq p_i^{max}$$

where UE is the scheduled UE by $BS_i$. Let $p\triangleq\{p_{j_i,i}\}_{i\in M}$ denote the TX powers of the BSs to their respective scheduled UEs. Consider a general form of payoff function (for a unit time duration of one second) for each BS which is defined as $$R_i(p)\triangleq\alpha_i W\log(1+SINR_{j_i,i})-\beta_i p_{j_i,i}, \tag{36}$$

i.e., the payoff of $BS_i$ is the throughput of its scheduled UE (weighted by $\alpha_i$) plus a power penalizing term (weighted by $\beta_i$). The weights $\alpha_i$, $\beta_i\geq 0$ can be tuned manually or determined using some algorithms in order to find a desirable trade-off between throughput and power consumption. (An example is presented below where the weights are determined by the queue values derived from the Lyapunov optimization framework.) In particular, the ratio $\alpha_i/\beta_i$ determines the relative importance of throughput maximization to power consumption. If $\alpha_i/\beta_i$ is very large, equation (36) becomes equivalent to maximizing the throughput $R_i(p)\approx\alpha_i W\log(1+SINR_{j_i,i})$. Note that the solution becomes trivial when either $\alpha_i$ or $\beta_i$ is equal to zero. For any given set of scheduled UEs $\{j_i\}_{i\in M}$, an aim is to find efficient power allocation schemes to maximize the sum payoff R(p) of all BSs $R(p)\triangleq\Sigma_{i\in M} R_i(p)$. Let p(t) be the power allocation profile in slot t. Then a goal is to maximize the long-term average payoff $$\bar{R}=\lim_{T\to\infty}\frac{1}{T}\sum\nolimits_{t=1}^{T}R(p(t)) \tag{37}$$

The challenge lies in that this sum payoff maximization problem must be solved in a distributed manner, that is, there is no centralized control or coordination among the BSs as they belong to different service operators. It should also be noted that the above formulation is not particular to any specific scheduling method so new scheduling methods can be developed under the same framework and be effectively evaluated by comparing to previous methods.

Approach

Under the general formulation, the payoff maximization problem (37) is solved using Q-learning by modeling each BS as an independent learning agent that interacts with the radio environment which is governed by the collective behavior of all agents and channel uncertainty. By properly defining the state space and rewards, the learning-based beam scheduling and power allocation is shown to be able to outperform the game-theoretic (GT) approach—an iterative power allocation algorithm for the considered mmWave scheduling problem, especially in the interference-limited regime. In the following, a brief background of Q-learning is presented and then the description of the approach is presented.

Q-Learning Preliminary

In RL, an agent interacts with the environment by making decisions that may affect the state of the environment in a sequence of discrete time steps. In particular, at time t, based on the observation of the current state $s^{(t)}$ of the environment, the agent takes an action $a^{(t)}$ according to a policy $\pi$ as $a^{(t)}\sim\pi(\bullet|s^{(t)})$ with a special case of being deterministic with $a^{(t)}=\pi(s^{(t)})$. After taking the action $a^{(t)}$, the agent receives an immediate reward $r^{(t)}$, which indicates the quality of the chosen action $a^{(t)}$ in state $s^{(t)}$. As a result of the above interaction, the environment transitions to a new state $s^{(t+1)}$. The goal of RL is to maximize the agent's long-term expected reward $G^{(t)}$ defined as $$G^{(t)}\triangleq\sum\nolimits_{k=0}^{\infty}\gamma^k r^{(t+k+1)},$$

where $\gamma$ is the discount factor which indicates the importance of future rewards. Model-free RL aims to find a an optimal policy $\pi^*$ that maximizes the expected reward $G^{(t)}$ by learning directly from the agent-environment interactions represented by a set of quadruples $\{(s^{(\ell)}, a^{(\ell)}, r^{(\ell)}, s^{(\ell+1)}): \ell\leq t\}$ called experience (up to time t), without any specific knowledge of the underlying transition probabilities of the environment.

Q-learning is a model-free off-policy learning algorithm for estimating the optimal action-state values $q_*(a, s)$ for each action-state pair $(a, s)\in A\times S$ (A and S denote the action and state space, respectively). Let Q (s, a) denote an estimate of $q_*(a, s)$. At time t, the agent chooses its action using the E-greedy action selection method, that is, with a small probability $\in$ (also termed as exploration rate), the agent chooses a random action in A; else it chooses a greedy action $a^{(t)}=\arg\max_{a\in A}Q(a, s^{(t)})$. After the selection, the action-state values are updated according to $$Q(a^{(t)},s^{(t)})\leftarrow(1-l_r)Q(a^{(t)},s^{(t)})+l_r\left(r^{(t)}+\gamma\max_{a\in\mathcal{A}}Q(s^{(t+1)},a)\right), \tag{38}$$

and Q(a, s) does not update if $(a, s)\neq(a^{(t)}, s^{(t)})$. $l_r\in(0,1]$ is the learning rate which determines to what extent the new estimate $r^{(t)}+\gamma\max_{a\in\mathcal{A}}Q(s^{(t+1)},a)$ overrides the old estimate $Q(a^{(t)}, s^{(t)})$. Q-learning usually employs a tabular representation $[Q(a, s)]_{|A|\times|S|}$, the Q-table, to store the estimated action-state values. For continuous action or state spaces, neural networks can be used to approximate the action-state values. For a stationary underlying transition model, the Q-learning algorithm converges to the optimal policy with probability one asymptotically if the learning rate $l_r(t)$ at time t satisfies $$\sum_{t=1}^{\infty} l_r(t) = \infty, \sum_{t=1}^{\infty} l_r(t)^2 < \infty.$$

For optimizing an expected reward over a finite horizon T, a constant learning rate $l_r$ can be used.

Q-Learning

One key feature of the learning-based methods, specifically Q-learning, is the ability to adapt by learning from experience and exploring, going beyond the mere greedy nature of the game-based methods. One major challenge in the considered mmWave scheduling problem is how to handle the strong interference due to the lack of centralized coordination of beams. Being purely greedy in this scenario can potentially hurt the overall performance. In particular, if each BS is modeled as a non-cooperative game player that myopically focuses on maximizing its own payoff (say the throughput) in each slot, then each BS will always choose the maximum power to transmit since it gets maximum throughput from this decision. However, if the beams of different BSs overlap, there will be very strong interference at the scheduled UEs, which in turn yields a small network-level payoff. What is even worse is that this situation can happen over and over again as the BSs do not learn from these bad experience. In contrast, if each BS is modeled as an Q-learning agent, the case of overlapping beams can still occur. However, the decisions of the BSs can be very different from the game-based methods. First, each BS can explore non-greedy actions using the E-greedy action selection, partly avoiding the maximum TX power dilemma. Second, each BS can also learn from its past experience to improve the performance. If the overlapping beam situation happens and the BS has chosen the maximum power, then it will receive a small reward due to strong inter-cell interference. This will inform the BS to avoid using maximum power in similar situations in the future and thus improves the long-term throughput performance.

Beam Scheduling and Power Allocation

Due to the adaptation ability of Q-learning as described above and its simplicity, applying the classical Q-learning algorithm to the considered mmWave scheduling problem is described. In particular, each non-cooperative BS is modeled as an independent learning agent that implements the Q-learning algorithm presented in parallel. The key Q-learning components for each agent are defined as follows.

Environment: Each agent interacts with the physical radio environment governed by the collective behaviors, e.g., UE scheduling, TX powers, beam generation, etc., of the BSs subject to random channel realization.

Action: The action for BS i in each slot is the TX power $$p_{j_i,i}^{(t)}.$$

To use the tabular representation of Q-learning, the action and state spaces must be discrete. Therefore, the TX power range $$[0, p_i^{max}]$$

is quantized uniformly into $P_q$ discrete levels $$P_q = \{p_i^1, p_i^2, \ldots, p_i^{P_q}\}$$

to represent the action space where $$p_i^j = (j-1)\frac{p_i^{max}}{P_q - 1}, j \in \{1, \ldots, P_q\}.$$

This means $$p_i^1 = 0$$

and $$p_i^{P_q} = p_i^{max}.$$

The same uniform power quantization is used by all BSs.

Figure 15:
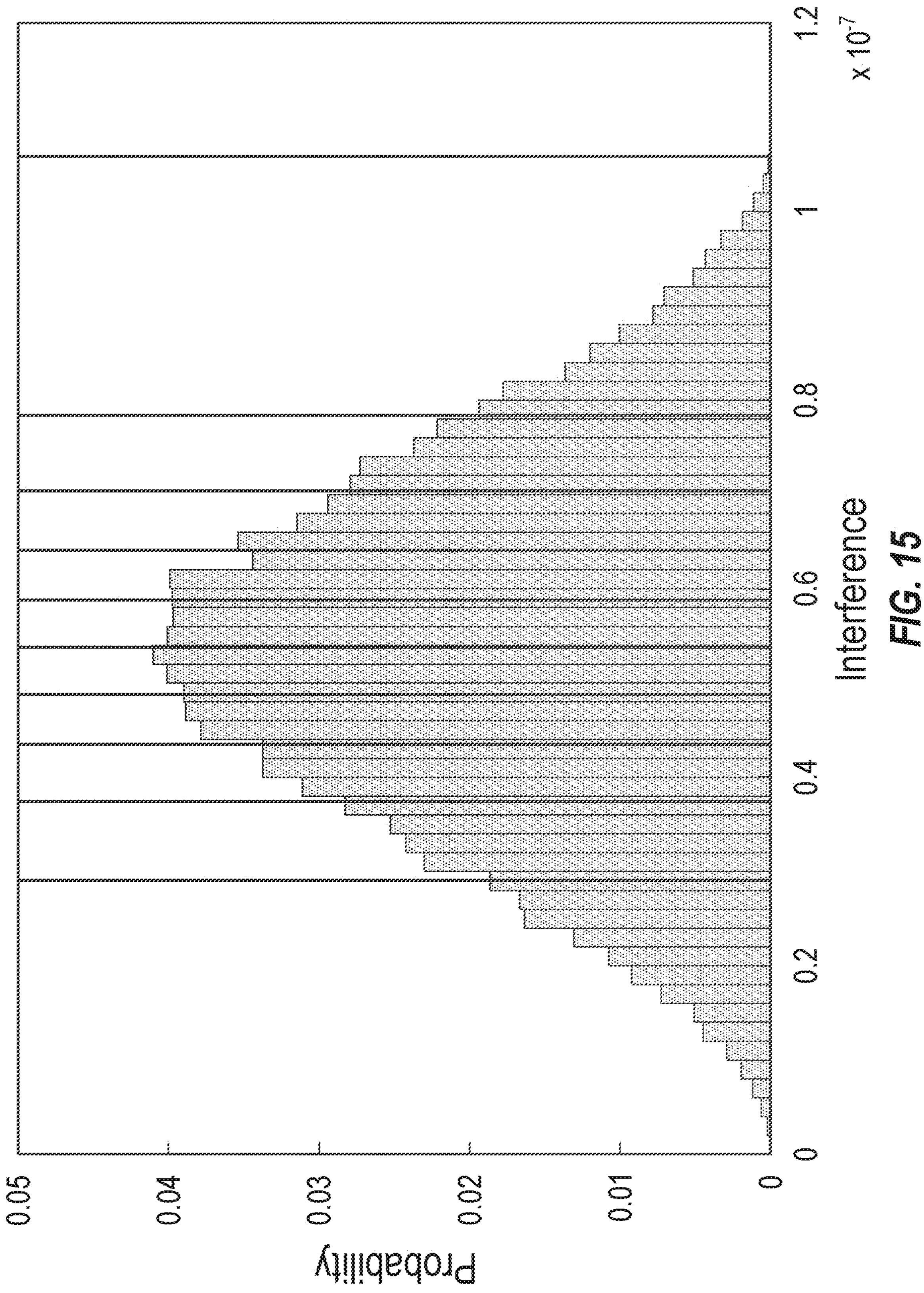
FIG. 15 illustrates an example percentile-based interference quantization with ten levels based on an empirical interference distribution, according to one or more embodiments of the present disclosure.

Observation: Each BS's observation of the environment is defined as the received (RX) interference (plus noise) at its scheduled UE. Let $I_{j_i,i}$ denote the RX interference at $UE_{j_i}$. Suppose $I_{j_i,i}$ follows a (possibly unknown) distribution $D_{j_i,i}$ over the range $$[I_{j_i,i}^{min}, I_{j_i,i}^{max}]$$

with $$I_{j_i,i}^{min}$$

and $$I_{j_i,i}^{max}$$

being the minimum and maximum possible interference respectively. The RX interference also needs to be quantized in order to be represented by a discrete state. A percentile-based quantization method is presented as follows. First $I_q$ percentiles $I_q=\{I_1, I_2, \ldots, I_{I_q}\}$ are derived over the distribution $D_{j_i,i}$. This means that the probability that $I_{j_i,i}$ falls into any interval $(I_j, I_{j+1}]$ is identical and is equal to $1/I_q$, $\forall j \in \{1, \ldots, I_q-1\}$. If the measured interference $I_{j_i,i}$ fall into the interval $(I_j, I_{j+1}]$, the observation of $BS_i$ is 'state j'. Therefore, the state space of $BS_i$ can be represented by $S_i=\{1, 2, \ldots, I_q\}$. The quantization method guarantees that each state will be visited approximately the same number of times in the long run. An illustration of the percentile-based quantization method with $I_q=10$ states is shown in FIG. 15. All BSs are assumed use the same number of states. It should be noted that the UE interference distributions are not know by the BSs so they have to be estimated, after which the above state quantization can be conducted.

FIG. 15 illustrates an example percentile-based interference quantization with ten levels based on an empirical interference distribution, according to one or more embodiments of the present disclosure.

Reward: The reward of $BS_i$ in slot t is defined as $$r_i^{(t)} \triangleq \alpha_i\left(T_s W \log\left(1 + SINR_{j_i,i}^{(t)}\right)\right) - \beta_i\left(T_s p_{j_i,i}^{(t)}\right) \tag{39}$$

where $$SINR_{j_i,i}^{(t)}$$

is the SINR at $UE_{j_i}$ in slot t. The goal of $BS_i$ is to maximize the long-term expected (discounted) reward $$G_i^{(t)} = \sum_{k=0}^{\infty} \gamma^k r_i^{(t+k+1)} \tag{40}$$

starting from any time t. It should be noted that when the discount factor γ is close to 1, equation (40) can be used to approximate problem (36) after averaging over time.

With the above definitions of the action, observation/state and the reward function, the sum payoff maximization problem (46) is solved by letting each BS 'selfishly' maximize its own average payoff $$\overline{R}_i \triangleq \lim_{T\to\infty} \frac{1}{T} R_i(p(t)).$$

To do this, each BS is modeled as an independent learning agent implementing the ∈-greedy action selection method with the goal of optimizing its long-term expected reward (40). For any finite T and γ≈1, optimizing $$\overline{R}_i = \frac{1}{T} \sum_{t=1}^{T} R_i(p(t))$$

becomes equivalent to optimizing equation (40). Therefore, a fully distributed approach using Q-learning in a multi-agent scenario is provided. The beam scheduling and power allocation scheme consists of a training phase followed by an execution phase, which are described as follows.

Training Phase: This phase is to estimate the empirical distribution of the RX interference at each UE so that the interference quantization can be done during the scheduling execution phase. In particular, for the set of scheduled UEs $\{j_i\}_{i\in\mathcal{M}}$, $T_{train}$ runs frames of 'simulated scheduling' in which the TX powers of the BSs are chosen randomly from $\mathcal{P}_q$ in each slot and the wireless channels are subject to change from frame to frame. The interference at each scheduled UE is recorded in all the training frames and derive an empirical interference distribution $\hat{\mathcal{D}}_{j_i,i}$, which will be used to quantize the RX interference in the execution phase. Note that during the training phase, although the powers are randomly selected, the BS/UEs still achieve some data throughput in each slot. Moreover, this training phase only needs to be done once before the 'real' scheduling begins, so the overhead induced by this phase becomes negligible if it is considered the scheduling problem over a large number of frames.

Execution Phase: Beam scheduling and power allocation happen in this phase where the frame structure of FIG. 14 is used. Since UE scheduling is not considered, the UEs can be scheduled randomly or in a round robin manner in different blocks. Therefore, the application of the scheduling approach is focused in one block. Each BS implements the Q-learning algorithm as follows. At the beginning of slot t, based on the current state which is defined as the quantized RX interference at $UE_{j_i}$ in slot t−1 (this interference is measured by UE and then feedback to $BS_i$), $BS_i$ chooses TX power $$p_{j_i,i}^{(t)}$$

according to the E-greedy action selection method, it then generates a beam towards $UE_{j_i}$ and starts the data transmission. Note that no beams will be generated if $$p_{j_i,i}^{(t)} = 0.$$

After the beam generation, $BS_i$ updates its Q-table according to equation (37) where the next state $s^{(t+1)}$ is defined as the quantized RX interference at $UE_{j_i}$ in slot t (after the power selection), and the reward $$r_i^{(t)}$$

is defined in equation (49). The above process is repeated until the end of the current block. The approach, performed in one block, is summarized in Algorithm 2.

---

Algorithm 2: Beam Scheduling & Power Allocation: Execution Phase

---

1: Input: $P_q$, $I_q$, $T_b$, α, β, γ, ϵ and $l_r$.

2: Initialization: Each $BS_i$ randomly picks $UE_{ji}$ and initialize Q-table as $$Q_i(a, s) = 1, \forall (a, s) \in [P_q] \times [I_q].$$

Set t = 1

3: Step 1: $BS_i$ chooses TX power $p_{j_i,i}^{(t)}$ in slot $t$ according to $$p_{j_i,i}^{(t)} = \begin{cases} \text{randomly pick from } P_q, & w \cdot p \cdot \epsilon \\ p_{\hat{a}},\ \hat{a} = \arg\max_{a\in[P_q]} Q_i\left(a, s^{(t)}\right), & w \cdot p \cdot 1 - \epsilon \end{cases}$$

$BS_i$ generates a beam towards $UE_{j_i,i}$ if $P_{j_i,i}^{(t)} \neq 0$.

4: Step 2: Each $BS_i$ updates its Q-table according to: let $$Q_i(a, s) \leftarrow Q_i(a, s), \text{ if } (a, s) \neq \left(a^{(t)}, s^{(t)}\right),$$

and let $$Q_i(a, s) \leftarrow (1 - l_r)Q_i(a, s) + l_r\left(r_i^{(t)} + \gamma \max_{a\in[P_q]} Q_i\left(a, s^{(t+1)}\right)\right),$$

if $(a, s) = (a^{(t)}, s^{(t)})$.

5: Step 3: t ← t + 1. If t ≤ $T_b$, go back to Step 1, else stop.

6: Output: Average reward of all BSs.

---

Remark 1: In Algorithm 2, the Q-tables of the BSs are initialized with all one matrices, i.e., the initial value estimate are set to $Q_i(\alpha, s)=1, \forall\alpha, s$. This is termed as the principle of being optimistic in the face of uncertainty which is widely used in value-based RL applications.

Remark 2 (Complexity): For each BS, the storage complexity of the algorithm is $$\mathcal{O}\left(\frac{KP_qI_q}{M}\right)$$

(supposing each BS is associated with the same number of UEs) since each BS has to store a Q-table of size $P_q \times I_q$ for each of its K/M associated UEs. In the execution phase, the implementation complexity per slot is $\mathcal{O}(\max\{P_q, I_q\})$, which is due to the UE interference quantization ($\mathcal{O}(I_q)$) and greedy action selection ($\mathcal{O}(P_q)$). The Q-table update has complexity $\mathcal{O}(1)$. It can be seen that both the storage and implementation complexity scale linearly with the number of discrete powers and interference states, and the storage complexity also scales linearly with the number of UEs. This linear scaling is acceptable in general. Experiments show that the typical values of $P_q \approx 10$, $I_q \approx 20$ suffice to achieve the near-optimal (by letting $P_q$, $I_q$ being arbitrarily large) performance for the considered network in the experiment with four BSs and twelve UEs in total.

Example Simulation

Simulation Setup

Figure 16:
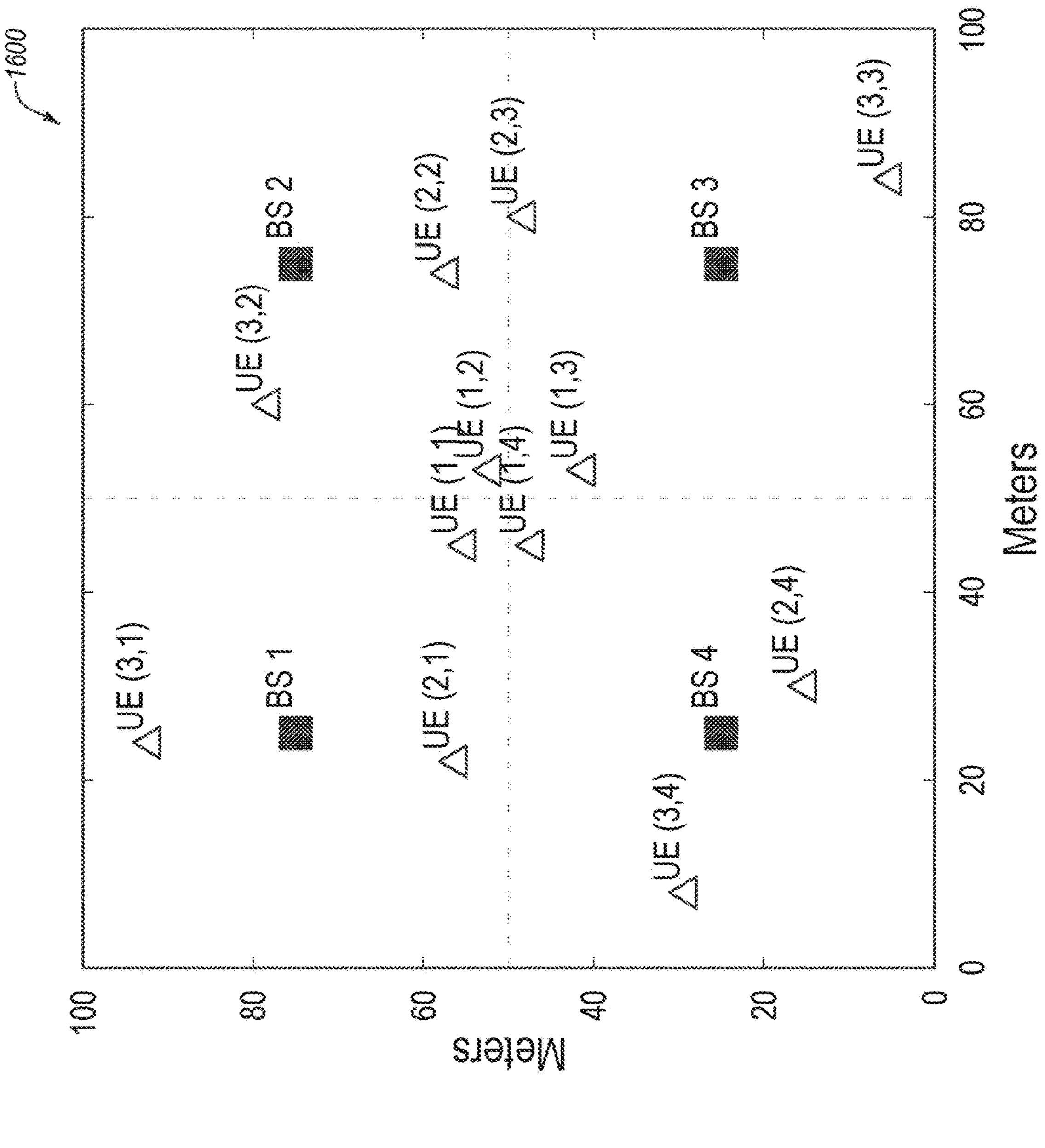
FIG. 16 illustrates an example cellular network in which one or more embodiments of the present disclosure may be implemented.

FIG. 16 illustrates an example cellular network 1600 in which one or more embodiments of the present disclosure may be implemented. Cellular network 1600 includes four BSs each belonging to different operators. Each BS is associated with three UEs located randomly in its coverage area, and the locations of the BSs and UEs are on a 100×100 meter$^2$ planar grid. UE (j, i) represents the $j^{th}$ UE of $BS_i$.

Let l=20 meters be the height of the BS antenna. UE antenna height is assumed to be zero. Therefore, the distance from $BS_i$ to $UE_j$ is equal to $$d_{j,i} = \sqrt{l^2 + \bar{d}_{j,i}^2}$$

where $\bar{d}_{j,i}$ is the planar distance between $BS_i$ site and $UE_j$. The system has a shared bandwidth of W=400 MHz with a center frequency $W_c$=37 GHz. Each BS is subject to a peak instantaneous power constraint $$p_i^{max} = 39 \text{ dBm} (7.94 \text{ Watt}).$$

Noise power is calculated according to $$\sigma^2(\text{dBm}) = 10\lg(\kappa_B T_0 \times 10^3) + NR(\text{dB}) + 10\lg W$$

where $\kappa_B = 1.38\times10^{-23}$ J/K is Boltzmann's constant, NR is the UE noise figure and $T_0$ is the temperature. Taking the typical values of NR=1.5 dB and $T_0$=290 K, the total noise power over the 400 MHz bandwidth is equal to $\sigma^2$=−86.46 dBm. The beam scheduling and power allocation are in one block with $N_b$=100 slots. Each slot has a duration of one milli-second. The physical environment and learning parameters are listed as follows:

TABLE 1

| Parameter | Value |
|---|---|
| exploration rate $\epsilon$ | 0.05 |
| discount factor $\gamma$ | 0.9 |
| learning rate $l_r$ | 0.1 |
| $p_i^{max}, \forall i \in \mathcal{M}$ | 7.94 Watt |
| noise power $\sigma^2$ | −86.46 dBm |
| pass loss $\eta$ | 4 |
| Nakagami fading $\Omega$, $\mu$ | 100, $10^4$ |
| block size $N_b$ | 100 slots |
| slot duration $T_s$ | 1 millisecond |
| BS antenna height l | 20 meters |

Baseline Scheme

Game-Theoretic (GT) Power Allocation: Some embodiments include a non-cooperative game-based power allocation for distributed interference management in mmWave networks. In such embodiments, each BS is treated as an independent player that selfishly attempts to maximize its own payoff, defined in the form of problem (36). A parallel power adaptation scheme was based on the concept of best response. In each slot, $_i$ updates its power according to $$p_{j_i,i}^{(t+1)} = \left[\frac{\alpha_i W}{\beta_i} - \frac{1}{g_{j_i,i}^{(t)}}\right]_0^{p_i^{max}}, \tag{41}$$

where $g_{j_i,i}^{(t)} \triangleq G_{j_i,i}^{BS} G_{j_i,i}^{UE} |h_{j_i,i}|^2 d_{j_i,i}^{-\eta} / (I_{j_i,i}^{(t)} + \sigma^2)$ is the equivalent channel gain between $BS_i$ and $UE_{j_i}$ in slot t.

$$g_{j_i,i}^{(t)}$$

can be obtained by $BS_i$ by letting $UE_{j_i}$ measuring the RX interference (plus noise)

$$I_{j_i,i}^{(t)} + \sigma^2$$

and then sending back to $BS_i$. The Euclidean projection operator $$[\cdot]_a^b$$

is defined as $$[x]_a^b = a \text{ if } x < a, [x]_a^b = b \text{ if } x > b \text{ and } [x]_a^b = x \text{ if } x \in [a, b].$$

The above power adaptation is proved to converge to Nash equilibrium under certain conditions.

Drawback of the GT power allocation: The GT power allocation may perform poorly in the high interference regime. This is because, for example, for the case of $\beta_i \approx 0$, each BS only aims to maximize its own throughput. The solution to GT is always choosing the maximum power to transmit, regardless of the interference. This may cause interference if the scheduled UEs are close to each other or there is beam overlapping (See FIG. 17), and thus dampening the overall performance.

Figure 17A:
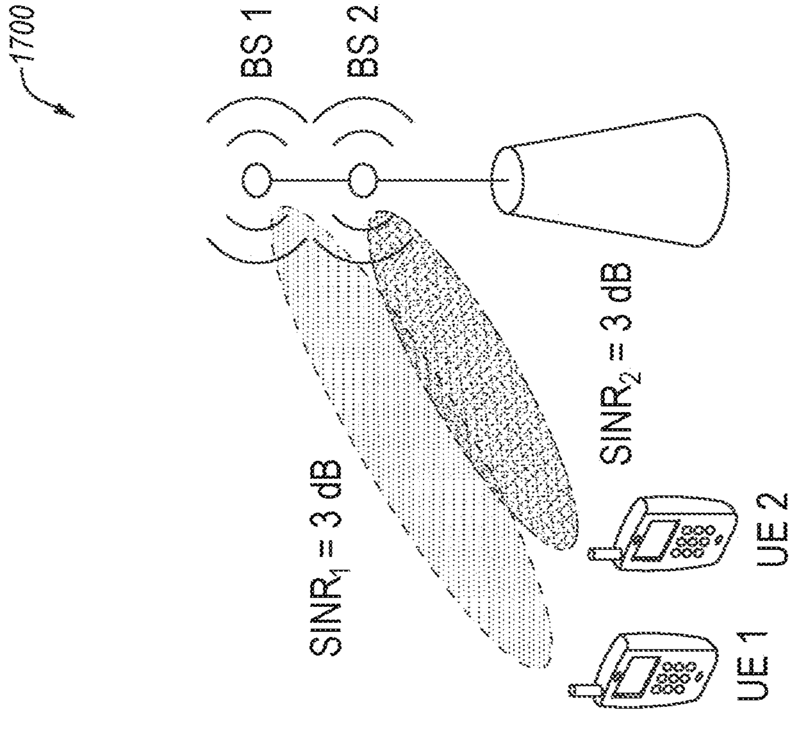
FIGS. 17A and 17B illustrates example cellular networks in which one or more embodiments of the present disclosure may be implemented.
Figure 17B:
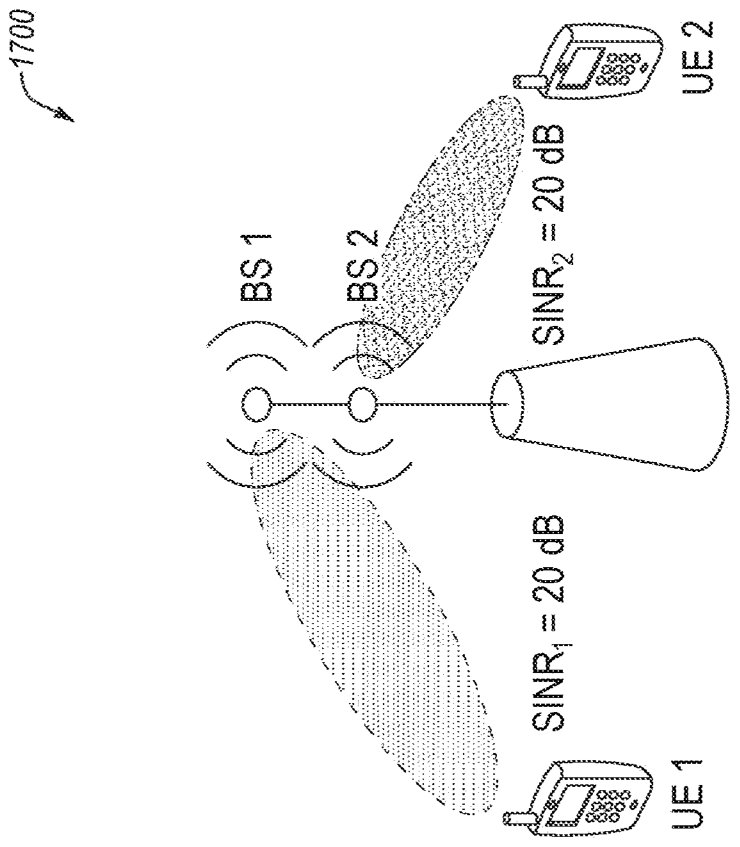

FIGS. 17A and 17B illustrate example cellular networks 1700 in which one or more embodiments of the present disclosure may be implemented. Cellular networks 1700 may include a first network including BS1 and UE1 and a second network including BS2 and UE2. In cellular networks 1700, BS1 and BS2 are collocated. In FIG. 17B, UE1 and UE2 are closely located. There is strong interference due to beam overlapping. GT cannot distinguish the two cases.

However, the Q-learning-based approach can adapt to the physical environment (via observation and action-state value update) which is governed by the joint behaviors of all the agents. Each BS may make decisions other than maximum power based on the current interference state and its experience. For example, for the overlapping beam case, if all BSs are transmitting with high powers, being greedy by choosing a large TX power will emit a small reward as all UE are experiencing strong interference. By learning from the small reward, the Q-learning-based approach can shift to lower power to explore new possibilities of higher reward. However, the GT allocation will be greedy and unable to adapt. Another drawback of the GT method is that it operates with continuous power which is infeasible in practice. However, quantization of TX power will inevitably incur performance loss by the adaptation rule of equation (41). The effect of multiple factors that affect the performance of the approach are verified and it is shown that the performance can be significantly enhanced over GT.

Experiment Result

The approach is compared with the GT power allocation and the effect of the reward weights α, β, the number of power levels $P_q$ and interference states $I_q$ and the BS/UE antenna gain and beamwidth are verified. Throughout the experiment, it is assumed that all UEs have omnidirectional antennas. (Since varying the UE antenna MSR and beamwidth has a similar effect to that of the BS antenna, omnidirectional UEs are used in the experiment.) α=1 for all BSs and and let β=0 and β=0.1 W=$4\times10^7$ to verify its effect.

Effect of $P_q$ and $I_q$

The BS antenna MSR and beamwidth are chosen to be 20 dB and 30°, respectively. The $1^{st}$ UE of each BS is scheduled. This UE selection represents the behavior of the cell-edge UEs which usually suffer from strong interference from neighboring BSs. This phenomenon is even more prominent in ultra-dense small BS 5G cellular networks. To verify the effect of $P_q$, fix $I_q$=10 and let $P_q \in \{10, 20, 40\}$. FIGS. 18A, 18B, 18C, and 18D illustrate the effect of $P_q$ and $I_q$ for different β, according to one or more embodiments of the present disclosure. BSs have MSR of 20 dB and beamwidth 30°, UEs are omnidirectional.

Figure 18A:
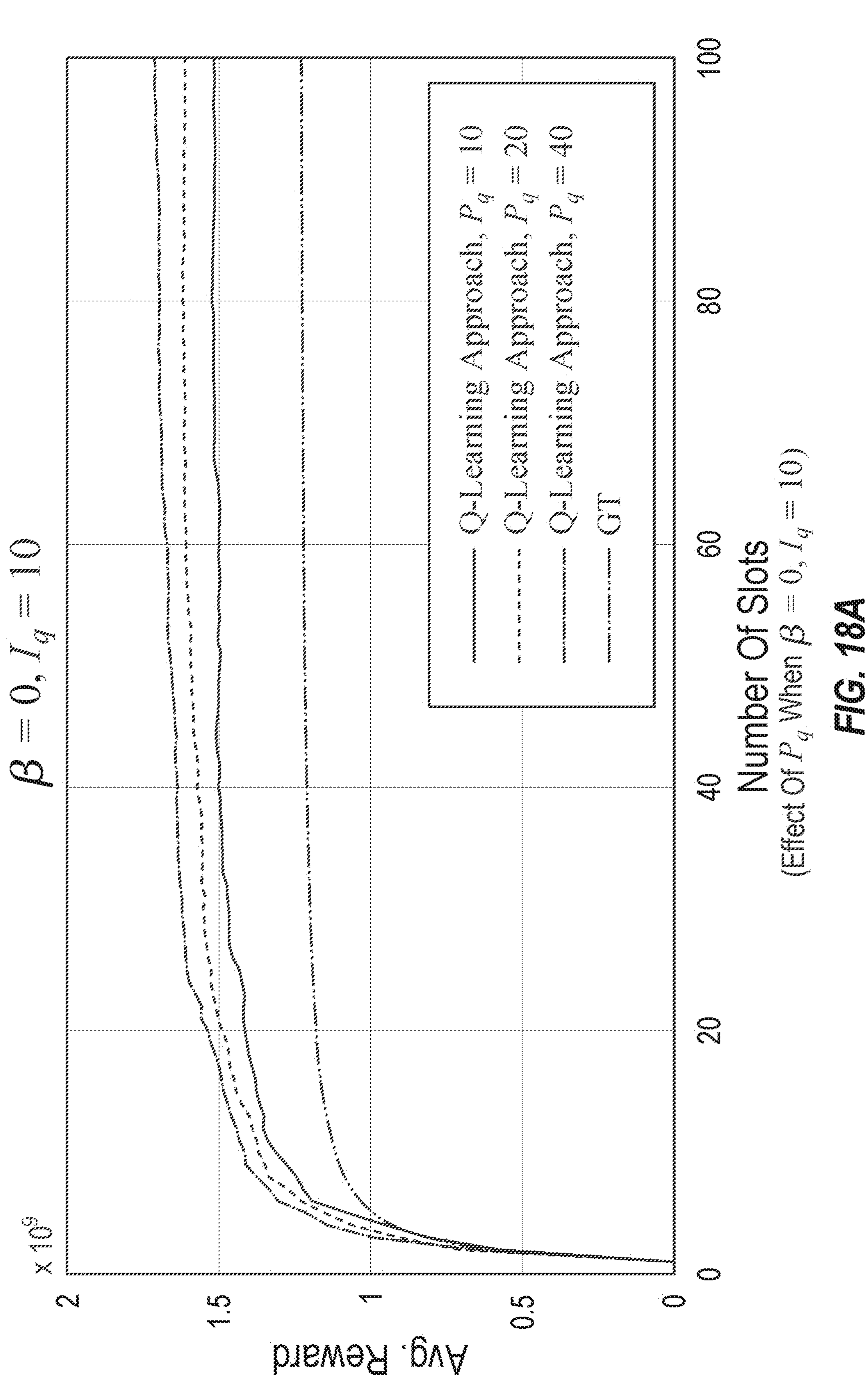
FIGS. 18A, 18B, 18C, and 18D illustrate the effect of $P_q$ and $I_q$ for different β, according to one or more embodiments of the present disclosure.
Figure 18B:
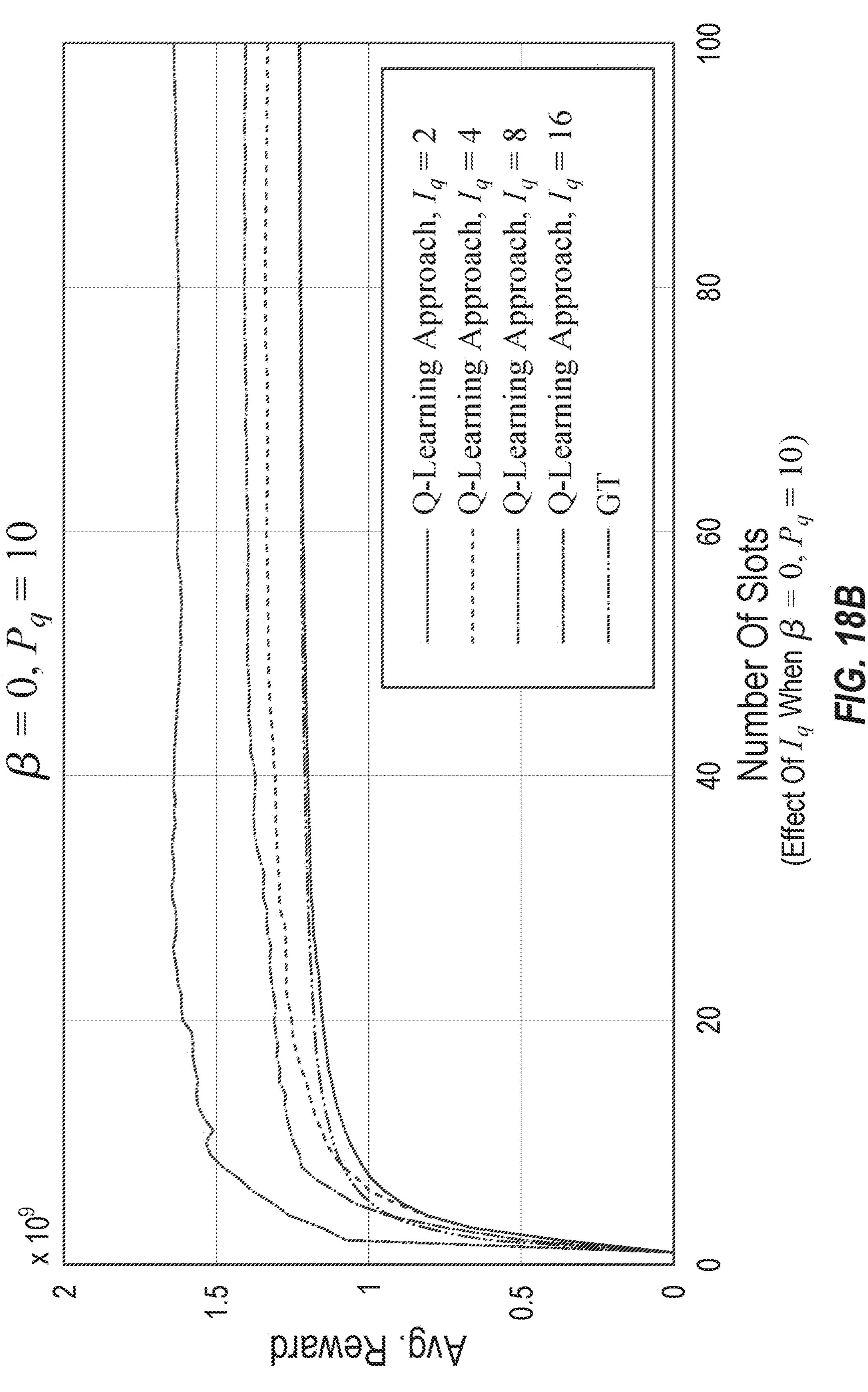
Figure 18C:
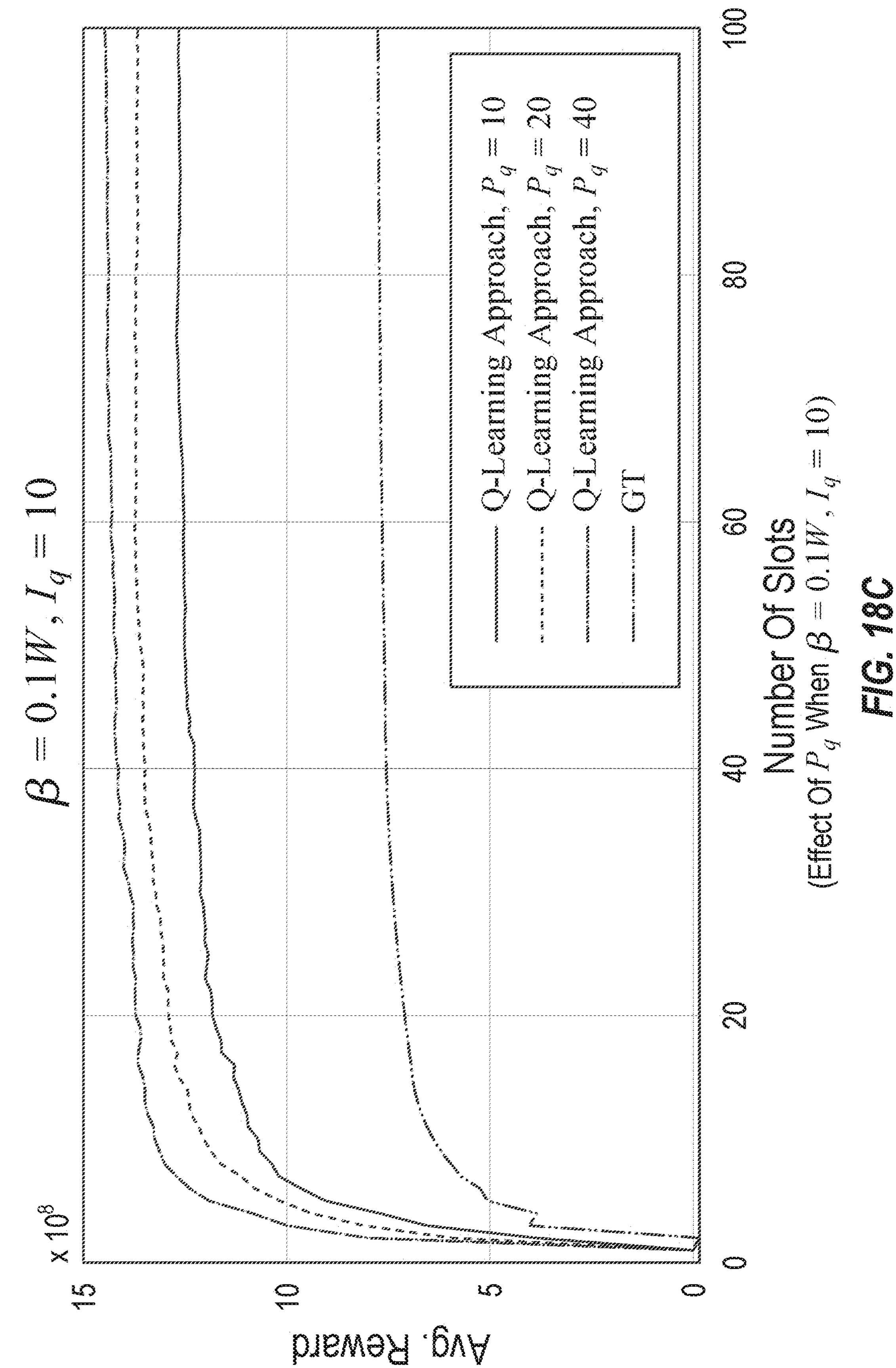
Figure 18D:
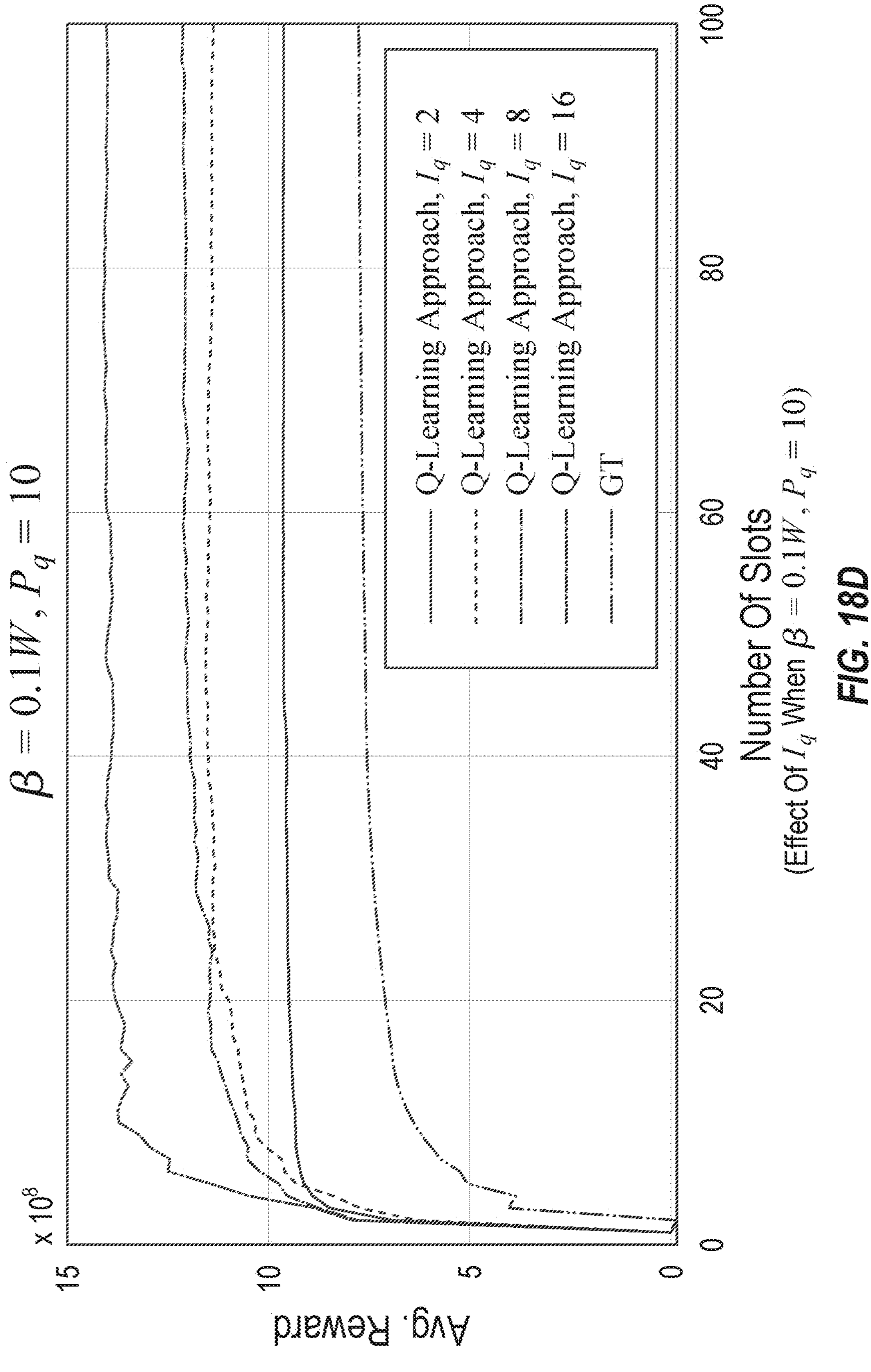

FIGS. 18A and 18C show the effect of $P_q$ for $\beta_i$=0 and 0.1 W, respectively. Each curve represents the average reward achieved up to the current slot, averaged over 50 independent trials each containing a set of i.i.d. channel realizations. For both values of β, it can be seen that the approach outperforms GT. For β=0, the approach achieves 23% to 39% more average reward than GT in the $100^{th}$ slot. For β=0.1 W, the approach achieves 63% to 87% more average reward than GT. Moreover, the average reward increases as $P_q$ increases because larger $P_q$ provides more choices for power selection. To verify the effect of $I_q$, fix $P_q$=10 and let $I_q \in \{2, 4, 8, 16\}$. FIGS. 18B and 18D show the result. For both β=0 and 0.1 W, the achieved average reward of the approach increases as $I_q$ increases. For β=0, when $I_q$=2, the approach achieves a similar performance to GT. However, when $I_q$=16, there is a 33% reward gain compared to GT. For β=0.1 W, the approach achieves 24% to 80% more reward than GT from $I_q$=2 to $I_q$=16. The effect of $I_q$ is expected because when there are more interference states for each agent, the decision making of each agent becomes more flexible and can cater to the specific interference condition according the agent's past experience.

Effect of Beamwidth and MSR

Figure 19:
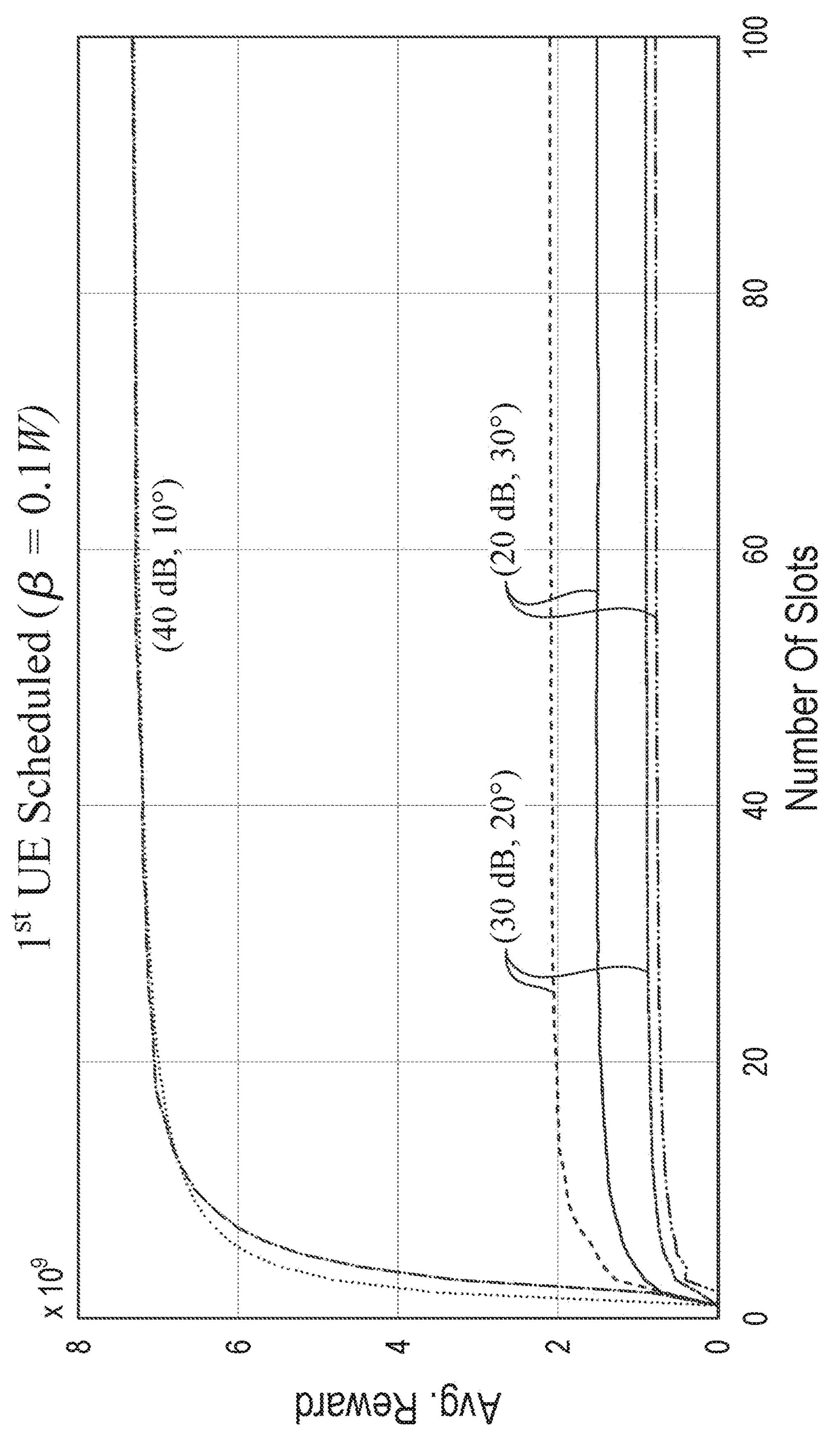
FIG. 19 illustrates a Q-learning approach (solid lines) vs. game-based approach (dash lines) when the $1^{st}$ UE of each BS is scheduled, according to one or more embodiments of the present disclosure.
Figure 20:
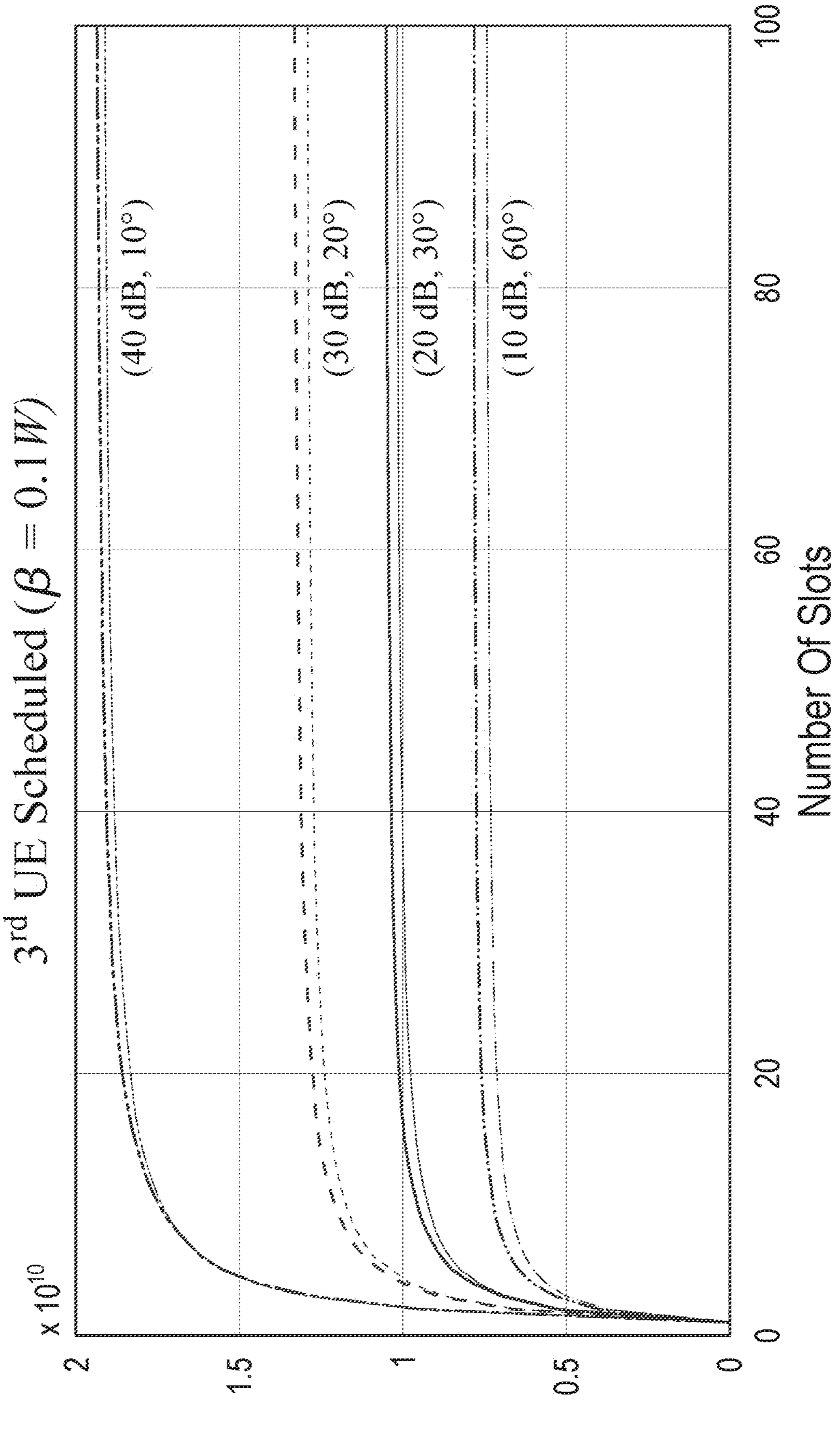
FIG. 20 illustrates a Q-learning (solid lines) vs. game-based approach (dash lines) when the $3^{rd}$ UE of each BS is scheduled, according to one or more embodiments of the present disclosure.

The effect of beamwidth and MSR are shown in FIG. 19 and FIG. 20. FIG. 19 illustrates a Q-learning (solid lines) vs. game-based approach (dashed lines) when the first UE of each BS is scheduled, according to one or more embodiments of the present disclosure. FIG. 20 illustrates a Q-learning (solid lines) vs. game-based approach (dashed lines) when the third UE of each BS is scheduled, according to one or more embodiments of the present disclosure.

Fix β=0.1 W. In FIG. 19, the first UE of each BS is scheduled. These UEs represent the cell-edge UEs. Compare the performance of the approach with GT under the BS antenna configurations (20 dB, 30°), (30 dB, 20°) and (40 dB, 10°). For the first two cases with BS beamwidth 30° and 20°, the approach achieves 87% and 134% more reward than GT. GT performs poorly in these cases by being greedy to choose the maximum power because there is beam overlapping which causes very strong interference to the non-target UEs due to high TX powers. This implies that the approach has much better performance than GT in the interference-limited regime. However, when the beamwidth is further reduced to 10°, the approach achieves a similar reward to GT. This is because in this case, BS beams are very sharp so they cause little interference for non-target UEs. When the interference level is very low, GT achieves near-optimal performance. Therefore, the approach also achieves near-optimal performance in this case.

FIG. 20 illustrates the case when the third UE of each BS is scheduled. Due to their separate locations, these UEs receive less interference and represent the cell-center UEs, which usually have high SINR. It can be seen that for any of the considered BS antenna configurations, the approach outperforms GT by a small margin, and the margin diminishes as the beams become sharper (see the extreme case (40 dB, 10°)). The reason for this competitive performance is that the interference level is relatively low because the scheduled UEs are sparsely distributed. This demonstrates that the approach is at least as good as GT in the high SINR regime.

Extensions

Incorporation of the Lyapunov Optimization Framework

One interesting aspect of the approach is that the weights α, β can be automatically determined if the Lyapunov optimization framework is applied on top of the power allocation algorithm. More specifically, let us consider the following utility maximization problem $$\max \sum_{i \in M} \sum_{j \in K_i} U(\bar{X}_{j,i}) \tag{42a}$$

$$\text{s.t.} \sum_{j \in \mathcal{K}_i} \bar{p}_{j,i} \le T_f p_i^{avg}, \forall i, \tag{42b}$$

$$p_{j_i,i}(k, n) \le p_i^{max}, \forall i, k, n, \tag{42c}$$

where $p_{j_i,i}(k, n)$ is the TX power of $BS_i$ in the $n^{th}$ block of the $k^{th}$ frame. Each $BS_i$ is subject to a long-term average and an instantaneous peak power constraint $$p_i^{avg}$$

and $$p_i^{max},$$

respectively. $\bar{p}_{j,i}$ represents the average power consumption of BS i to UE j in all frames. $\bar{X}_{j,i}$ denotes the average number of received bits by $UE_j$ in each frame and is referred to as the average throughput in the following. U(•) represents the utility function, e.g., fairness function. Using the Lyapunov stochastic optimization framework, the above problem can be decomposed into two sub-problems to be solved in each frame, together with two virtual queues to enforce the average constraints. In particular, the first sub-problem aims to solve the auxiliary variables $\gamma_{j,i}(k)$:

$$\max \sum_{i \in M} \sum_{j \in \mathcal{K}_i} VU(\gamma_{j,i}(k)) - H_{j,i}(k)\gamma_{j,i}(k) \tag{43a}$$

$$\text{s.t. } 0 \le \gamma_{j,i}(k) \le T_f W \log\left(1 + g_{j,i}^{max}(k) p_i^{max}\right), \forall\, i, j, k \tag{43b}$$

where V is a constant.

$$g_{j,i}^{max}(k) \triangleq \max_n g_{j,i}(k, n)$$

denotes the maximum equivalent channel gain in the $k^{th}$ frame. $H_{j,i}(k)$ is the UE throughput queue which is updated by $$H_{j,i}(k+1) = \max\{H_{j,i}(k) + \gamma_{j,i}(k) - X_{j,i}(k), 0\}, \forall\, i \in M, \forall\, j \in K_i. \tag{44}$$

The second sub-problem aims to solve the TX powers $p_{j,i}(k, n)$:

$$\min \sum_{i \in M} \sum_{j \in \mathcal{K}_i} \left( \sum_{n \in [N_f]} \mathbb{E}\left[T_{j,i}^d(k, n) p_{j,i}(k, n)\right] - T_f p_i^{avg} \right) \times Z_i(k) - H_{j,i}(k)\hat{X}_{j,i}(k) \tag{45a}$$

$$\text{s.t. } 0 \le p_{j,i}(k, n) \le p_i^{max}, \forall\, i, k, n \tag{45b}$$

where $$\hat{X}_{j,i}(k) \triangleq \sum_{n=1}^{N_f} \mathbb{E}\left[T_{j,i}^d(k, n) W \log(1 + SINR_{j,i}(k, n))\right] \tag{45c}$$

denotes the expected throughput of $UE_j$ in the $k^{th}$ frame.

$$T_{j,i}^d(k, n)$$

denotes the data transmission time for UE j by BS i during block n of frame k. $Z_i(k)$ is the TX power queue which is updated by $$Z_i(k+1) = \max\left\{Z_i(k) + \sum_{j \in \mathcal{K}_i} \sum_{n \in [N_f]} T_{j,i}^d(k, n) p_{j,i}(k, n) - T_f p_i^{avg}, 0\right\}, \forall\, i \in M. \tag{46}$$

Note that the objective of sub-problem (45a) has the same form as the payoff function (46) if $\alpha_i = H_{j,i}(k)N_b$, $\beta_i = Z_i(k)N_b$ is chosen. More specifically, given that $UE_{j_i}$ is scheduled, each $BS_i$ has an objective function $$H_{j_i,i}(k)\hat{X}_{j_i,i}(k, n) - Z_i(k)\mathbb{E}\left[T_{j_i,i}^d(k, n) p_{j_i,i}(k, n)\right]$$

(the constant term $$T_f p_i^{avg}$$

is omitted as it does not affect the optimal solution) to maximize in block n, where $\hat{X}_{j,i_j}(k, n)$ is $UE_{j_i}$'s throughput in block n. By letting $$\mathbb{E}\left[T_{j_i,i}^d\right] = T_b,$$

i.e., the scheduled UE will be receiving data during the entire block, the objective becomes $\alpha_i T_s W \log(1+SINR_{j_i,i}(k, n)) - \beta_i T_s p_{j_i,i}(k, n)$. This objective can be optimized by maximizing the sum or average throughput in each of the $N_b$ slots in block n. In this way, the approach can be used to solve the second sub-problem (45) in each block and in a distributed manner. It can be seen that the reward weights $\alpha_i$, $\beta_i$ are optimally determined by the virtual queues derived from the Lyapunov optimization framework. The GT method (41) can be used to solve the second sub-problem. Since it has been shown that the approach outperforms GT in a single block, it is expected to also achieve higher utility than GT when the Lyapunov framework is applied.

Figure 21:
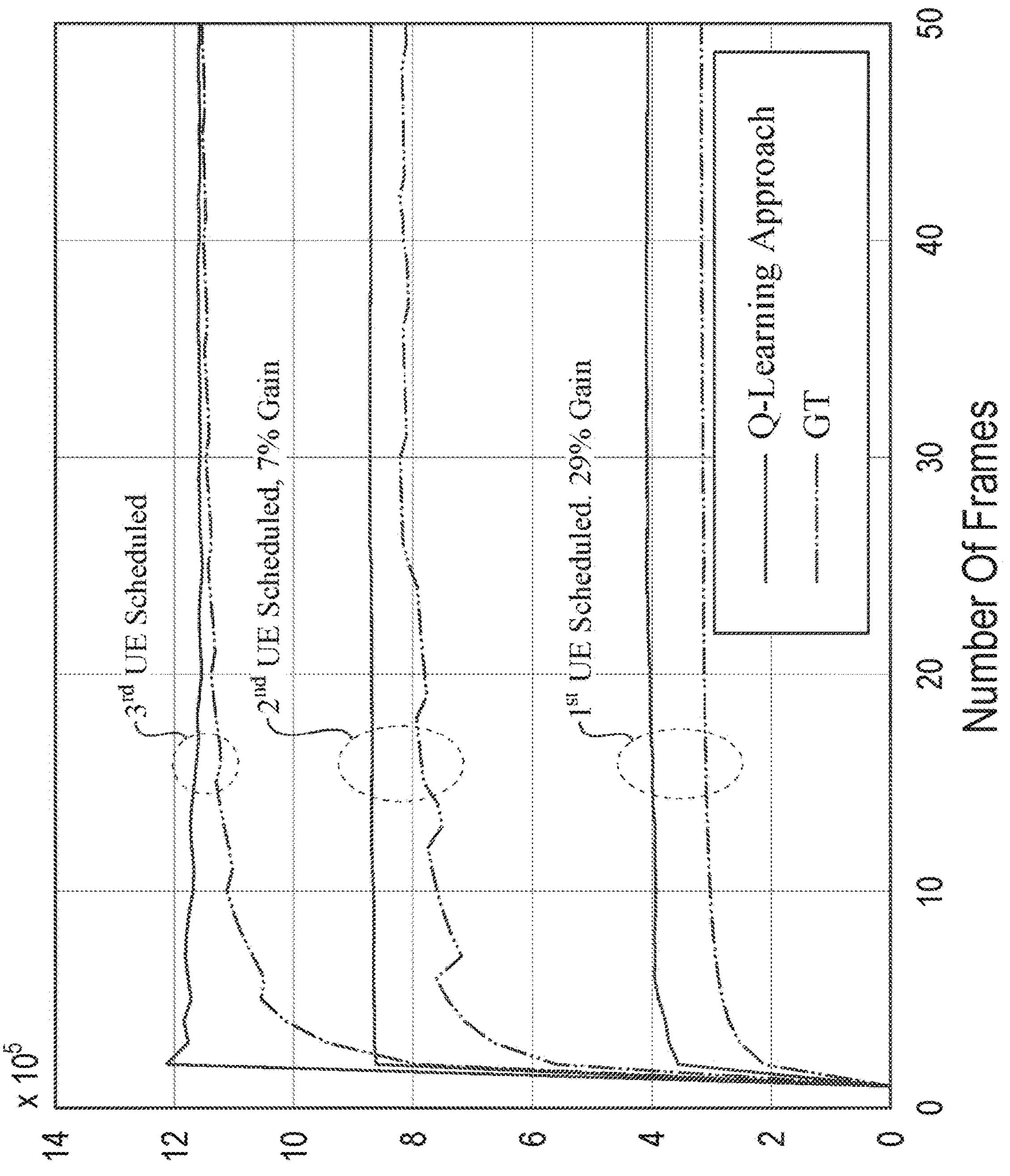
FIG. 21 illustrates a Q-learning vs. game-based approach when the Lyapunov framework is applied, according to one or more embodiments of the present disclosure.

FIG. 21 illustrates a Q-learning vs. game-based approach when the Lyapunov framework is applied, according to one or more embodiments of the present disclosure. FIG. 21 shows the achieved utility when the a-fair utility function $U(x)=x^{3/5}$ is used and under the same experiment setup. BS beamwidth and MSR are chosen as 30° and 20 dB while the UEs are omnidirectional.

It can be seen that the approach achieves 29% more utility (at the 50th frame) than GT when the first UE of each BS is scheduled and 7% more when the second UE is scheduled. For the cell-center UEs, i.e., the third UE of each BS, the approach achieves a similar utility as GT but with a faster convergence. The queue values of $BS_1$ when the first UE is scheduled are shown in Table 2. It can be seen that $\beta_1/\alpha_1 = Z_1(k)/H_{1,1}(k) \approx 0$, $\forall k$. This mimics the behavior of the power allocation algorithm when there is a very small penalty on power consumption.

TABLE 2

| Frame index k | 10 | 20 | 30 | 40 | 50 |
|---|---|---|---|---|---|
| $Z_1(k)$ | 0 | 0.24 | 0 | 0 | 0 |
| $H_{1,1}(k)/10^9$ | 3.87 | 0.14 | 3.92 | 1.90 | 0.11 |

Example Considerations

The approach adopts a per-BS storage complexity of $$\mathcal{O}\left(\frac{KP_qI_q}{M}\right)$$

and a per-slot execution complexity of $\mathcal{O}(\max\{P_q, I_q\})$. The storage complexity scales linearly with the number of UEs per BS and the execution complexity does not depend on the number of UEs. This demonstrates the scalability of the approach. However, to implement it on real-world cellular networks, there are still several practical considerations. First, in the approach, the interference at the scheduled UE needs to be measured in each slot and then reported back to the associated BS. Second, it is assumed in the approach that the channels are block-fading and do not change within the duration of each scheduling block.

CONCLUSION

The problem of distributed beam scheduling and power allocation for non-cooperative mmWave networks has been described. A unified framework, with a flexible network payoff function definition, that can be used for systematic performance evaluation and comparison of different scheduling methods has been provided. Furthermore, a Q-learning-based approach using an independent agent modeling where each BS can adaptively control its transmit power for different interference situations based on its experience and active exploration of non-greedy actions has been provide. Experiments have shown that the approach outperforms the non-cooperative game-based approach in the sense that they achieve similar performance in the high SINR regime but the approach beats the game-based approach by a large margin in the interference-limited regime. In addition, the approach can be integrated into the Lyapunonv stochastic optimization framework for the purpose of network utility maximization. In this case, the weights in the reward function are automatically and optimally determined by the virtual queues.

CONCLUSION

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure. Further, embodiments of the disclosure have utility with different and various detector types and configurations.

What is claimed is:

1. A method comprising:
receiving, at a base station of a radio-frequency communication network, a signal from a user equipment; and
scheduling spectrum for the user equipment based at least in part on:
a signal-to-interference-and-noise ratio of the signal,
a transmission-power constraint of the base station, and
information regarding past usage of the spectrum, wherein the transmission-power constraint comprises a statistical transmission-power constraint and an instantaneous transmission-power constraint.

2. The method of claim 1, wherein receiving a signal comprises receiving the signal utilizing unlicensed spectrum or shared spectrum and wherein scheduling spectrum comprises scheduling an unlicensed spectrum or shared spectrum.

3. The method of claim 1, further comprising scheduling the spectrum without coordinating with a spectrum-coordination system.

4. The method of claim 1, further comprising scheduling the spectrum without coordinating with an other base station.

5. The method of claim 1, further comprising scheduling the spectrum based at least in part on non-cooperative game theory.

6. The method of claim 1, further comprising scheduling the spectrum based at least in part on Q-learning.

7. The method of claim 1, further comprising scheduling the spectrum based at least in part on a contention-based protocol.

8. The method of claim 1, further comprising scheduling the spectrum based at least in part on p-persistent MAC protocol.

9. The method of claim 1, further comprising determining a beam at which the signal was received, and wherein scheduling the spectrum comprises scheduling the spectrum with respect to the beam.

10. A method comprising:
receiving, at a base station of a radio-frequency communication network, a signal from a user equipment; and
scheduling spectrum for the user equipment based at least in part on:
a signal-to-interference-and-noise ratio of the signal,
a transmission-power constraint of the base station, and
information regarding past usage of the spectrum; and
determining that an other base station of the radio-frequency communication network is scheduling the spectrum for communication with an other user equipment;
wherein scheduling the spectrum for the user equipment is based on the determination that the other base station is scheduling the spectrum; and
wherein the scheduling of the spectrum is to increase aggregate spectrum utilization between the base station and the user equipment and between the other base station and the other user equipment.

11. A system comprising:
a non-transitory computer-readable medium comprising computer executable instructions that, when executed via a processing unit of a computing system, cause the computing system to perform operations, the operations comprising:
receiving a signal received at a base station of a radio-frequency communication network from a user equipment; and
scheduling spectrum for the user equipment based at least in part on:
a signal-to-interference-and-noise ratio of the signal,
a transmission-power constraint of the base station, and
information regarding past usage of the spectrum, wherein the transmission-power constraint comprises a statistical transmission-power constraint and an instantaneous transmission-power constraint.

12. The system of claim 11, the operations further comprising:
prior to scheduling the spectrum, determining, based on the signal, a degree of interference; and
prior to scheduling the spectrum, determining, based on the degree of interference, whether to service the user equipment.

13. A method comprising:
receiving, at a base station of a radio-frequency communication network, a signal from a user equipment;
determining, based on the signal, a degree of interference;
scheduling spectrum for the user equipment based at least in part on:
a signal-to-interference-and-noise ratio of the signal,
a transmission-power constraint of the base station, and
information regarding past usage of the spectrum, wherein the transmission-power constraint comprises a statistical transmission-power constraint and an instantaneous transmission-power constraint; and
determining, based on the degree of interference, whether to service the user equipment.

* * * * *